US012238815B2

(12) United States Patent
Cona et al.

(10) Patent No.: US 12,238,815 B2
(45) Date of Patent: *Feb. 25, 2025

(54) METHOD AND SYSTEM FOR USING A SITUATIONAL NETWORK

(71) Applicant: SitNet LLC, Dover, DE (US)

(72) Inventors: Thomas Cona, Athens, GA (US); Patrick T. Igoe, Philadelphia, PA (US); Leonid Kravets, Philadelphia, PA (US); Edward A. Ehrlacher, Philadelphia, PA (US)

(73) Assignee: SITNET LLC, Dover, DE (US)

( * ) Notice: Subject to any disclaimer, the term of this patent is extended or adjusted under 35 U.S.C. 154(b) by 39 days.

This patent is subject to a terminal disclaimer.

(21) Appl. No.: 18/639,859

(22) Filed: Apr. 18, 2024

(65) Prior Publication Data

US 2024/0267995 A1 Aug. 8, 2024

Related U.S. Application Data

(60) Continuation of application No. 17/902,427, filed on Sep. 2, 2022, which is a continuation of application (Continued)

(51) Int. Cl.
*H04W 76/50* (2018.01)
*G01C 21/34* (2006.01)
(Continued)

(52) U.S. Cl.
CPC ........ *H04W 76/50* (2018.02); *G01C 21/3415* (2013.01); *G01C 21/3461* (2013.01);
(Continued)

(58) Field of Classification Search
CPC ...... H04L 41/344; H04L 63/06; H04W 76/50; G08B 21/028
See application file for complete search history.

(56) References Cited

U.S. PATENT DOCUMENTS 5,774,670 A  6/1998  Montulli
5,835,907 A  11/1998  Newman
(Continued)

FOREIGN PATENT DOCUMENTS

JP  2005-080211 A   3/2005
JP  2006-085250 A   3/2006
WO    00/69132 A1  11/2000

OTHER PUBLICATIONS

Meta Complaint FINAL 6 21 22.
(Continued)

*Primary Examiner* — Dustin Nguyen
(74) *Attorney, Agent, or Firm* — Haley Guiliano LLP

(57) ABSTRACT

A network system for accessing situation related information is disclosed. In one embodiment, the system includes a network connection for receiving an indication of an occurrence of a situation; a situational network formed based on the occurrence of the situation, the situational network including a plurality of participant devices determined to be geographically proximate to the situation, each of the participant devices corresponding to a participant in the situational network; a second network connection for presenting a roll call query to each of the plurality of participant devices soliciting a reply related to a status of the participant; a plurality of network connections established for receiving a status response from the participant devices; and a database for aggregating the status responses from responsive participants into a roll call list.

30 Claims, 45 Drawing Sheets

Related U.S. Application Data

No. 16/730,339, filed on Dec. 30, 2019, now Pat. No. 11,470,682, which is a continuation of application No. 16/207,059, filed on Nov. 30, 2018, now Pat. No. 10,524,307, which is a continuation of application No. 16/164,715, filed on Oct. 18, 2018, now Pat. No. 10,375,759, which is a continuation of application No. 15/638,722, filed on Jun. 30, 2017, now Pat. No. 10,117,290, which is a continuation of application No. 14/861,340, filed on Sep. 22, 2015, now Pat. No. 9,877,345, which is a continuation of application No. 13/612,964, filed on Sep. 13, 2012, now Pat. No. 9,143,535, which is a continuation of application No. 13/274,712, filed on Oct. 17, 2011, now Pat. No. 8,332,454, which is a division of application No. 11/924,711, filed on Oct. 26, 2007, now Pat. No. 8,069,202.

(60) Provisional application No. 60/887,843, filed on Feb. 2, 2007.

(51) Int. Cl.
  *G01C 21/36* (2006.01)
  *G08G 1/0967* (2006.01)
  *H04L 65/1069* (2022.01)
  *H04W 4/02* (2018.01)
  *H04W 4/024* (2018.01)
  *H04W 4/029* (2018.01)
  *H04W 4/90* (2018.01)
  *G08G 1/00* (2006.01)
  *H04W 84/18* (2009.01)

(52) U.S. Cl.
  CPC ... *G01C 21/3697* (2013.01); *G08G 1/096716* (2013.01); *G08G 1/096741* (2013.01); *G08G 1/096791* (2013.01); *H04L 65/1069* (2013.01); *H04W 4/02* (2013.01); *H04W 4/024* (2018.02); *H04W 4/029* (2018.02); *H04W 4/90* (2018.02); *G08G 1/205* (2013.01); *H04W 84/18* (2013.01)

(56) References Cited

U.S. PATENT DOCUMENTS

| | | | |
|---|---|---|---|
| 6,028,514 A * | 2/2000 | Lemelson | G08B 21/028 340/8.1 |
| 6,091,956 A | 7/2000 | Hollenberg | |
| 6,112,074 A | 8/2000 | Pinder | |
| 6,295,001 B1 | 9/2001 | Barber | |
| 6,424,840 B1 | 7/2002 | Fitch et al. | |
| 6,542,750 B2 | 4/2003 | Hendrey et al. | |
| 6,563,910 B2 | 5/2003 | Menard et al. | |
| 6,594,355 B1 | 7/2003 | Deo et al. | |
| 6,600,928 B1 | 7/2003 | Ahya et al. | |
| 6,785,681 B2 | 8/2004 | Keskar et al. | |
| 6,788,766 B2 | 9/2004 | Logan | |
| 6,826,472 B1 | 11/2004 | Kamei et al. | |
| 6,947,754 B2 | 9/2005 | Ogasawara | |
| 6,970,871 B1 | 11/2005 | Rayburn | |
| 7,016,307 B2 | 3/2006 | Vasudev et al. | |
| 7,026,925 B2 | 4/2006 | Roche et al. | |
| 7,027,055 B2 | 4/2006 | Anderson et al. | |
| 7,058,385 B2 | 6/2006 | Lauper | |
| 7,084,775 B1 | 8/2006 | Smith | |
| 7,085,818 B2 | 8/2006 | Brown et al. | |
| 7,091,829 B2 | 8/2006 | Lee | |
| 7,139,722 B2 | 11/2006 | Perrella et al. | |
| 7,151,939 B2 | 12/2006 | Sheynblat | |
| 7,177,398 B2 | 2/2007 | Meer et al. | |
| 7,181,346 B1 | 2/2007 | Kleist et al. | |
| 7,194,249 B2 | 3/2007 | Phillips et al. | |
| 7,221,928 B2 | 5/2007 | Laird et al. | |
| 7,231,220 B2 | 6/2007 | Reddy et al. | |
| 7,233,974 B2 | 6/2007 | Kawahara et al. | |
| 7,239,871 B2 | 7/2007 | Shamp et al. | |
| 7,242,948 B2 | 7/2007 | Fleischer et al. | |
| 7,245,925 B2 | 7/2007 | Zellner | |
| 7,254,607 B2 | 8/2007 | Hubbard et al. | |
| 7,263,614 B2 | 8/2007 | Roskind | |
| 7,266,558 B2 | 9/2007 | Gray | |
| 7,283,045 B1 | 10/2007 | Manz | |
| 7,284,033 B2 | 10/2007 | Jhanji | |
| 7,317,705 B2 | 1/2008 | Hanson | |
| 7,321,920 B2 | 1/2008 | Washburn | |
| 7,487,112 B2 | 2/2009 | Barnes, Jr. | |
| 7,523,191 B1 | 4/2009 | Thomas et al. | |
| 7,532,900 B2 | 5/2009 | Wilson et al. | |
| 7,557,689 B2 | 7/2009 | Seddigh et al. | |
| 7,644,144 B1 | 1/2010 | Horvitz et al. | |
| 7,672,281 B1 | 3/2010 | Humphries et al. | |
| 7,676,233 B1 | 3/2010 | Rehkopf | |
| 7,711,475 B1 | 5/2010 | Cona et al. | |
| 7,768,395 B2 | 8/2010 | Gold | |
| 7,801,971 B1 | 9/2010 | Amidon et al. | |
| 7,812,717 B1 | 10/2010 | Cona et al. | |
| 7,817,982 B1 | 10/2010 | Chu et al. | |
| 7,860,519 B2 | 12/2010 | Portman et al. | |
| 8,000,893 B1 | 8/2011 | Cona et al. | |
| 8,024,330 B1 | 9/2011 | Franco et al. | |
| 8,036,632 B1 | 10/2011 | Cona et al. | |
| 8,045,455 B1 | 10/2011 | Agronow et al. | |
| 8,103,300 B2 | 1/2012 | Gogic | |
| 8,229,458 B2 | 7/2012 | Busch | |
| 8,230,456 B2 | 7/2012 | Jacoby et al. | |
| 8,248,986 B2 | 8/2012 | Crolley et al. | |
| 8,249,932 B1 | 8/2012 | Cona et al. | |
| 8,254,338 B2 | 8/2012 | Anschutz et al. | |
| 8,275,397 B2 | 9/2012 | Huston | |
| 8,332,454 B2 | 12/2012 | Cona et al. | |
| 8,346,864 B1 | 1/2013 | Amidon et al. | |
| 8,358,609 B1 | 1/2013 | Cona et al. | |
| 8,560,385 B2 | 10/2013 | Atazky et al. | |
| 8,572,059 B2 | 10/2013 | Britton et al. | |
| 8,799,073 B2 | 8/2014 | Shahine et al. | |
| 8,826,139 B1 | 9/2014 | Wendkos et al. | |
| 9,143,535 B1 | 9/2015 | Cona et al. | |
| 9,195,996 B1 | 11/2015 | Walsh et al. | |
| 9,877,345 B2 | 1/2018 | Cona et al. | |
| 10,117,290 B1 | 10/2018 | Cona et al. | |
| 10,375,759 B1 | 8/2019 | Cona et al. | |
| 11,470,682 B1 | 10/2022 | Cona et al. | |
| 2001/0009857 A1 | 7/2001 | Vanttinen | |
| 2001/0032100 A1 | 10/2001 | Mahmud et al. | |
| 2002/0004705 A1 | 1/2002 | Baron et al. | |
| 2002/0075155 A1 | 6/2002 | Guillory | |
| 2002/0091692 A1 | 7/2002 | Yoshida et al. | |
| 2002/0107029 A1 | 8/2002 | Caughran et al. | |
| 2002/0116485 A1 * | 8/2002 | Black | H04L 41/344 709/227 |
| 2002/0160745 A1 | 10/2002 | Wang | |
| 2002/0161838 A1 | 10/2002 | Pickover et al. | |
| 2002/0177428 A1 | 11/2002 | Menard et al. | |
| 2002/0181684 A1 | 12/2002 | Logan | |
| 2003/0006912 A1 | 1/2003 | Brescia | |
| 2003/0148774 A1 | 8/2003 | Naghian et al. | |
| 2003/0162557 A1 | 8/2003 | Shida | |
| 2003/0181209 A1 * | 9/2003 | Forte | H04W 76/50 455/426.2 |
| 2003/0197615 A1 | 10/2003 | Roche et al. | |
| 2004/0023666 A1 | 2/2004 | Moon et al. | |
| 2004/0039807 A1 | 2/2004 | Boveda et al. | |
| 2004/0070515 A1 | 4/2004 | Burkley et al. | |
| 2004/0193617 A1 | 9/2004 | Adler | |
| 2004/0225733 A1 | 11/2004 | Tesink et al. | |
| 2005/0009508 A1 | 1/2005 | Graske et al. | |
| 2005/0033511 A1 | 2/2005 | Pechatnikov et al. | |
| 2005/0096840 A1 | 5/2005 | Simske | |
| 2005/0129240 A1 * | 6/2005 | Balfanz | H04L 63/06 380/270 |

(56) References Cited

U.S. PATENT DOCUMENTS

| | | |
|---|---|---|
| 2005/0132016 A1 | 6/2005 | Boone |
| 2005/0135428 A1 | 6/2005 | Hellgren |
| 2005/0197775 A1 | 9/2005 | Smith |
| 2006/0031582 A1 | 2/2006 | Pugel et al. |
| 2006/0047825 A1 | 3/2006 | Steenstra et al. |
| 2006/0079200 A1 | 4/2006 | Hirouchi et al. |
| 2006/0095320 A1 | 5/2006 | Jones |
| 2006/0109113 A1 | 5/2006 | Reyes et al. |
| 2006/0117051 A1 | 6/2006 | Chin |
| 2006/0126556 A1 | 6/2006 | Jiang et al. |
| 2006/0155809 A1 | 7/2006 | Arav |
| 2006/0211404 A1 | 9/2006 | Cromp et al. |
| 2006/0230053 A1 | 10/2006 | Eldering |
| 2006/0242234 A1 | 10/2006 | Counts et al. |
| 2006/0270419 A1 | 11/2006 | Crowley et al. |
| 2006/0273893 A1 | 12/2006 | Warner |
| 2006/0274743 A1 | 12/2006 | Yegin et al. |
| 2006/0282312 A1 | 12/2006 | Carlson et al. |
| 2006/0287872 A1 | 12/2006 | Simrell |
| 2007/0021981 A1 | 1/2007 | Cox |
| 2007/0032247 A1 | 2/2007 | Shaffer et al. |
| 2007/0035388 A1 | 2/2007 | Mock et al. |
| 2007/0035612 A1 | 2/2007 | Korneluk et al. |
| 2007/0159355 A1 | 7/2007 | Kelly et al. |
| 2007/0161382 A1 | 7/2007 | Melinger et al. |
| 2007/0192116 A1 | 8/2007 | Lovitt |
| 2007/0194938 A1 | 8/2007 | Mitchell |
| 2007/0202927 A1 | 8/2007 | Pfleging et al. |
| 2007/0206773 A1 | 9/2007 | Branam |
| 2007/0208837 A1 | 9/2007 | Tian et al. |
| 2007/0209054 A1 | 9/2007 | Cassanova |
| 2007/0216535 A1 | 9/2007 | Carrino |
| 2007/0226034 A1 | 9/2007 | Khan |
| 2007/0233635 A1 | 10/2007 | Burfeind et al. |
| 2007/0255785 A1 | 11/2007 | Hayashi et al. |
| 2007/0276908 A1 | 11/2007 | Asthana et al. |
| 2007/0282621 A1 | 12/2007 | Altman et al. |
| 2008/0037576 A1 | 2/2008 | Hwang et al. |
| 2008/0046511 A1 | 2/2008 | Skrenta |
| 2008/0048851 A1 | 2/2008 | Reyes et al. |
| 2008/0086219 A1 | 4/2008 | Evans et al. |
| 2008/0092162 A1 | 4/2008 | Lundy et al. |
| 2008/0103784 A1 | 5/2008 | Wong et al. |
| 2008/0139165 A1 | 6/2008 | Gage et al. |
| 2008/0139218 A1 | 6/2008 | Duan |
| 2008/0169920 A1 | 7/2008 | Spence |
| 2008/0208605 A1 | 8/2008 | Sinha et al. |
| 2009/0015467 A1 | 1/2009 | Kwon et al. |
| 2009/0024726 A1 | 1/2009 | Jeon et al. |
| 2009/0030927 A1 | 1/2009 | Cases et al. |
| 2009/0135758 A1 | 5/2009 | Alper et al. |
| 2009/0213001 A1 | 8/2009 | Appelman et al. |
| 2009/0235305 A1 | 9/2009 | Pugel |
| 2009/0254944 A1 | 10/2009 | Watson et al. |
| 2009/0325535 A1 | 12/2009 | Felt et al. |

OTHER PUBLICATIONS

Meta Marketing API.
Network Analysis—Some Basic Principles.
Official Events API—Facebook Pages API.
Official Google Blog—Why we're buying DoubleClick.
Online Forums Supporting Grassroots Participation in Emergency Preparedness and Response.
Overview—Graph API.
Overview—Meta Marketing API.
Petition for Inter Partes Review of Claims 1-11, 22, and 23 of U.S. Pat. No. 8,249,932 & Exhibits.
Petition for Inter Partes Review of Claims 12-21 of U.S. Pat. No. 8,249,932 & Exhibits.
Petition for Inter Partes Review of U.S. Pat. No. 11,470,682 & Exhibits.
Petition for Inter Partes Review of U.S. Pat. No. 8,332,454 & Exhibits.
Petition for Inter Partes Review of U.S. Pat. No. 9,877,345 & Exhibits.
PGP Lets You Take Charge of Your Cookies.
PGP Lets You Take Charge of Your Cookies_WIRED.
Pop-up ads OK for Tripod—CNET.
Post Engagement in Facebook Ads.
Safety Check—Streamlining deployment around the world.
Seven Million People Used Facebook's Check-In Feature After Nepal Earthquake.
*SitNet* v *Meta* Complaint and Exhibits.
Social network—Wikipedia, the free encyclopedia.
Social Network Sites—Definition, History, and Scholarship.
Stale Cookies—ClickZ.
Tao—Facebook's Distributed Data Store for the Social Graph.
Tao—The power of the graph—Engineering at Meta.
The Building Collapse in Fereej Bin Durham, Doha, Qatar.
The Evolution of Google Adwords—A $38 Billion Advertising Platform.
The First-Ever Banner Ad on the Web.
The Google Online Marketing Challenge.
The Google Online Marketing Challenge—Classroom Learning with Real Clients, Real Money, and Real Advertising Campaigns_JIAD.
The History of Online Advertising.
The History of Online Advertising—Adpushup.
The Tao of Facebook—'Social Graph' Takes New Path.
The Wayback Machine.
Unintrusive customization techniques for web advertising.
Updated science-wide author databases of standardized citation indicators.
View insights about reactions to your ad.
WAP (Wireless Application Protocol)—Tech-FAQ.
What are Call-to-Action Buttons in Meta Ads Manager.
What are GPS coordinates and how do they work?
What are some things I can do to stay safe on Facebook when requesting and offering help in Crisis Response_Facebook Help Center.
What is a Facebook Pixel_Meta's tracking tool, explained.
What is a Web Browser—Definition from Techopedia.
What is an ad server.
Why we're buying DoubleClick.
"Notifyl/Severe Weather Alerts" Web Pages; www.weather.com, Jul. 12, 2007, 5 pgs.
Biever, Celeste, "My Space-style websites, perfect for disaster survival", NewScientistTech.com, Feb. 15, 2007, 2 pgs.
Dane County Department of Emergency Management Warning System, Oct. 23, 2006, www.countyofDane.com, 10 pgs.
Hales, David, et al, "Friends for Free: Self Organizing Artificial Social Networks for Trust and Cooperation", University of Bologna, Italy, Aug. 2005, 20 pgs.
Harrison, Jeff, "Location Based Social Networking for Crisis Management", 2006, www.thecarbonproject. com, 24 pgs.
Jackson, Joab, "Disaster Prediction Social Networking Boosted by Geo-Data Feeds", http://news.nationalgeographic.com; Oct. 19, 2006, 5 pgs.
Kim, Ryan, "Hey Baby, want a dale?", www.sfgate. com, Jul. 23, 2005, 3 pgs.
Nena Technical Requirements Document for Location Information to Support IP-Based Emergency Services, Nena 08-752 Issue 1, Dec. 21, 2006, 33 pages.
Phillips, Brenda D. Ph.D, et al, "Social Science Research Needs: A Focus on Vulnerable Populations, Forecasting and Warnings", Feb. 2006, Hurricane Forecast Socio-economic Workshop, Pomona, CA, 11 pgs.
Press Release, "WeatherBug and SendWorkNow Launch Smart Notification, Weather Service to Deliver Nation's First Location Based, 2-way Mobile Weather Alerts and Notifications Based on Live WeatherBug Network Data", Jun. 12, 2006, www.aws.com, 6 pgs.
Schneiderman, Ben, Preece, Jennifer; "911.gov", Feb. 16, 2007, Science Magazine, vol. 315, p. 944, www.sciencemag.org, 1 pg.
Share your world with ((Echo)) MyPlace and CarbonCloud, Jul. 15, 2007, www.thecarbonproject.com, 4 pgs.

(56) References Cited

OTHER PUBLICATIONS

Social Networking, What you need to know, INConnect Spring, 2007, www.ena.com, 8 pgs.
Sydell, Laura "What are you doing? Twitter Offers a Megaphone", May 21, 2007, http://www.npr.org/templates/story, 1 pg.
Web Pages, Send Word Now; http://www.sendwordnow.com, Jul. 19, 2007, 11 pgs.
Ziv et al., "An Exploration on Mobile Social Networking: Dodgeball as a Case in Point", Department of Management Polytechnic University IEEE Conference Proceedings, MBusiness Conference, Jun. 26, 2006, 1-7 pgs.
Doc 57-4—Exhibit 3 Merriam-Webster's Collegiate Dictionary.
Doc 57-5—Exhibit 4 Dictionary of Computing_Collin.
Doc 57-8—Exhibit 7 Computer Jargon_Martin.
Doc 57-9—Exhibit 8 Newton's Telecom Dictionary.
Doc 58—Amended Joint Claim Construction Chart.
Edit information on your Facebook profile and choose who can see it.
Engagement Custom Audiences—Meta Marketing API.
Estimating the Capacity of the Location-Based Advertising Channel.
Event and Local Ads—Meta Marketing API.
Facebook Activates Safety Check After 8 Killed in New York City Rampage.
Facebook activates Safety Check for NYC explosion.
Facebook Expands 'Safety Check' To Facilitate Aid In Emergencies.
Facebook OCP 2S Server Tioga Pass Refresh.
Facebook Pixel Events.
Facebook releases Safety Check crisis response tool for Workplace.
Facebook turns Safety Check over to its users.
Facebook Unveils Facebook Ads.
From the original banner to Tosh.0—The hits and misses of publisher ad plays.
Get Started_Facebook Ads.
Google Acquires Applied Semantics.
Google Buys DoubleClick for $3.1 Billion.
Google Buys DoubleClick for $3.1 Billion—The New York Times.
Google Timeline—The New York Times.
Handbook for the Palm V™ Organizer.
How 20 years of Google's AdSense changed the internet.
How do I mark myself safe on Facebook or ask if someone else is safe during a disaster.
How does Facebook know I'm in an area affected by a crisis_ Facebook Help Center.
How Facebook ads use machine learning.
How Facebook's Location Settings work.
How is Safety Check activated on Facebook_ Facebook Help Center.
How Mark Zuckerberg Turned Facebook Into the Web's Hottest Platform.
How much does Workplace Core cost.
How to choose the right Meta Ads Manager objective.
How to create a lookalike audience on Meta Ads Manager.
HTML Images.
HTML Images _ image tag_ alt attribute_ jpg_ png_ gif_ svg_ webp.
Increasing Advertising Value of Mobile Marketing—An Empirical Study of Antecedents.
Increasing Advertising Value of Mobile Marketing—An Empirical Study of Antecendents.
Infringement of U.S. Pat. No. 11,470,682 by Crisis Response_Safety Check.
Infringement of U.S. Pat. No. 8,249,932 by Facebook Targeted Advertising and Events.
Infringement of U.S. Pat. No. 8,332,454 by Crisis Response_Safety Check.
Infringement of U.S. Pat. No. 8,332,454 by Targeted Advertising and Events.
Infringement of U.S. Pat. No. 9,877,345 by Crisis Response_Safety Check.
Intelligent Delivery of Interactive Advertisement Content.
Introducing Safety Check.
Introducing the Events From Facebook App.
Lookalike Audiences—Meta Marketing API.
Manage Your Ad Object's Status.
Marketing API Reference.
U.S. Appl. No. 17/902,427, filed Sep. 2, 2022, Thomas Cona.
U.S. Appl. No. 18/639,871, filed Apr. 18, 2024, Thomas Cona.
*Meta Platforms, Inc.* v. *SitNet LLC, SitNet* v *Meta*, Jul. 24, 2023.
IPR2024-00612, *Meta Platforms, Inc.* v. *SitNet LLC*, Mar. 4, 2024.
IPR2024-00531, *Meta Platforms, Inc.* v. *SitNet LLC*, Feb. 27, 2024.
IPR2024-00530, *Meta Platforms, Inc.* v. *SitNet LLC*, Feb. 27, 2024.
IPR2024-00529, *Meta Platforms, Inc.* v. *SitNet LLC*, Feb. 27, 2024.
IPR2024-00528, *Meta Platforms, Inc.* v. *SitNet LLC*, Mar. 4, 2024.
A Brief History of Online Advertising.
A New Center for Crisis Response on Facebook.
A Systematic Review on Search Engine Advertising.
About engagement custom audiences.
Ad Campaign Structure—Meta Marketing API.
Ad server definition_Adjust.
Ad Targeting—Options to Reach Your Audience Online.
An Advertising Power, but Just What Does Double Click Do.
Apr 8th—Scranton Comedy Club Show w Headliner Johnny Watson.
Audience_Facebook Ads.
Basic Targeting—Meta Marketing API.
Best Practices for Optimizing Web Advertising Effectiveness.
Best practices to advertise your event to your preferred audience.
Complaint (SDNY-1-23-cv-06389).
Consumer Attitudes Toward Mobile Advertising—An Empirical Study.
Create an ad set in Meta Ads Manager.
Crisis Response_Facebook Help Center.
Crisis Response_The Silverado Fire in Orange County, California, USA.
Crisis Response_The Simpson Road Fire in Logan County, Oklahoma, US.
Declaration of Bernard J. Jansen, Ph.D., in Support of Petition for Inter Partes Review of Claims 1-11, 22, and 23 of U.S. Pat. No. 8,249,932.
Declaration of Bernard J. Jansen, Ph.D., in Support of Petition for Inter Partes Review of Claims 12-21 of U.S. Pat. No. 8,249,932.
Declaration of Dr. Jeremy Cooperstock in Support of Petition for Inter Partes Review of U.S. Pat. No. 11,470,682.
Declaration of Dr. Jeremy Cooperstock in Support of Petition for Inter Partes Review of U.S. Pat. No. 8,332,454.
Declaration of Dr. Jeremy Cooperstock in Support of Petition for Inter Partes Review of U.S. Pat. No. 9,877,345.
Detecting Hit Shaving in Click-Through Payment Schemes.
Doc 25—Notice of Meta's Motion to Dismiss.
Doc 25-1—Exhibit to Fed. R. Civ. P. 12(b)(6) Motion to Dismiss.
Doc 25-2—[Proposed] Order Granting Meta's Motion to Dismiss.
Doc 26—Notice of Meta's Motion to Dismiss.
Doc 26-1—[Proposed] Order Granting Meta's Motion to Dismiss.
Doc 27—Memorandum of Law in Support of Meta's Motion to Dismiss.
Doc 28—Declaration of Dana M. Seshens in Support of Meta's Motion to Dismiss.
Doc 28-1—Exhibit to Fed. R. Civ. P. 12(b)(6) Motion to Dismiss.
Doc 28-2—Memorandum of Law in Support of Meta's Motion to Dismiss.
Doc 28-3—Exhibit to Fed. R. Civ. P. 12(b)(6) Motion To Dismiss.
Doc 40—Plaintiff's Memorandum of Law in Opposition to Defendant's Motion to Dismiss.
Doc 40-1—Appendix A—Comparison with Patent Ineligible Claims.
Doc 40-2—Appendix B—Comparison with Patent Eligible Claims.
Doc 40-3—Appendix C—Responsive Rule 8.G.i Chart.
Doc 41—Reply in Support of Meta's Motion to Dismiss.
Doc 41-1—Exhibit A—Claim Comparison Chart.
Doc 51—Opinion and Order.
Doc 56—Meta's Answer to Plaintiff's Complaint.

(56) References Cited

OTHER PUBLICATIONS

Doc 57—Joint Claim Construction Brief.
Doc 57-1—Joint Appendix to the Joint Claim Construction Brief.
Doc 57-10—Exhibit 9 Internet Dictionary.
Doc 57-11—Exhibit 10 The Facts on File Dictionary of Computer Science.
Doc 57-12 Declaration of Kathryn Bi in Support of Meta's Responsive Claim Construction Brief.
Doc 57-3—Exhibit 2 Dictionary of Computing_Pountain.
Doc 79—Opinion and Order; SDNY-1-23-cv-06389 *Meta Platforms, Inc.* v. *SitNet LLC*, Doc 79—Opinion and Order dated Jul. 16, 2024 (10 Pages).
Doc 80—Letter Motion for Discovery Protective Order; SDNY-1-23-cv-06389 *Meta Platforms, Inc.* v. *SitNet LLC*, Doc 80—Letter Motion for Discovery Protective Order dated Jul. 17, 2024 (74 Pages).
Doc 80-1 Exhibit A—SitNet 30b6 Notice; SDNY-1-23-cv-06389 *Meta Platforms, Inc.* v. *SitNet LLC*, Doc 80-1 Exhibit A—SitNet 30b6 Notice dated Jul. 17, 2024 (15 Pages).
Doc 80-10 Exhibit J—Apr. 19, 2024 Email Thread; SDNY-1-23-cv-06389 *Meta Platforms, Inc.* v. *SitNet LLC*, Doc 80-10 Exhibit J—Apr. 19, 2024 Email Thread dated Jul. 17, 2024 (8 Pages).
Doc 80-2 Exhibit B—Meta Response to SitNet 30b6 Notice; SDNY-1-23-cv-06389 *Meta Platforms, Inc.* v. *SitNet LLC*, Doc 80-2 Exhibit B—Meta Response to SitNet 30b6 Notice dated Jul. 17, 2024 (4 Pages).
Doc 80-3 Exhibit C—Jul. 8, 2024 Email Thread; SDNY-1-23-cv-06389 *Meta Platforms, Inc.* v. *SitNet LLC*, Doc 80-3 Exhibit C—Jul. 8, 2024 Email Thread dated Jul. 17, 2024 (16 Pages).
Doc 80-4 Exhibit D—May 30, 2024 Email Thread; SDNY-1-23-cv-06389 *Meta Platforms, Inc.* v. *SitNet LLC*, Doc 80-4 Exhibit D—May 30, 2024 Email Thread dated Jul. 17, 2024 (4 Pages).
Doc 80-5 Exhibit E—Jun. 4, 2024 Email Thread; SDNY-1-23-cv-06389 *Meta Platforms, Inc.* v. *SitNet LLC*, Doc 80-5 Exhibit E—Jun. 4, 2024 Email Thread dated Jul. 17, 2024 (5 Pages).
Doc 80-6 Exhibit F—Jun. 24, 2024 Email Thread; SDNY-1-23-cv-06389 *Meta Platforms, Inc.* v. *SitNet LLC*, Doc 80-6 Exhibit F—Jun. 24, 2024 Email Thread dated Jul. 17, 2024 (5 Pages).
Doc 80-7 Exhibit G—Excerpt of Markman Hearing Transcript; SDNY-1-23-cv-06389 *Meta Platforms, Inc.* v. *SitNet LLC*, Doc 80-7 Exhibit G—Excerpt of Markman Hearing Transcript dated Jul. 17, 2024 (7 Pages).
Doc 80-8 Exhibit H—Jul. 12, 2024 Email Thread; SDNY-1-23-cv-06389 *Meta Platforms, Inc.* v. *SitNet LLC*, Doc 80-8 Exhibit H—Jul. 12, 2024 Email Thread dated Jul. 17, 2024 (3 Pages).
Doc 80-9 Exhibit I—20240309 MET_Letter re Discovery Requests; SDNY-1-23-cv-06389 *Meta Platforms, Inc.* v. *SitNet LLC*, Doc 80-9 Exhibit I—20240309 MET_Letter re Discovery Requests dated Jul. 17, 2024 (4 Pages).
Exhibit 2001—Joint Claim Construction Brief filed by *Sitnet LLC* vs. *Meta Platforms, INC.*, Civil Action No. 1:23-cv-06389-AS, Under, IPR024-00528, Jun. 21, 2024, 65 pages.
Exhibit 2001—Joint Claim Construction Brief filed by *Sitnet LLC* vs. *Meta Platforms, INC.*, Civil Action No. 1:23-cv-06389-AS, Under, IPR024-00529, Jun. 13, 2024, 65 pages.
Exhibit 2001—Joint Claim Construction Brief filed by *Sitnet LLC* vs. *Meta Platforms, INC.*, Civil Action No. 1:23-cv-06389-AS, Under, IPR024-00530, Jun. 13, 2024, 65 pages.
Exhibit 2001—Joint Claim Construction Brief filed by *Sitnet LLC* vs. *Meta Platforms, INC.*, Civil Action No. 1:23-cv-06389-AS, Under, IPR024-00612, Jun. 13, 2024, 65 pages.
Exhibit 2002—Amended Joint Claim Construction Chart filed by *Sitnet LLC* vs. *Meta Platforms, INC.*, Civil Action No. 1:23-cv-06389-AS, Under IPR2024- 00612, Jun. 21, 2024, 11 pages.
Exhibit 2002—Amended Joint Claim Construction Chart filed by *Sitnet LLC* vs. *Meta Platforms, INC.*, Civil Action No. 1:23-cv-06389-AS, Under IPR2024-00528, Jun. 21, 2024, 11 pages.
Exhibit 2002—Amended Joint Claim Construction Chart filed by *Sitnet LLC* vs. *Meta Platforms, INC.*, Civil Action No. 1:23-cv-06389-AS, Under IPR2024-00529, Jun. 13, 2024, 11 pages.
Exhibit 2002—Amended Joint Claim Construction Chart filed by *Sitnet LLC* vs. *Meta Platforms, INC.*, Civil Action No. 1:23-cv-06389-AS, Under IPR2024-00530, Jun. 13, 2024, 11 pages.
Preliminary Response to Petition for Inter Partes Review filed by *Meta Platforms, INC.* vs. *Sitnet LLC.*, of U.S. Pat. No. 8,249,932, Under IPR Case No. 2024-00528, Jun. 21, 2024, 29 pages.
Preliminary Response to Petition for Inter Partes Review filed by *Meta Platforms, INC.* vs. *Sitnet LLC.*, of U.S. Pat. No. 8,249,932, Under IPR Case No. 2024-00612, Jun. 21, 2024, 29 pages.
Preliminary Response to Petition for Inter Partes Review filed by *Meta Platforms, INC.* vs. *Sitnet LLC.*, of U.S. Pat. No. 8,332,454, Under IPR Case No. 2024-00529, Jun. 13, 2024, 27 pages.
Preliminary Response to Petition for Inter Partes Review filed by *Meta Platforms, INC.* vs. *Sitnet LLC.*, of U.S. Pat. No. 9,877,345, Under IPR Case No. 2024-00530, Jun. 13, 2024, 34 pages.
IPR2024-00612 *Meta Platforms, Inc.* v. *SitNet LLC*, Sitnet LLC's Sur-Reply To Petitioner's Reply—U.S. Pat. No. 8,249,932_IPR2024-00612 dated Jul. 26, 2024 (8 Pages).
IPR2024-00530 *Meta Platforms, Inc.* v. *SitNet LLC*, Sitnet LLC's Sur-Reply To Petitioner's Reply—U.S. Pat. No. 9,877,345 dated Jul. 26, 2024 (9 Pages).
IPR2024-00529 *Meta Platforms, Inc.* v. *SitNet LLC*, Sitnet LLC's Sur-Reply To Petitioner's Reply—U.S. Pat. No. 8,332,454 dated Jul. 26, 2024 (8 Pages).
IPR2024-00528 *Meta Platforms, Inc.* v. *SitNet LLC*, Sitnet LLC's Sur-Reply To Petitioner's Reply—U.S. Pat. No. 8,249,932_IPR2024-00528 dated Jul. 26, 2024 (7 Pages).
IPR2024-00612 *Meta Platforms, Inc.* v. *SitNet LLC*, "Markman Hearing Transcript" dated Jul. 26, 2024 (75 pages).
IPR2024-00530 *Meta Platforms, Inc.* v. *SitNet LLC*, "Markman Hearing Transcript" dated Jul. 26, 2024 (75 pages).
IPR2024-00529 *Meta Platforms, Inc.* v. *SitNet LLC*, "Markman Hearing Transcript" dated Jul. 26, 2024 (75 pages).
IPR2024-00528 *Meta Platforms, Inc.* v. *SitNet LLC*, "Markman Hearing Transcript" dated Jul. 26, 2024 (75 pages).

\* cited by examiner

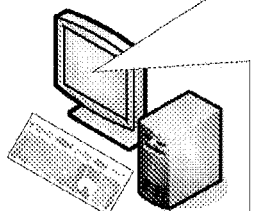

>> ALL SCHOOLS IN SPRINGFIELD SCHOOL DISTRICT CLOSED TOMORROW 2-1-07 DUE TO PREDICTED 12" SNOWFALL TONIGHT. ~3066

☒ TEACHERS    >>
☒ STAFF:       >>Emergency Staff Report at 8 AM.
☒ PARENTS     >>
☐ OTHER SD's  >>
☒ SNOW REMOVAL: >> Can you have lots plowed by 3 PM.

[ NOTIFY ] ~3068

3060

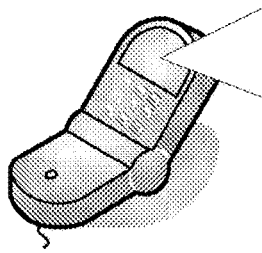

(1-31-2007, 3:46 PM) MESSAGE FROM SPRINGFIELD SCHOOL DISTRICT: ALL SCHOOLS IN SPRINGFIELD SCHOOL DISTRICT CLOSED TOMORROW 2-1-07 DUE TO PREDICTED 12" SNOWFALL TONIGHT. ~3066

WORK           >>Will be in late.
SITTERS        >>Can anyone take the kids tomorrow?
FRIENDS        >>Kids wanna meet at 10 at the Hill for sledding.
SNOW REMOVAL   >>Please do our driveway tomorrow when you can.

[ NOTIFY ] ~3068

[REPLY]    >>

3062

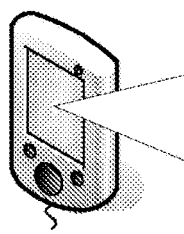

(1-31-2007, 3:57 PM) MESSAGE FROM JANE DOE: ALL SCHOOLS IN SPRINGFIELD SCHOOL DISTRICT CLOSED TOMORROW 2-1-07 DUE TO PREDICTED 12" SNOWFALL TONIGHT. ~3066
CAN ANYONE TAKE THE KIDS TOMORROW? ~3069

WORK       >>
FRIENDS    >>I will be at Jane's tomorrow.
FAMILY     >>

[ NOTIFY ] ~3068

[REPLY]    >> I can come over by 8:30 AM. ~3067

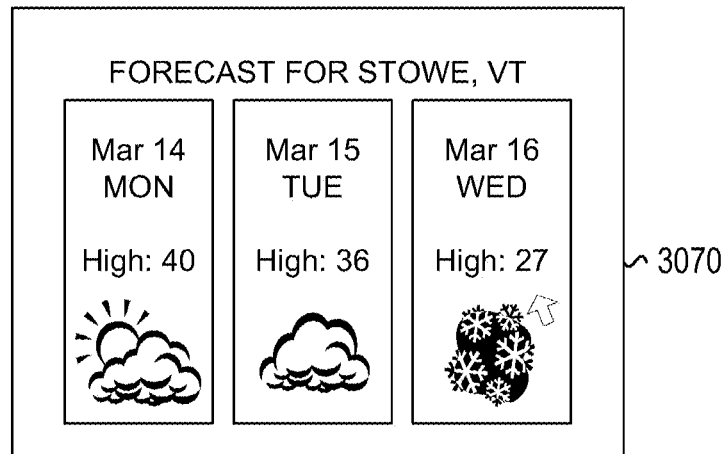
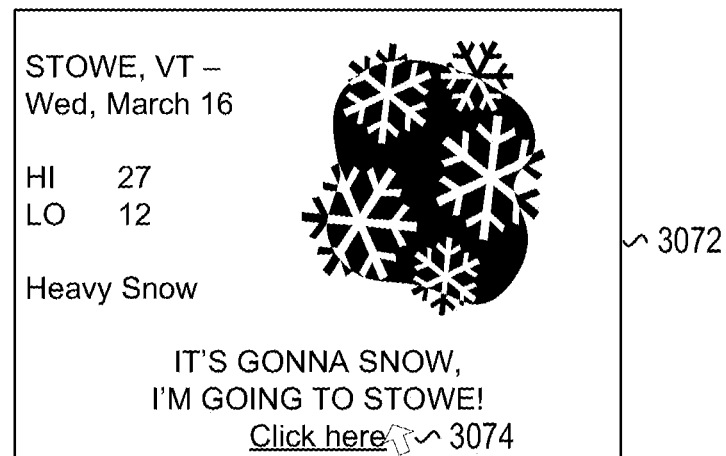
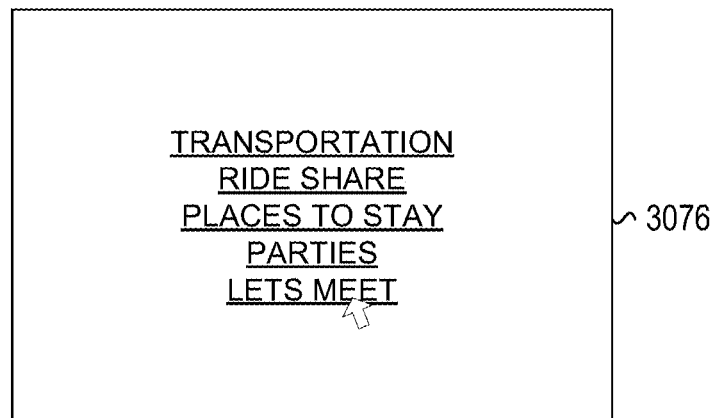
*Fig. 26*

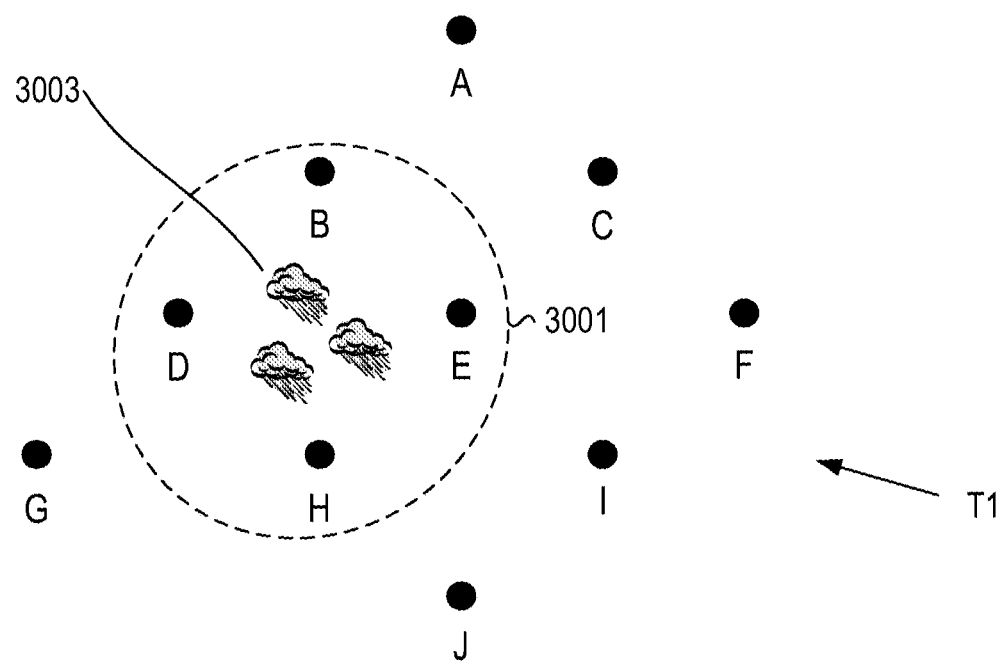
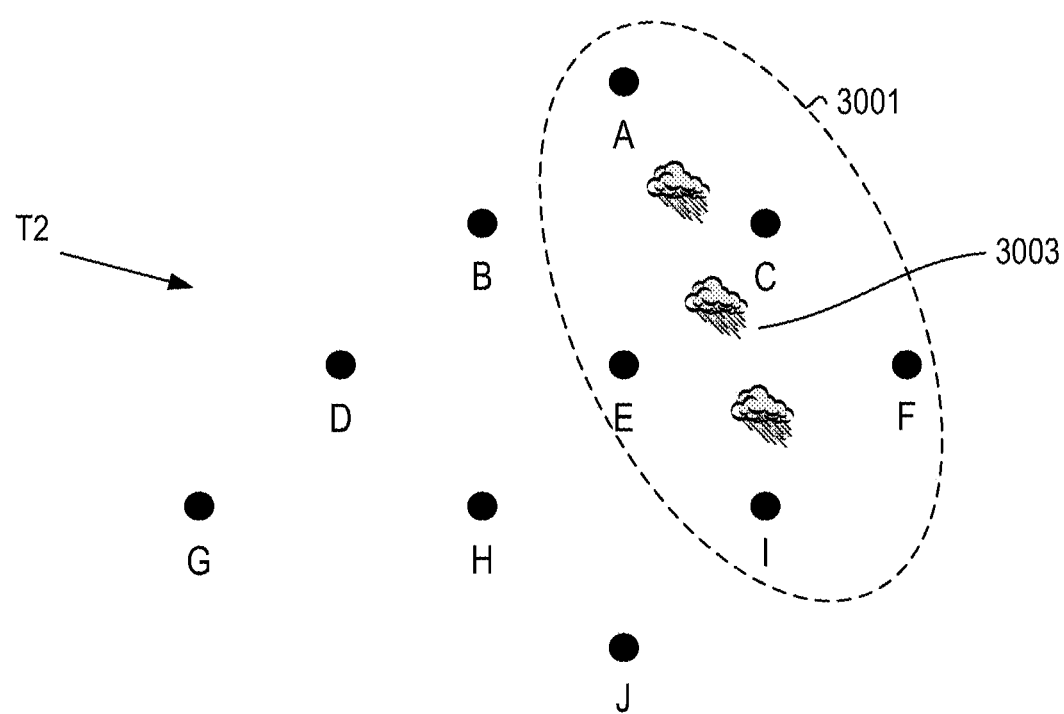
*Fig. 31*

PERSONAL INFORMATION AGGREGATOR (PIA) — 3070

!ATTENTION!
"Property Building Mangement"
Has informed "Springfield Fire Company" that you may be inside "1 Tower Place".
This building is under current evacuation order for an emergency situation.
Please indicate your status below.
If you need assistance, you will be prompted to enter additional information below.
NOTE that failure to respond may classify you as a missing person.

3074 — I'm OK and out of the building

3072 — I need assistance

3076 — VIEW List of Potential Missing Persons

SELECT EVENT:

| HURRICANE WILEY |
| TORNADO, SMALLTOWN |
| TORNADO, BIGTOWN |
| FLOODING, MIDDLEVILLE |

~ 3082

SEARCH (Enter ZIP, Street, or Address)

| Orchard Drive | ~ 3084

POSTS ⎯ 3086

(8-10-06, 2:04 PM) Looking for a lost beagle. Her name is Lucy
(8-10-06, 2:15 PM) Has anyone heard from my Aunt Ethel at 521 Orchard Drive. Her phone is not working. She is 81. I'm worried
(8-10-06, 2:45 PM) Bob Smith is OK. I am travelling right now
(8-10-06, 4:17 PM) Jack, Jane, Jodie, and Jimmy at 432 Orchard are all OK.
(8-10-06, 4:23 PM) The Jackson's of 234 Orchard Drive are fine.
(8-10-06, 5:10 PM) I checked in on your Aunt Ethel, she's fine.
(8-11-06, 7:07 AM) I found Lucy! She was with a yellow lab, no tags, female, older. Call me at 555-1234.

TYPE NEW POSTS

3088 ~ ( ADD POST )

ROLL CALL LIST ~ 3089

METHOD AND SYSTEM FOR USING A SITUATIONAL NETWORK

CROSS REFERENCE TO RELATED APPLICATIONS

This application is a continuation of Ser. No. 17/902,427, filed Sep. 2, 2022, and entitled Method And System For Using A Situational Network, which is a continuation of Ser. No. 16/730,339 (now U.S. Pat. No. 11,470,682), filed Dec. 30, 2019, and entitled Method And System For Using A Situational Network, which is a continuation of Ser. No. 16/207,059 (now U.S. Pat. No. 10,524,307), filed Nov. 30, 2018, and entitled Method And System For Using A Situational Network, which is a continuation of Ser. No. 16/164,715 (now U.S. Pat. No. 10,375,759), filed Oct. 18, 2018, and entitled Method and System for Using a Situational Network, which is a continuation of Ser. No. 15/638,722 (now U.S. Pat. No. 10,117,290), filed Jun. 30, 2017, and entitled Method and System for Using a Situational Network, which is a continuation of Ser. No. 14/861,340 (now U.S. Pat. No. 9,877,345), filed Sep. 22, 2015, and entitled Method and System for Using a Situational Network, which is a continuation of Ser. No. 13/612,964 (now U.S. Pat. No. 9,143,535), filed Sep. 13, 2012, and entitled Method and System for Using a Situational Network, which is a continuation of U.S. patent application Ser. No. 13/274,712 (now U.S. Pat. No. 8,332,454), filed Oct. 17, 2011, and entitled Creating a Projection of a Situational Network, which is a divisional of U.S. patent application Ser. No. 11/924,711 (now U.S. Pat. No. 8,069,202), filed Oct. 26, 2007, and entitled Creating a Projection of a Situational Network, which claims the benefit of U.S. Provisional Patent Application No. 60/887,843, filed Feb. 2, 2007, entitled Situational Network. The entire disclosure of each of these applications is incorporated herein by reference.

This application is related to U.S. patent application Ser. No. 11/566,947, filed Dec. 5, 2006, entitled Aggregating Personal Information in a Personal Information Aggregator, the entire disclosure of which is incorporated herein by reference.

This application is related to U.S. patent application Ser. No. 11/924,706 (now U.S. Pat. No. 7,812,717), filed Oct. 26, 2007, entitled Situational Network; U.S. patent application Ser. No. 11/924,721 (now U.S. Pat. No. 8,045,455), filed Oct. 26, 2007, entitled Location Based Services in a Situational Network; U.S. patent application Ser. No. 11/924,727 (now U.S. Pat. No. 7,711,475), filed Oct. 26, 2007, entitled Use of a Situational Network for Navigation and Travel; U.S. patent application Ser. No. 11/924,731 (now U.S. Pat. No. 8,036,632), filed Oct. 26, 2007, entitled Access of Information using a Situational Network; U.S. patent application Ser. No. 11/924,741, filed Oct. 26, 2007, entitled Searchable Message Board; U.S. patent application Ser. No. 11/924,748 (now U.S. Pat. No. 8,249,932), filed Oct. 26, 2007, entitled Targeted Advertising in a Situational Network, U.S. patent application Ser. No. 12/731,413 (now U.S. Pat. No. 8,000,893), filed Mar. 25, 2010, entitled Use of a Situational Network for Navigation and Travel; U.S. patent application Ser. No. 13/253,374, filed Oct. 5, 2011, entitled Access of Information Using a Situational Network; U.S. patent application Ser. No. 13/274,687, filed Oct. 17, 2011, entitled Location Based Services in a Situational Network; U.S. patent application Ser. No. 13/274,696, filed Oct. 17, 2011, entitled Location Based Services in a Situational Network, and U.S. patent application Ser. No. 13/274,734, filed Oct. 17, 2011, entitled Notifications Using a Situational Network.

BRIEF DESCRIPTION OF THE DRAWINGS

The following detailed description will be better understood when read in conjunction with the appended drawings, in which there is shown one or more of the multiple embodiments of the present invention. It should be understood, however, that the various embodiments of the present invention are not limited to the precise arrangements and instrumentalities shown in the drawings.

In the Drawings:

FIG. 25 is an example of a propagation of a notification using a PIA in accordance with the SitNet of FIG. 1;

FIG. 26 is an example of a method of connecting to a weather-dependent social network in accordance with the SitNet of FIG. 1;

FIG. 31 is an example of an event relative embodiment of a SitNet;

FIG. 32 is an example of presenting a roll call to a user in accordance with the SitNet of FIG. 1;

FIG. 33 is an example of a searchable message board that can be used in accordance with the SitNet of FIG. 1;

DETAILED DESCRIPTION

Figure 1:
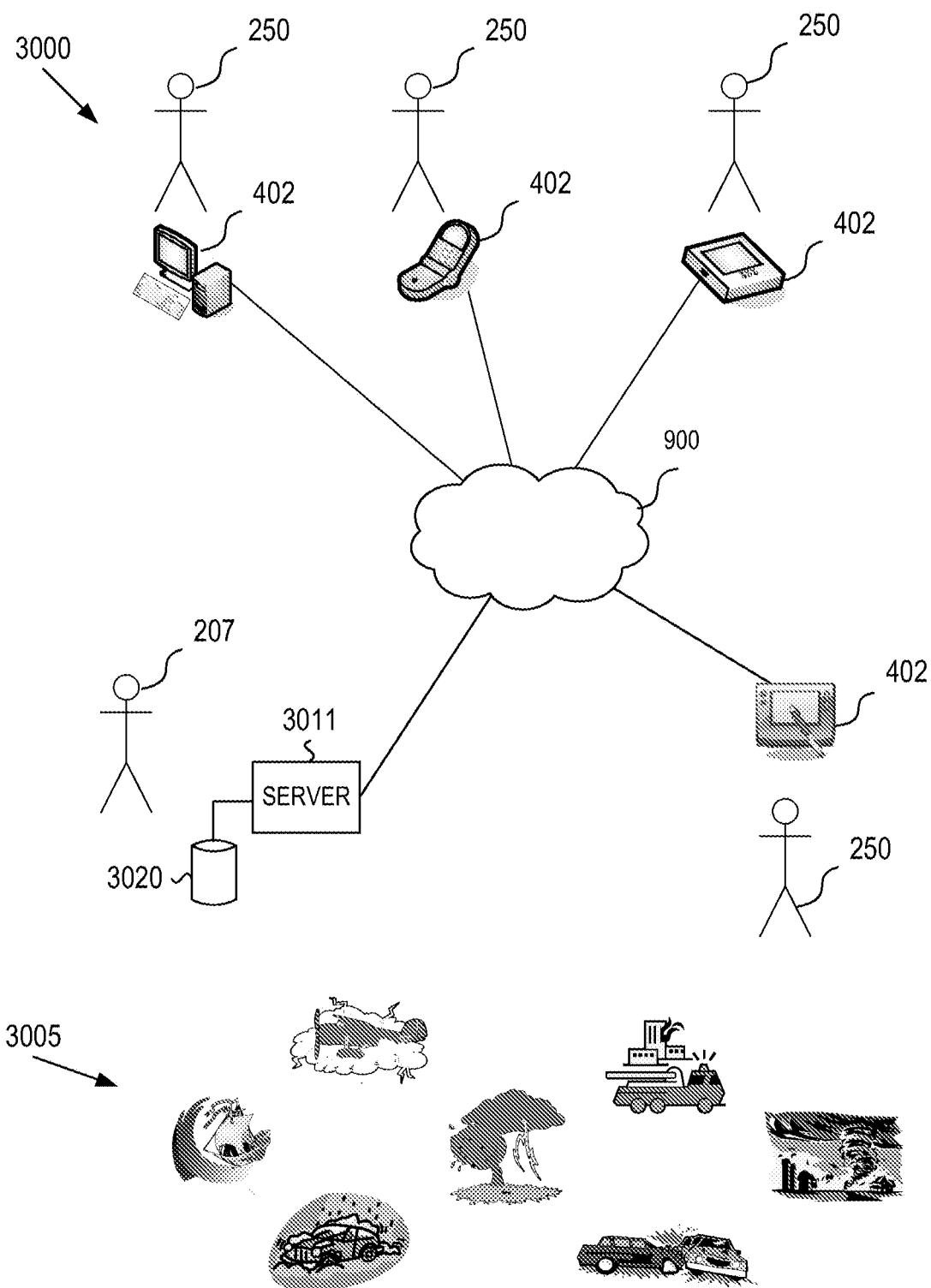
FIG. 1 is a network diagram of an embodiment of a Situational Network (SitNet)

Certain terminology is used herein for convenience only and is not to be taken as a limitation on the embodiments of the present invention. In the drawings, the same reference letters are employed for designating the same elements throughout the several figures.

The words "right", "left", "lower" and "upper" designate directions in the drawings to which reference is made. The words "inwardly" and "outwardly" refer to directions toward and away from, respectively, the geometric center of the situational network and designated parts thereof. The terminology includes the words above specifically mentioned, derivatives thereof and words of similar import.

Unified Modeling Language ("UML") can be used to model and/or describe methods and systems and provide the basis for better understanding their functionality and internal operation as well as describing interfaces with external components, systems and people using standardized notation. When used herein, UML diagrams including, but not limited to, use case diagrams, class diagrams and activity diagrams, are meant to serve as an aid in describing the embodiments of the present invention, but do not constrain implementation thereof to any particular hardware or software embodiments. Unless otherwise noted, the notation used with respect to the UML diagrams contained herein is consistent with the UML 2.0 specification or variants thereof and is understood by those skilled in the art.

Referring generally to FIG. 1, a situational network 3000 is created when an occurrence or expected occurrence of an event or situation 3005 causes connections, also referred to as links, to be established between, within or among a set of participants 250, 207. The situational network allows the participants 250, 207 to interact and exchange information over connections to or through a computer network 900 regarding the event or situation 3005. Some or all of the participants included in the situational network (SitNet) 3000 may have no prior knowledge of or connection or contact with each other or other participants of the situational network through any other type of social network or personal interactions.

In the context of the situational network 3000, the participants may include external entities 207, also called situation authorities, central authorities or trusted providers, that generally are able to aggregate and provide comprehensive information related to the situation. Situation authorities 207 include, but are not limited to news organizations, such as news agencies (e.g., CNN), weather agencies (e.g., The Weather Channel), traffic agencies (e.g., Traffic.com), emergency relief organizations (e.g., The American Red Cross), and government agencies (e.g., local fire departments, state Departments of Transportation, Federal Emergency Management Agency (FEMA)).

There is a corresponding situation authority server 3011, also referred to as an event node server, for each situation authority 207. The situation authority server 3011 may be connected to a database 3020 for storing information related to the situation 3005, or data related to other participants in the SitNet 3000.

Participants in the SitNet 3000 also include users 250, which are alternately referred to as individuals or members. Users 250 are connected via the situational network 3000 using devices 402 such as cell phones, PDA's, personal computers, network servers, PVR's, in-vehicle and portable navigation systems, or other devices generally known to those skilled in the art that enable connection to, from and through the computer network 900. There is at least one device 402 corresponding to each user 250, although a user 250 may use more than one device 402 to access and share information within the situational network 3000. The devices 402 may be connected into the situational network 3000 automatically, by requesting a connection, or by receiving an invitation to connect, each of which is described in greater detail below.

The connections, or links, established in forming and sustaining the situational network 3000 may be persistent or temporary. A persistent connection allows participants to exchange information without requiring the user to re-authenticate, re-authorize, or re-create the connection. Temporary connections require one or both sides of the link to re-authenticate or re-authorize the connection each time information is to be sent or received. Some temporary links may enable one-time use, such that a new connection, including authorization or authentication, is created each time information is passed between the participants.

Examples of events or situations 3005 that might initiate the formation of a situational network include weather phenomenon, such as hurricanes, tornadoes, severe thunderstorms, or winter storms; emergency situations, such as building fires, aircraft crashes, or toxic substance releases; natural disasters, such as earthquakes, tsunamis, or floods; weather related activities, such as skiing or surfing; navigation and/or travel incidents, such as road closures or construction, vehicle accidents, traffic congestion, roadway debris, or air turbulence; and public health crises, such as disease outbreak. Many of these event types are interrelated. For example, there a high correlation between vehicle accidents and freezing precipitation. Thus, it is possible to anticipate or pre-form a situational network based on an expected weather condition or forecast or anticipated road construction.

If the event or situation is not stationary or changes over time (e.g., in scope or location), such as a weather event with a time-dependent trajectory or size, the participants in the situational network may also change as the situation evolves over time. This embodiment is referred to as an event relative or dynamic SitNet. A change in the characteristics, either actual or forecast, associated with the situation are used to determine which users should be connected to or disconnected from the SitNet. Examples of characteristics for a weather phenomenon include location, size, shape, speed, precipitation rate, wind velocity, and trajectory. Some examples of characteristics that may be associated with navigation situations include location, altitude, visibility, length of traffic backup, and road surface conditions. In one embodiment, the users are connected or disconnected to the SitNet based on their movement relative to the situation.

Referring to FIG. 31, an example of an event relative SitNet is shown for two different times T1 and T2. At time T1, participants B, D, E, and H are connected to a situation authority in SitNet 3001 that has been established for a cluster of severe thunderstorms 3003. At time T2, in response to the changes in the location and shape of the thunderstorm cluster 3003, participants A, C, F, and I have been added to the SitNet 3001, and participants B, D, and H have been disconnected. Participant E is included in the SitNet 3001 at both time T1 and T2.

Figure 36:
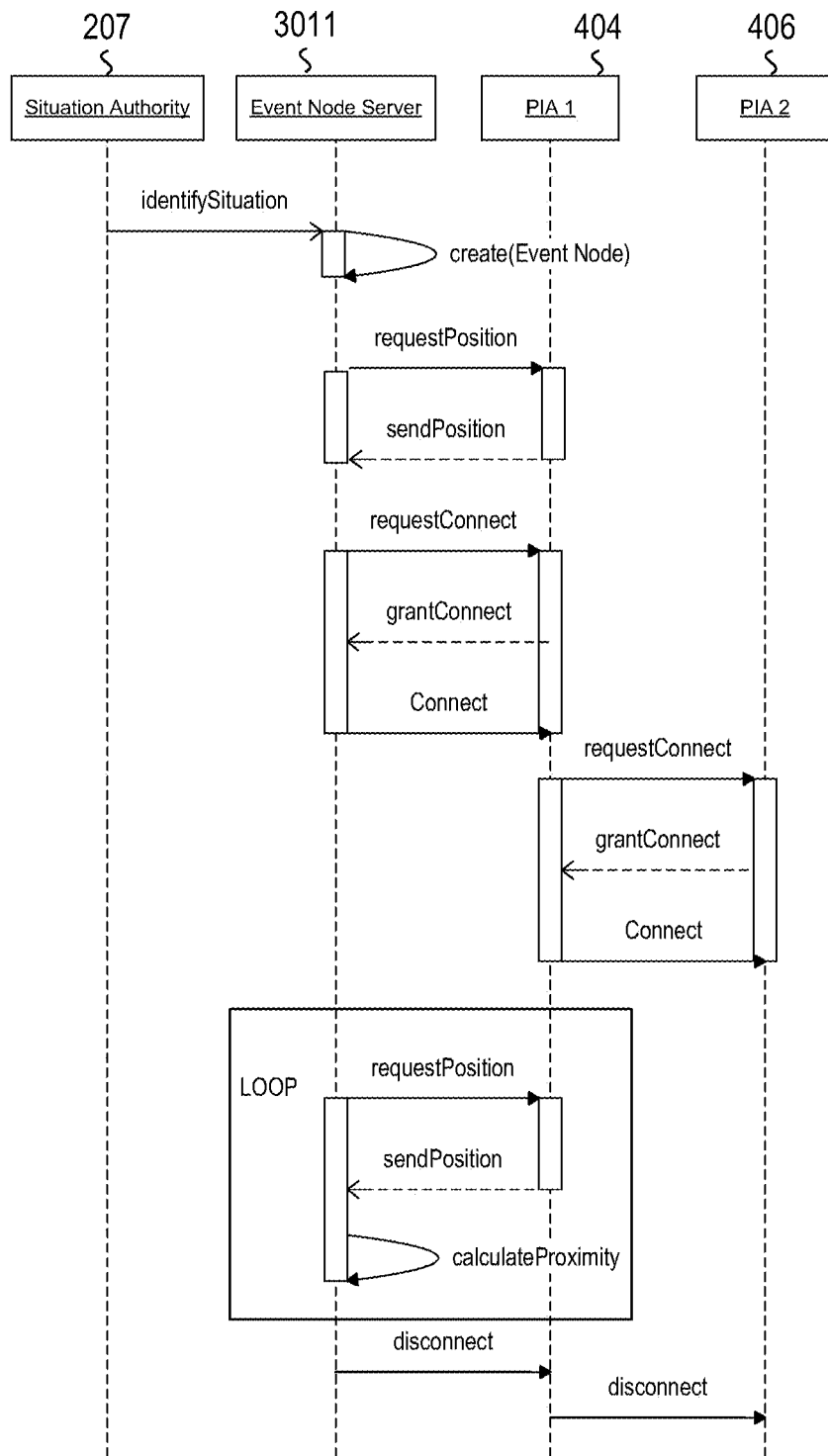
FIG. 36 is a sequence diagram in accordance with the SitNet of FIG. 1.

Referring to FIG. 36, the event relative embodiment of the SitNet has a dynamic set of user connections in which links between the participants in the situational network are added or removed as the situation or event changes its geographic location or as the user changes his position relative to the situation. User devices 404, 406 are connected into the situational network when it is determined that users of the devices 404, 406 are affected by the event or situation. Similarly, users are disconnected from the situational network as the event or situation moves away, the users move away from the situation, or the users are no longer determined to be affected by the event or situation. For example, due to the uncertain nature of hurricane trajectory prediction, the list of users connected to the SitNet may change for each updated forecast of the hurricane, with users determined to be out of the projected hurricane path being disconnected from the SitNet while other users included in the projected hurricane path are added. As the hurricane passes, some users may be disconnected from the network if their area was not adversely affected, while those affected by the storm may remain connected to the SitNet or even be disconnected from the event relative SitNet and invited to connect to a different SitNet for those affected by the Hurricane, possibly requiring emergency assistance or aid by a relief agency.

A SitNet may be formed when users involved in a situation or event are determined to be in relatively close geographic positions. If the SitNet is not pre-formed or anticipated by the event or situation, but its formation is a result of the occurrence of the event or situation causing the potential members of the SitNet to be within a relatively small geographic area, such embodiment of the SitNet may be referred to as a proximity based SitNet. A proximity based SitNet may be established without the involvement of a situation authority or the creation an event node, described in greater detail below. User devices, such as Personal Information Aggregators (PIAs), discussed in greater detail below, containing a GPS or other geographic positioning devices generally understood by those skilled in the art, can share location coordinates to determine if they are within a proximity limit that has either been preset within the device or predetermined by the user. In one embodiment, PIAs crawling a multi-dimensional personal information network (NDSN), discussed in greater detail below, can locate other PIAs with the same proximity if the PIAs are allowed to share their location coordinates. The users may have no previous interaction or knowledge of each other, but may be related thought their PIAs by a high order separation of nodes in the NDSN (i.e., their PIAs may have indirectly changed information as described below). For example, while traveling internationally, several people without any other prior personal connection or relationship are coincidentally delayed at the same airport. They are alerted to the proximity of the other users by their PIAs which have established that they share something in common, such as currently reside in the same town, state or county, or have attended the same school or university. A SitNet can be formed through connections established through the PIAs, possibly resulting in a personal meeting between the individuals.

A proximity based SitNet may be established in response to a request for goods or services (i.e. the need for goods or services is the situation) by an individual. A device associated with an individual broadcasts a message containing a request for goods and/or services. The message also includes positional coordinates. Other devices receiving the request within a close proximity to the requesting device may establish a connection with the requesting device to provide information about the rendering of the service or the availability of the goods. The devices may also be used to facilitate a personal meeting between the device users if the rendering of the service or procurement of goods requires such a meeting. The connections in the SitNet are maintained until the service has been completed by one user with a responding device, or until the goods have been obtained.

Figure 43:
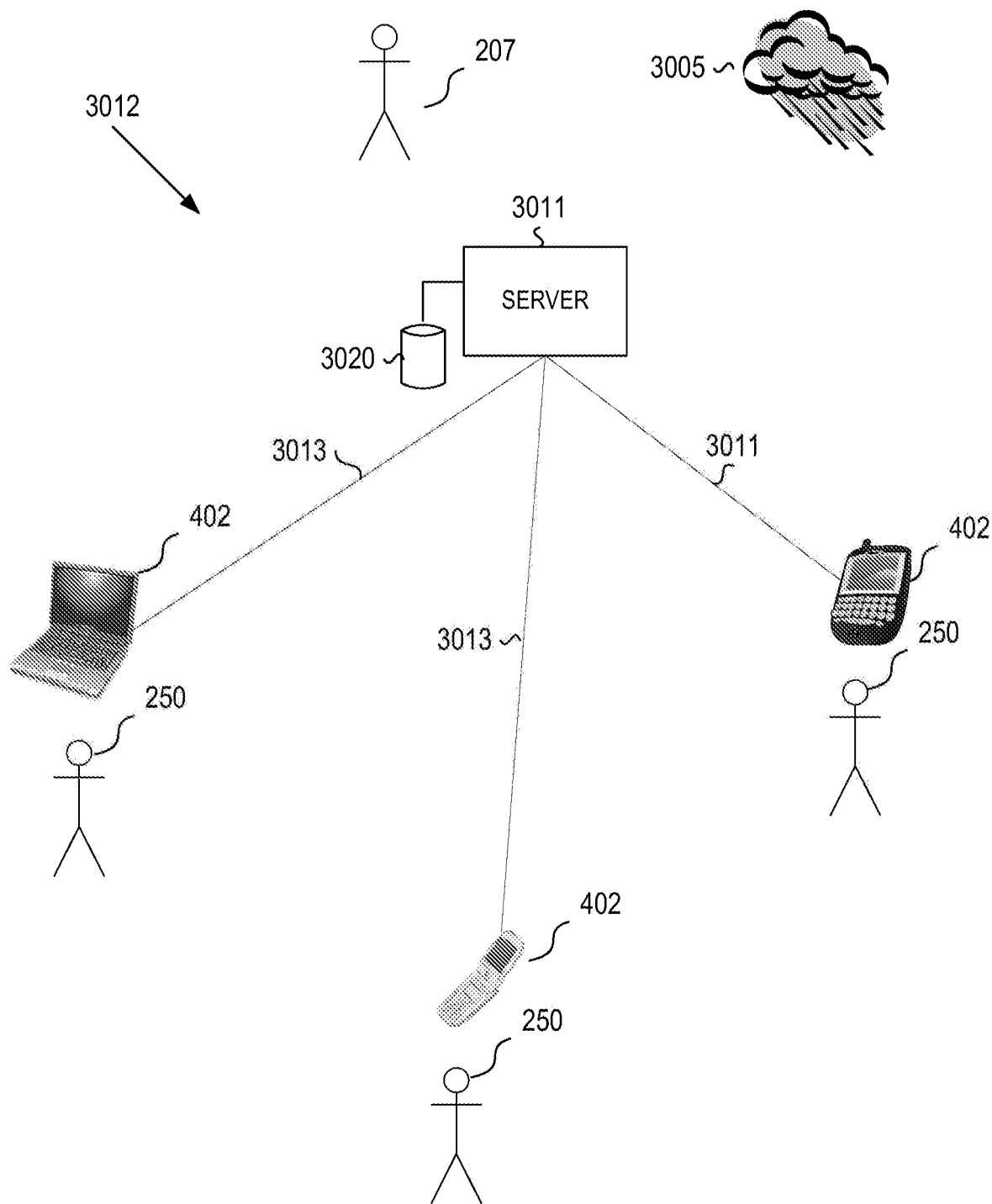
FIG. 43 is a network diagram of an alternative embodiment of a SitNet.

A variety of different architectures may be used to connect the devices of participants in the situational network. In one embodiment, a situational network may be formed using a centralized architecture. Referring to FIG. 43, in a centralized architecture embodiment, user devices 402 in the SitNet 3012 corresponding to users 250 are connected using centralized connections 3013 to a situation authority server 3011 associated with a situation authority 207. Information related to the situation 3005 is shared between the situation authority 207 and the users 250. Information originating from a user 250 in the SitNet 3012 and related to the situation 3005 may be shared with other users 250 in the SitNet 3012 via the situation authority 207. The situation authority 207 may distribute the information as received from the users 250 via the centralized connections 3013 between the situation authority server 3011 and the user devices 402 or perform a verification of the information before distributing the information to the users 250 of the SitNet 3012 through the centralized connections 3013.

Figure 44:
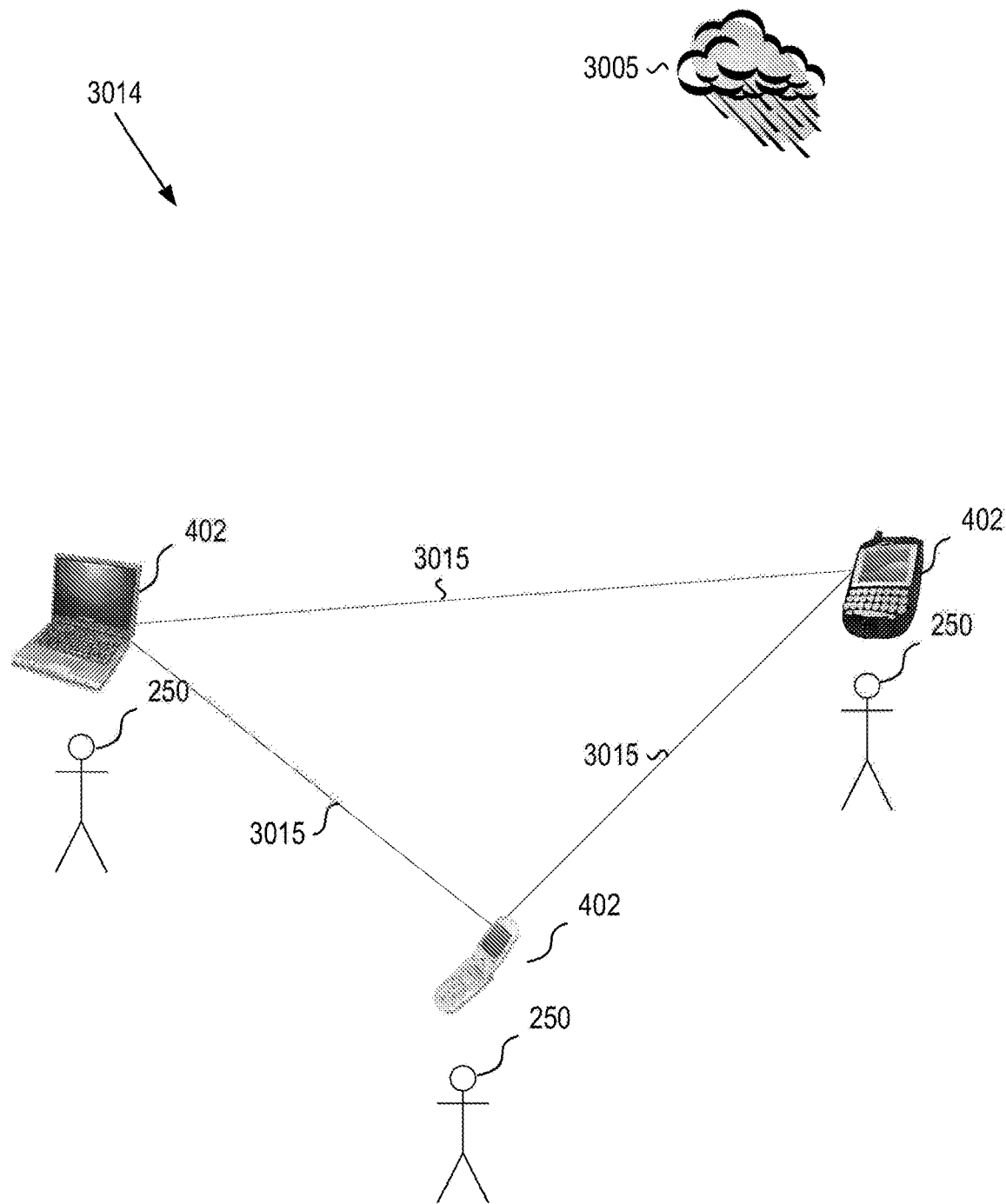
FIG. 44 is a network diagram of an alternative embodiment of a SitNet.

Referring to FIG. 44, the situational network may also be formed using a decentralized architecture, such as a peer-to-peer network understood by one skilled in the art. In FIG. 44, user devices 402 of SitNet 3014 corresponding to users 250 are connected to each other through peer-to-peer connections 3015. The user device 402 may be connected at the same time to more than one other user device 402. Information related to the situation 3005 is shared using the user devices 402 directly between users 250 using the peer-to-peer connections 3015. Information can be distributed from a user 250 to all other users or a subset of the users in the SitNet 3014.

In one embodiment, the situation authority acts as a participant in the peer-to-peer network. While the situation authority may act as an important source of information, it does not act as the central authority or host, as would be found in the centralized architecture described above.

Figure 45:
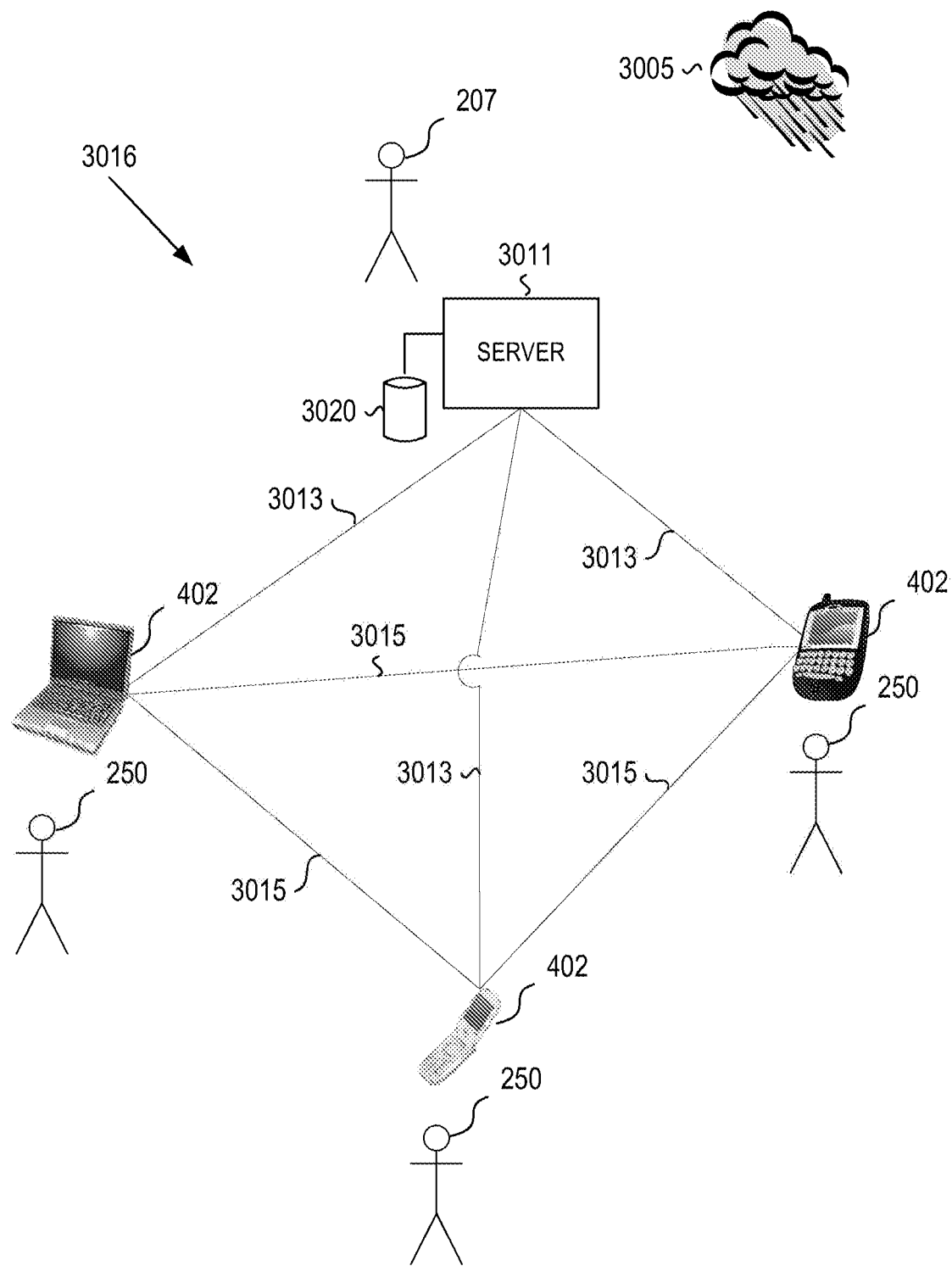
FIG. 45 is a network diagram of an alternative embodiment of a SitNet.

Referring to FIG. 45, both centralized and decentralized architectures may be utilized to form a combined architecture for the situational network. In FIG. 45, the user devices 402 in the SitNet 3016 are connected to the situation authority server 3011 using centralized connections 3013. The user devices 402 are also interconnected with each other using peer-to-peer connections 3015. In the event that the situation authority server 3011 becomes disabled or connectivity between the situation authority 207 and the users 250 is lost, the peer to peer connections 3015 that have been established between the users 250 or corresponding user devices 402 can still allow vital situation information to be exchange between users 250. In one embodiment, the situation authority 207 facilitates the formation of the peer-to-peer connections 3015 by providing users 250 with some type of indication of other users 250 also connected to the situational network 3016 through the situation authority server 3011. One such indication may be a projection of nodes of the SitNet 3016, described in greater detail below.

Figure 39:
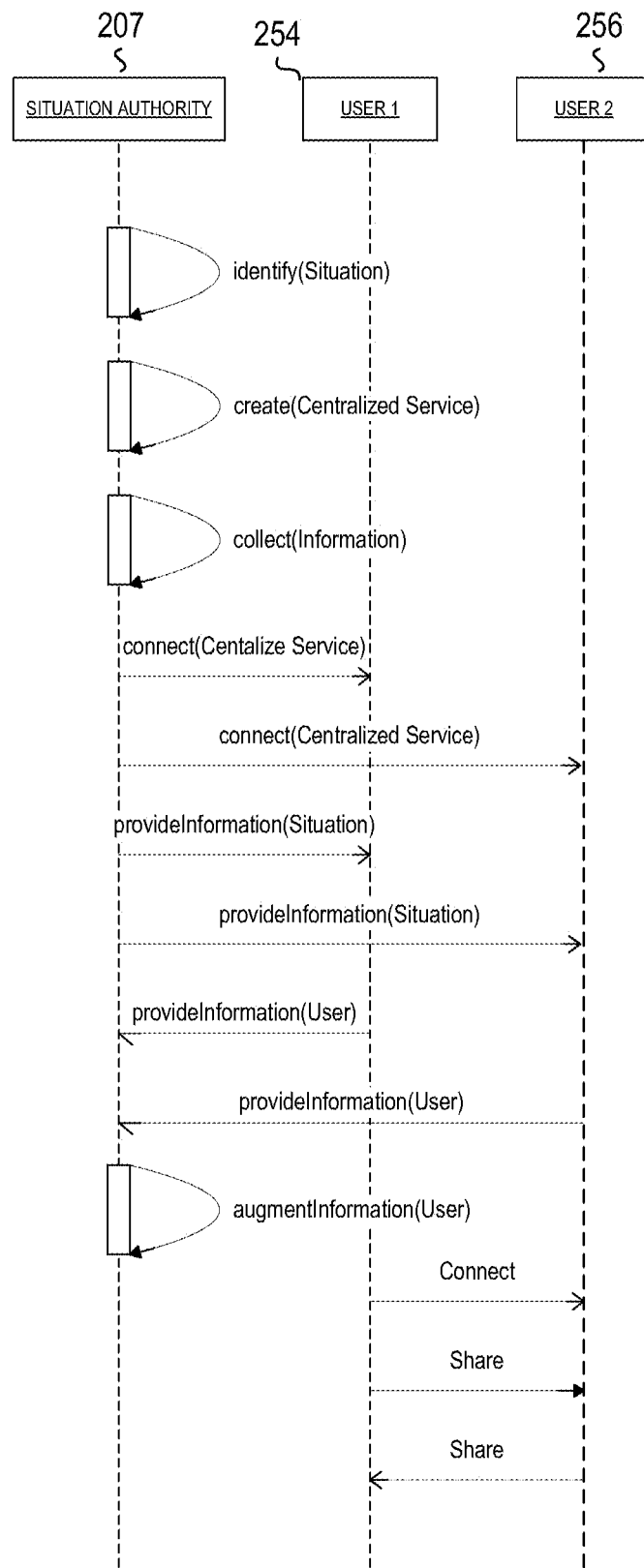
FIG. 39 is a sequence diagram in accordance with the SitNet of FIG. 1.
Figure 41:
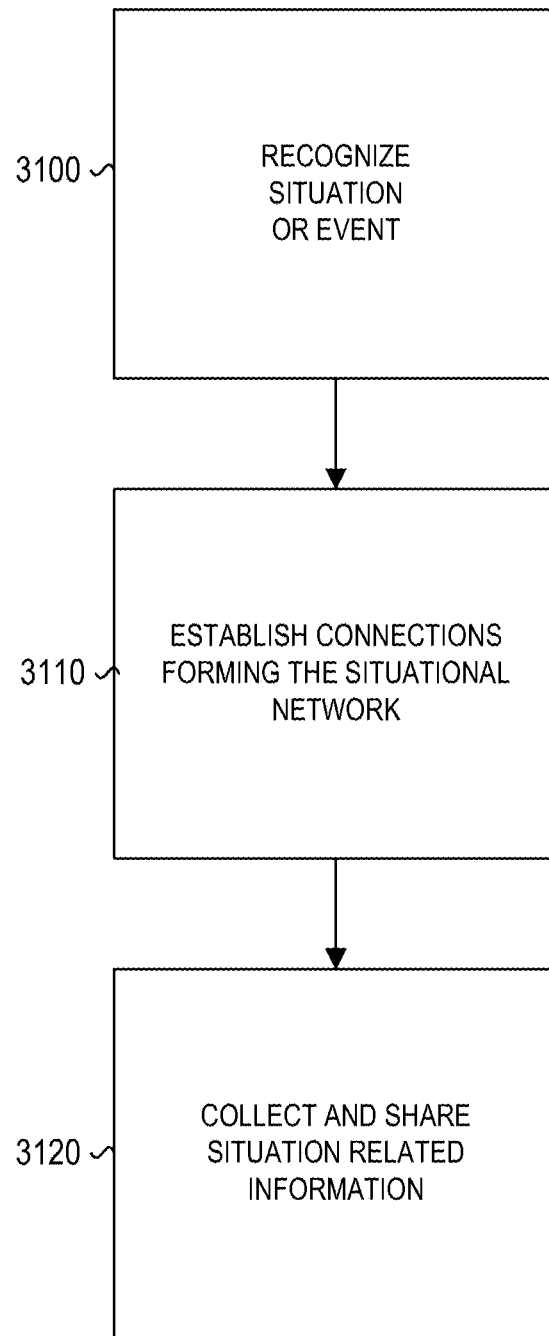
FIG. 41 is a flow diagram in accordance with the SitNet of FIG. 1.

Regardless of the architecture used to form and sustain the situational network, the situational network is generally formed according to the process outlined in FIG. 41, which includes a recognition or identification of a situation 3100, a connection of participants 3110, and a sharing of information related to the situation 3120. This is also demonstrated in FIG. 39, where the situation is identified by situation authority 207. Users 256, 256 and situation authority 207 are all interconnected, and able to exchange information. Furthermore, those skilled in the art will recognize that any of the available architectures (e.g., centralized, peer-to-peer, or combination thereof) may be used to form and sustain the various embodiments of the situational network described above, including the event relative (dynamic) SitNet or the proximity based SitNet. Certain architectures may be more applicable to certain embodiments. For example, the peer-to-peer architecture may naturally be used to form a proximity based SitNet described previously due to the inherent nature of the proximity SitNet. Nonetheless, those skilled in the art will recognize that a centralized or combination architecture may also be used for the proximity based SitNet depending on the particular situation and/or connections available.

In one embodiment, the situational network may be established using the framework of an N-dimensional social network (NDSN), also referred to hereafter as a multi-dimensional personal information network, as described in detail below. In this embodiment, users are connected into the situational network through the NDSN using a PIA. In the context of the NDSN, a PIA associated with each user is or encompasses a node of the situational network. The situation or event itself may also be associated with a node on the SitNet, known as the event node for the SitNet. For example, an entity, such as a trusted provider of information (e.g., a news source such as CNN or weather.com), establishes an event node in an NDSN that propagates up-to-date information on the situation to PIAs of the NDSN connected to that event node. In one embodiment, the SitNet may have more than one event node.

Figure 2:
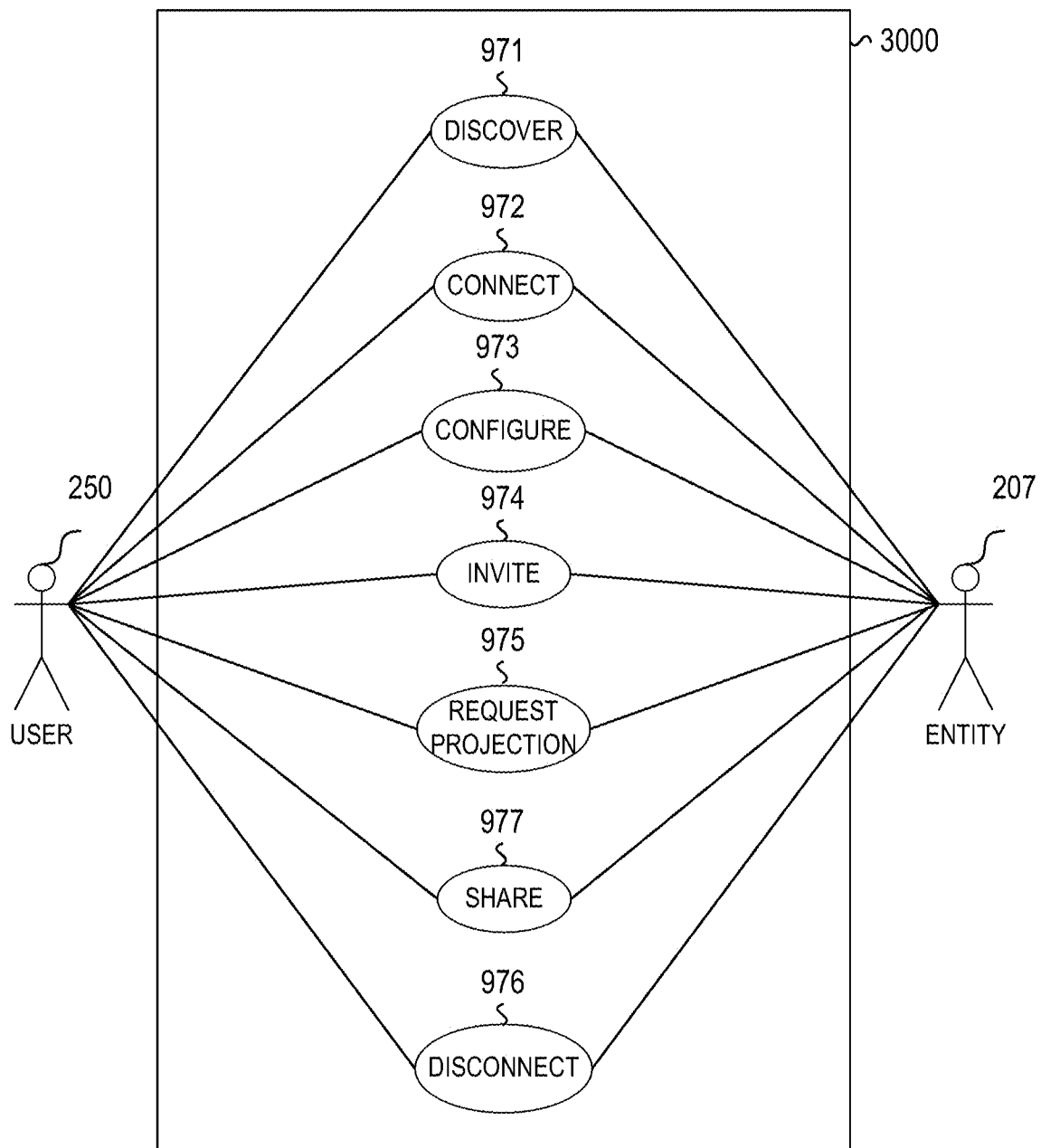
FIG. 2 is a use case diagram for the SitNet of FIG. 1.

Referring to FIG. 2, user PIAs connected to an event node using the connect use case 972 in the SitNet 3000 may discover each other using the discover use case 971, described below. Personal or situation relevant information is shared between the users using the share use case 977. In addition, connections between PIAs, also called links, may be established where one or both of the PIAs are not linked directly to the event node, wherein a direct link to the event node is also referred to as a first order connection. In one embodiment, the SitNet can be formed in the absence of an event node, such as in a de-centralized (peer-to-peer) architecture as described above.

A Personal Information Aggregator (PIA) provides a user with the ability to store, organize and control personal information. The PIA obtains personal information that may be controlled by separate entities (e.g., credit reporting agencies, financial institutions and merchants), aggregates the information and organizes the information in manners that have been selected by the user. The user controls access to the personal information stored in the PIA by authorizing access by other entities to subsets of the personal information stored in the PIA. In many cases, the use of the authorized information is bound and restricted by legal contract, and therefore, the user has legal remedies available to enforce proper use of the information.

The user of a PIA can be any person, group or entity that wishes to manage and control his (or its) personal information. For example, a family can use a PIA to aggregate personal information that the family members have in common (place of residence, family vacations, etc.).

An entity that accesses the information stored in a PIA can be an individual person, a group, entity or equipment (e.g., digital video recorder) or software (e.g., web browser) that has been configured to access the PIA. The nature and composition of a group that accesses a PIA can encompass a broad range of organizations, e.g., a health clinic, an auto dealership, a coin collectors club, etc.

The personal information obtained by and/or stored in a PIA encompasses a broad array of types of information about a person's life, social interactions, health and healthcare, consumer behavior including consumer purchases, entertainment consumption and habits, fitness activity, travel, financial, employment, education, hobbies and personal computing and/or other aspects of a person's world that can be reduced in any way to data. The personal information stored in the PIA is obtained from a variety of sources, including input data feeds that are generated by providers of goods and services, healthcare providers, organizations, clubs, social contacts and other persons and entities. In addition, personal information stored in the PIA may be entered directly by the user.

In some cases, there may be data regarding the user that is contained on the Internet, private networks, or in personal data storage. In one embodiment, the PIA "crawls" such networks or storage areas, searching for information to add to its store of personal information associated with the user.

A community information aggregator (CIA) performs functions that are similar to those of a PIA for a community of users (e.g., an association of architects or a chess club) A CIA provides a community with the ability to store, organize and control information associated with the community and personal information associated with members of the community. The CIA obtains, aggregates and organizes such information, and makes the information available to other authorized entities in a manner similar to that described herein with respect to PIAs.

A CIA may obtain data by searching other sources of information, e.g., web sites on the Internet. In one embodiment, a CIA gathers information about a user that is not published by that user's PIA by crawling public and/or private information sources. In one embodiment, a marketer's CIA uses a known piece of information about a user to search for and store additional information about the user. For example, a user's known e-mail address can be used to locate Internet postings of product reviews, blog postings and comments, listings in membership directories or other information associated with the user. This additional information could be used as input for recommendations targeted to the user.

A user controls the information coming in to the PIA by granting authorization to desired sources and denying authorization to unwanted sources. The source of the information may request authorization to provide information to the PIA. Alternatively, the user or the PIA may initiate the operation of receiving data from a source. The authorized information received by the PIA is organized and stored in the PIA. The PIA generates composite and derived output data feeds from the stored personal information.

These data feeds may be accessed by providers of goods and services, healthcare providers, communities (e.g., organizations and clubs), social contacts, CIAs, other PIAs and other persons and entities if authorized by the user. In some embodiments, the PIA can be configured to notify the user or automatically reject requests from entities known to be invalid, such as spammers.

Figure 3:
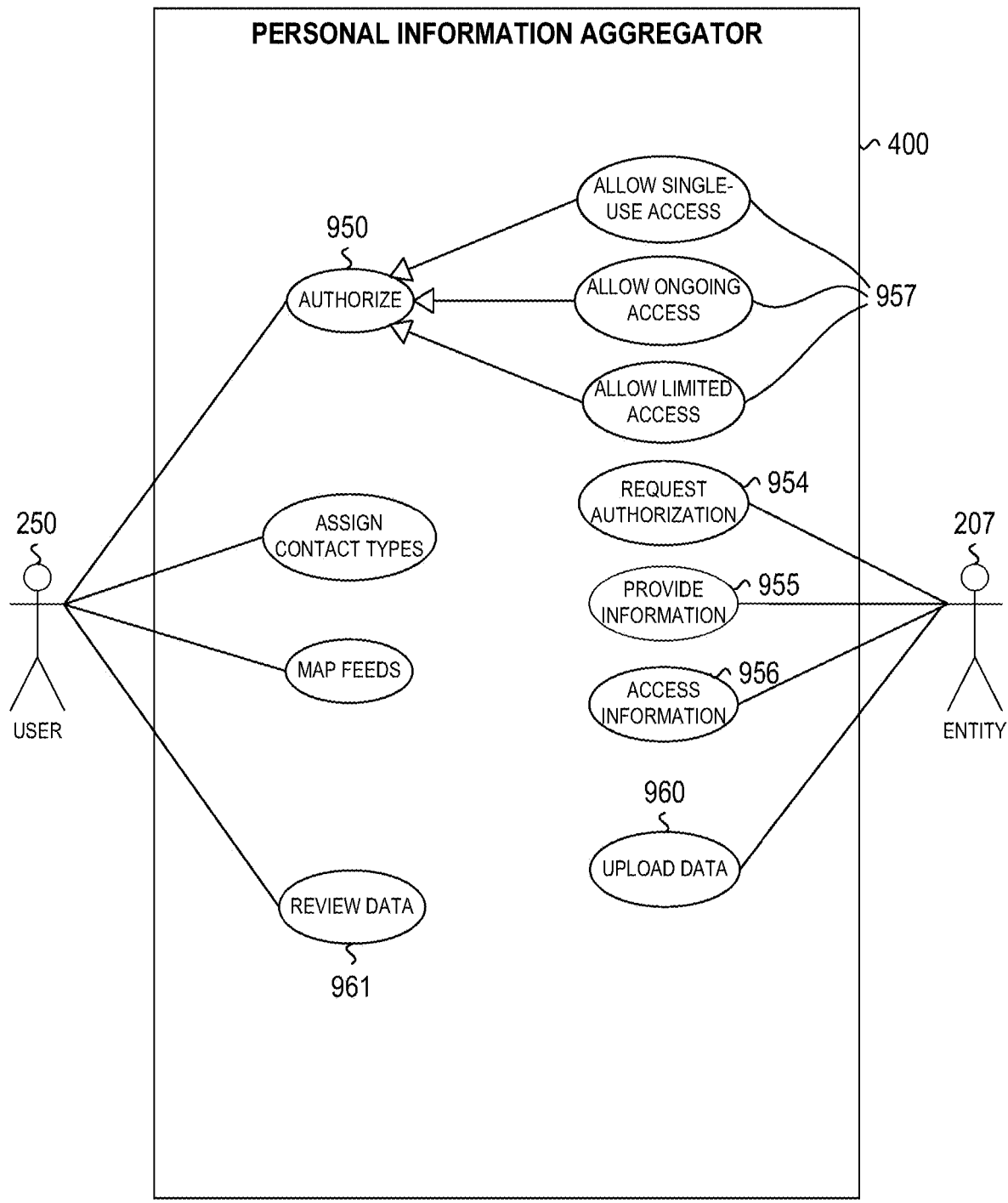
FIG. 3 is a use case diagram for a personal information aggregator (PIA) used in accordance with the SitNet of FIG. 1.

Referring to FIG. 3, an entity 207 requests authorization for access to a user's PIA 400 by using the Request Authorization use case 954. The user 250 can authorize the request using one of the access type use cases 957 (e.g., Allow Single-use Access, Allow Ongoing Access, Allow Limited Access) of the Authorize use case 950. If authorized, the entity 207 may access the requested output data feed of personal information if the request was for access by using the Access Information use case 956. Similarly, the entity 207 may provide information to the requested input data feed of the PIA if the request was to provide data by using the Provide information use case 955. It should be noted that an entity 207 is not limited to authorization for a single feed, nor is an entity 207 limited to an exclusively input or output role. Rather, an entity 207 may have authorization to concurrently access one or more input data feeds and provide data to one or more input data feeds.

Figure 4:
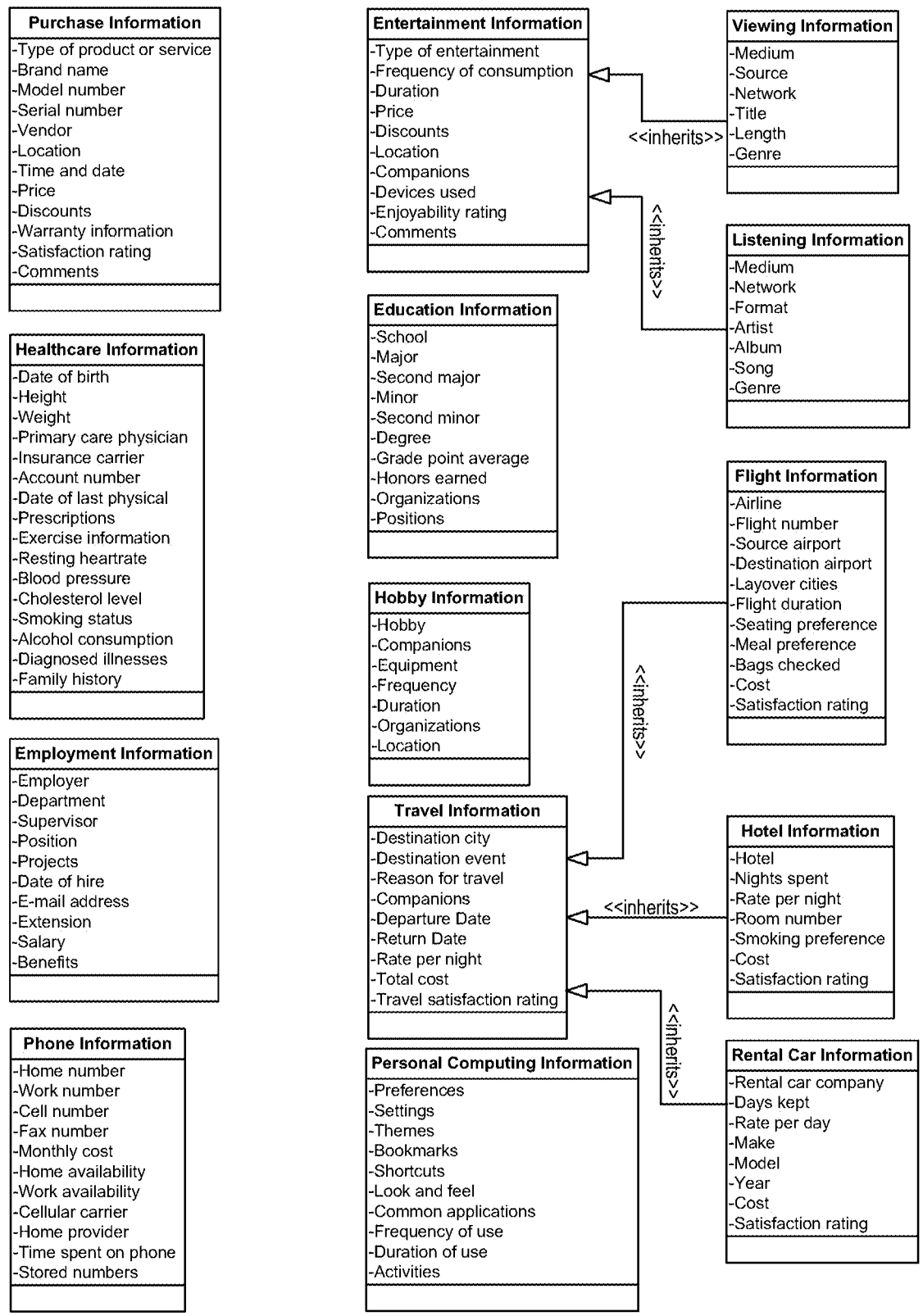
FIG. 4 is a class diagram for the structure of the personal information stored in the PIA used in accordance with the SitNet of FIG. 1.

The personal information stored by the PIA may reside in data structures that are implemented as tables in a relational database management system (DBMS) and that can be accessed by the PIA's application program. FIG. 4 illustrates an example of data structures used to store the personal information in a PIA. In FIG. 4, each data structure used to store information in the PIA is represented by a programming class in an object-oriented language (e.g., Java or C++), and the type of information stored in the PIA for each class of data is represented by the attributes of the class.

Those skilled in the art will recognize that there are many types of personal information that can be stored in the PIA 400. Similarly, the design of the data structures used to store the information can vary greatly, depending on various factors such as the design requirements for the PIA (e.g., response time) and the selected platforms used to implement the PIA (e.g., DBMS, operating system, etc.).

An Upload Data use case 960 (see FIG. 3) allows entities 207a to upload data to be stored in the PIA 400; the Review Data 961 use case allows the user 250 to review the uploaded data.

In one embodiment, the user 250 controls access to both the input and output data feeds of the PIA. Specific authorization must be granted to allow an input data feed to be accepted by the PIA 400. Similarly, specific authorization must be granted to allow access to an output data feed provided by the PIA. Authorization can be granted by various mechanisms. Those skilled in the art will recognize that an authorization request may be sent to the PIA using a wide variety of available hardware and technologies generally known in the art.

Authorization may be granted only for a "single use" of a data feed. For example, a user might grant authorization for an insurer to access a composite "Medical Record" output data feed for only a single use in order to process an insurance claim. Alternatively, the authorization might also be contingent upon the agreement that any data received from the output data feed is to be destroyed after the single use of the data.

The authorization request might also specify a "nature of use" for the requested data. For example, a healthcare provider might specify in an authorization request that the data will only be used by a specified doctor during a specified episode of care.

Authorization might be granted for only a portion of the requested data. This situation might be handled by creating one or more data feeds that contain only the authorized subset of the requested data.

Figure 5:
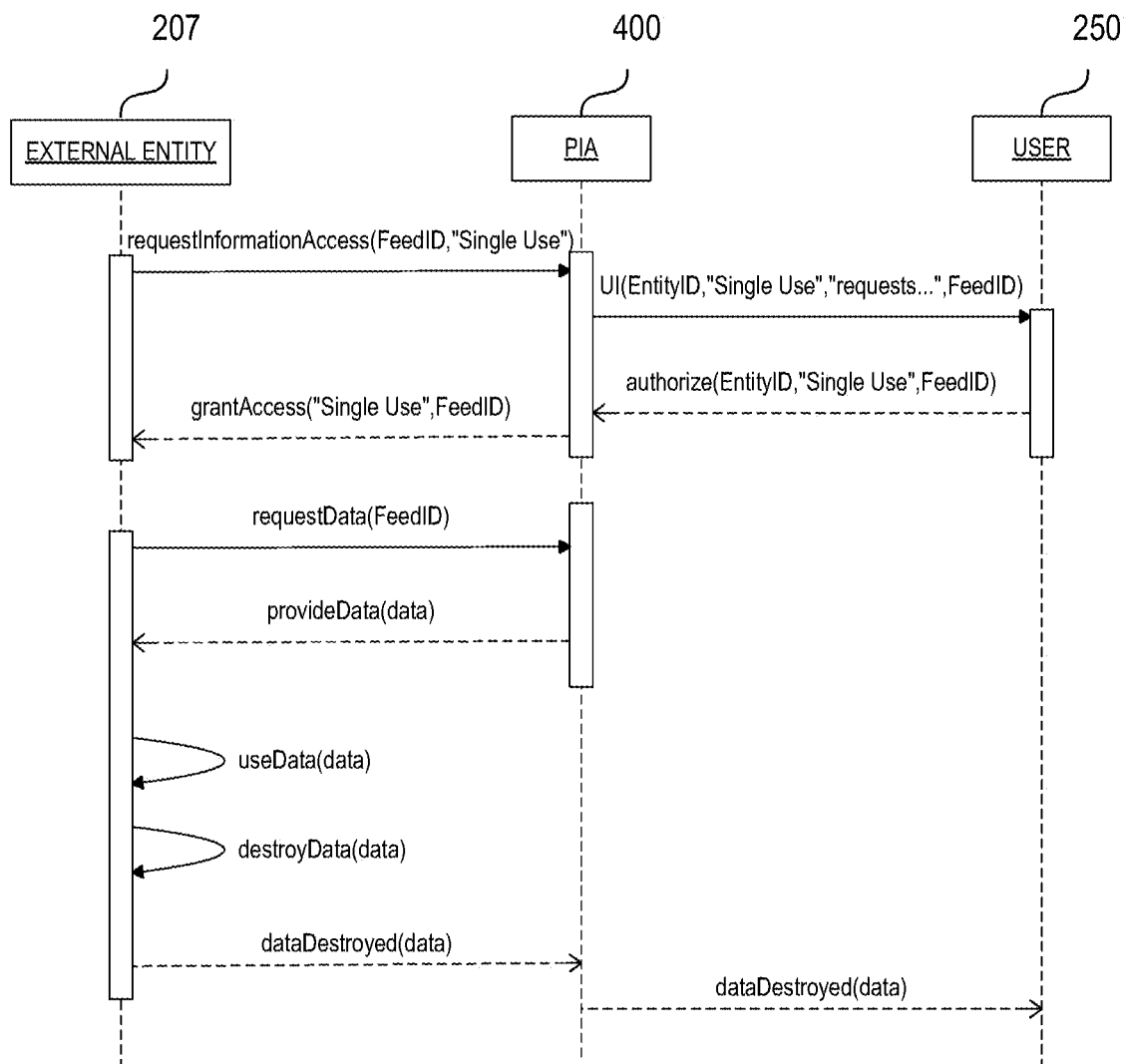
FIG. 5 is a sequence diagram for the interactions associated with a PIA single-use authorization request to receive data from the PIA used in accordance with the SitNet of FIG. 1.

FIG. 5 depicts the interactions associated with a PIA single-use authorization request in one embodiment of the invention. The External Entity 207 sends a requestInformationAccess message to the PIA 400, with arguments indicating the requested data feed (FeedID) and the nature of the request ("Single Use"). Upon receiving the request from the External Entity 207, the PIA 400 sends a UI message to the user 250. The arguments of the UI request provide the ID of the entity (EntityID), the nature of the request, the ID of the requested data, and the text to be displayed to the user ("requests . . . "). The User 250 responds by sending an authorize message to the PIA 400, passing back in the message's arguments the entity's ID, the nature of the authorization ("Single Use"), and the data feed (FeedID) for which authorization is granted. The PIA 400 notifies the External Entity 207 that the authorization has been granted by sending it a grantAccess message with arguments indicating the nature of the authorization and the data feed for which authorization is granted.

After receiving notification of the authorization, the External Entity 207 sends the PIA 400 a requestData message with an argument specifying the data feed that is being requested. If the feed ID matches that for which authorization has been granted, the PA 400 responds by sending the requested data to the External Entity 207 in a provideData message. After receiving the requested data from the PIA 400, the External Entity 207 uses the data (useData). Since the authorization was for a single use, the External Entity 207 destroys the data (destroyData) after its use. To notify the PIA 400 of the data's destruction, the External Entity 207 sends a dataDestroyed message, which the PIA 400 passes on to the User 250. In one embodiment, the PIA 400 might utilize a timer to remind itself to check for notification that the data has been destroyed, and to send a message to the user 250 if not notified within a prescribed time period.

Figure 6:
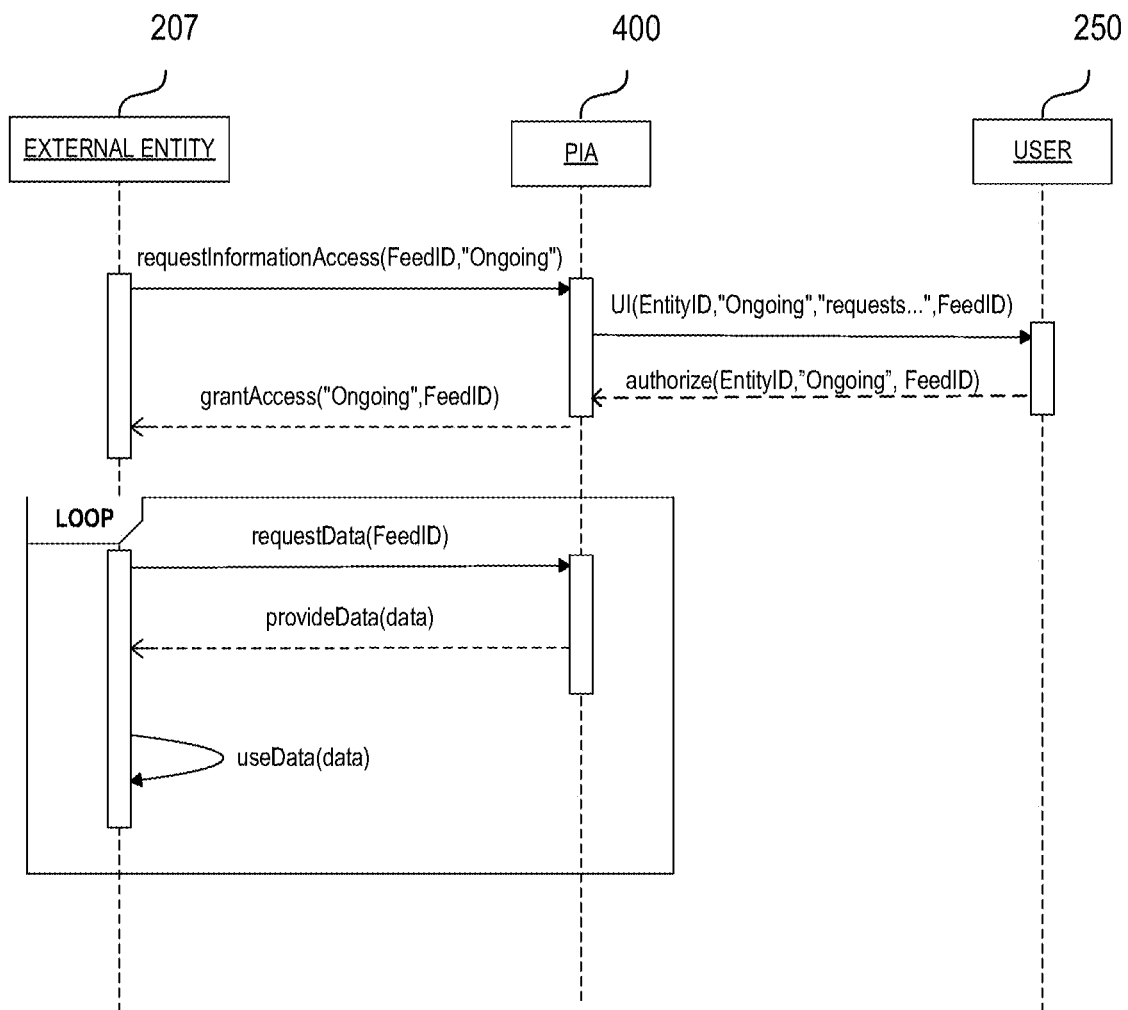
FIG. 6 is a sequence diagram for the interactions associated with a PIA ongoing-use authorization request to receive data from the PIA used in accordance with the SitNet of FIG. 1.

FIG. 6 depicts the interactions associated with an ongoing-use authorization request in one embodiment of the invention. The External Entity 207 sends a requestInformationAccess message to the PIA 400, with arguments indicating requested data feed (FeedID) and the nature of the request ("Ongoing"). Upon receiving the request from the External Entity 207, the PIA 400 sends a UI message to the user 250. The arguments of the UI request provide the ID of the entity (EntityID), the nature of the request, the requested data feed, and the text to be displayed to the user ("requests . . . "). The User 250 responds by sending an authorize message to the PIA 400, passing back in the message's arguments the entity's ID, the nature of the authorization ("Ongoing"), and the data feed for which authorization is granted. The PIA 400 notifies the External Entity 207 that the authorization has been granted by sending it a grantAccess message with arguments indicating the nature of the authorization and the data feed for which authorization is granted.

After receiving notification of the authorization, the External Entity 207 sends the PIA 400 a requestData message with an argument specifying the data feed that is being requested. If the feed ID matches that for which authorization has been granted, the PIA 400 responds by sending the requested data to the External Entity 207 in a provideData message. After receiving the requested data from the PIA 400, the External Entity 207 uses the data (useData). Since the authorization is for ongoing access, this cycle of a requestData message followed by a provideData message continues indefinitely.

Figure 7:
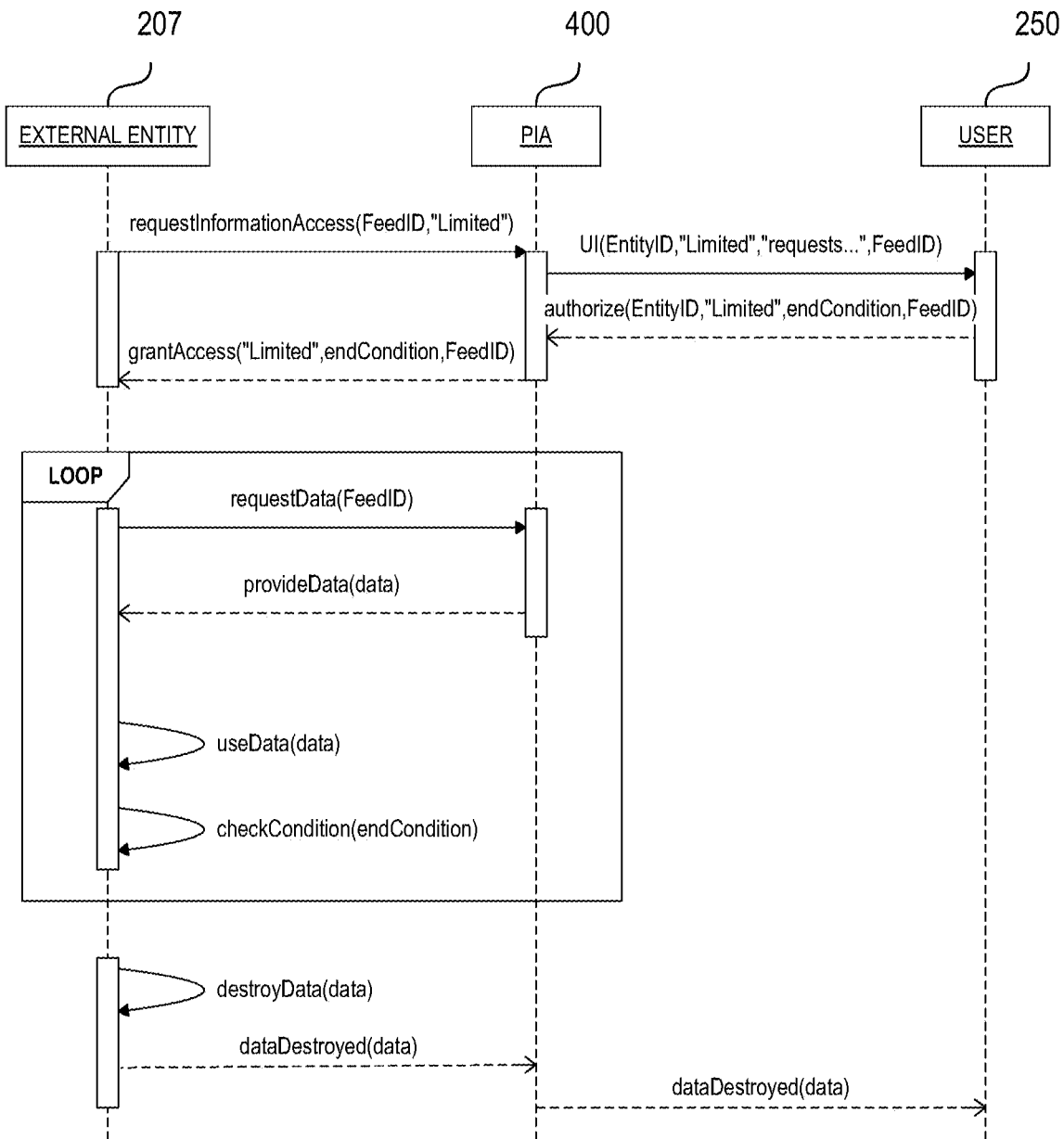
FIG. 7 is a sequence diagram for the interactions associated with a PIA limited-use authorization request to receive data from the PIA used in accordance with the SitNet of FIG. 1.

FIG. 7 depicts the interactions associated with a limited-use authorization request. In this example, authorization is granted for limited use of a data feed, and the authorization is revoked on a specific termination date or due to some other set of termination conditions. For example, the travel department at the user's employer might be granted authorization to access a composite Travel Preferences input data feed so long as the user is still employed by the employer. The PIA 400 keeps a persistent record of the authorization, so that authorization needs only to be granted once, rather than repeatedly, and revokes the authorization if the employment is terminated.

The External Entity 207 sends a requestInformationAccess message to the PIA 400, with arguments indicating the requested data feed (FeedID) and the nature of the request ("Limited"). Upon receiving the request from the External Entity 207, the PIA 400 sends a UI message to the user 250. The arguments of the UI request provide the ID of the entity (EntityID), the nature of the request, the requested data feed, and the text to be displayed to the user ("requests . . . "). The User 250 responds by sending an authorize message to the PIA 400, with arguments that specify the entity's ID, the nature of the authorization ("Limited"), the termination criteria (endCondition) and the data feed for which authorization is granted. The PIA 400 notifies the External Entity 207 that the authorization has been granted by sending it a grantAccess message with arguments indicating the nature of the authorization, the termination conditions and the data feed for which authorization is granted.

After receiving notification of the authorization, the External Entity 207 sends the PIA 400 a requestData message with an argument specifying the data feed that is being requested. If the feed ID matches that for which authorization has been granted, the PIA 400 responds by sending the requested data to the External Entity 207 in a provideData message.

After receiving the requested data from the PIA 400, the External Entity 207 uses the data (useData) and then, since the authorization was for limited use, checks for the existence of the termination conditions (checkCondition). If the termination conditions are met, the External Entity 207 destroys all of the data (destroyData) which it has received under this authorization. To notify the PIA 400 of the data's destruction, the External Entity 207 sends a "dataDestroyed" message, which the PIA 400 passes on to the User 250. In another embodiment, the PIA 400, instead of the external entity, might check for the termination conditions, and notify the external entity 207 when the conditions are met.

Figure 8:
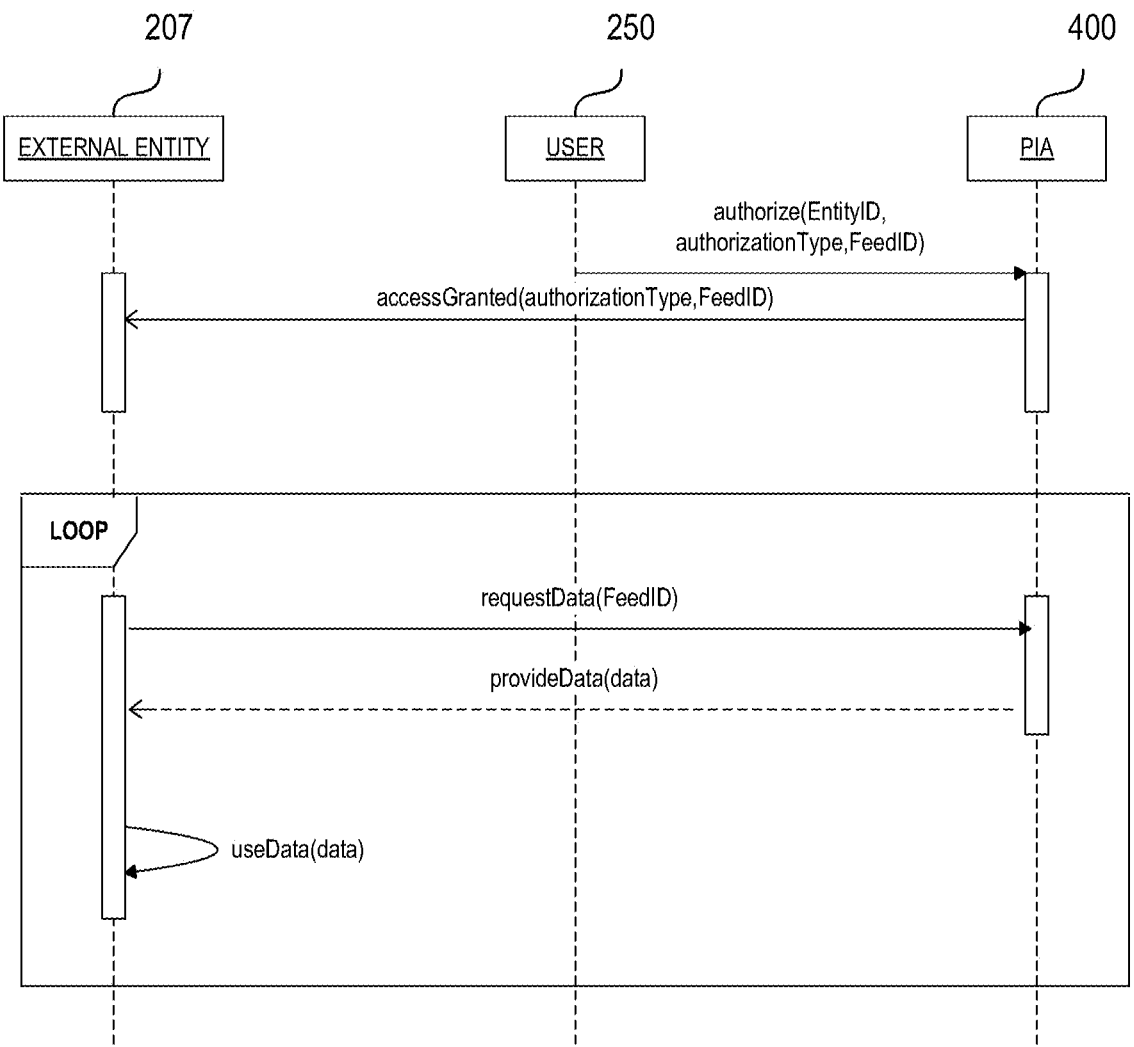
FIG. 8 is a sequence diagram for the interactions associated with a user-initiated PIA authorization to provide data from the PIA used in accordance with the SitNet of FIG. 1.

In an alternate embodiment, the user 250, instead of the external entity, might initiate the authorization. FIG. 8 depicts the interactions associated with a PIA authorization request for such a situation. Although an ongoing authorization request is shown in the example of FIG. 8, it is understood that a user-initiated authorization request may also be for single or limited use. In FIG. 8, the User 250 initiates the authorization by sending an authorize message to the PIA 400, with arguments that specify the entity's ID (EntityID), the nature of the authorization (authorizationType), and the data feed (FeedID) for which authorization is granted. Upon receiving the authorization from the User 250, the PIA 400 notifies the External Entity 207 of the authorization by sending an accessGranted message with an argument specifying the nature of the authorization and identifying the authorized data feed.

After receiving notification of the authorization, the External Entity 207 sends the PIA 400 a requestData message with an argument specifying the data feed that is being requested. If the feed ID matches that for which authorization has been granted, the PIA 400 responds by sending the requested data to the External Entity 207 in a provideData message. After receiving the requested data from the PLA 400, the External Entity 207 uses the data (useData). Since the authorization is for ongoing access, this cycle of a requestData message followed by a provideData message continues indefinitely.

Figure 10:
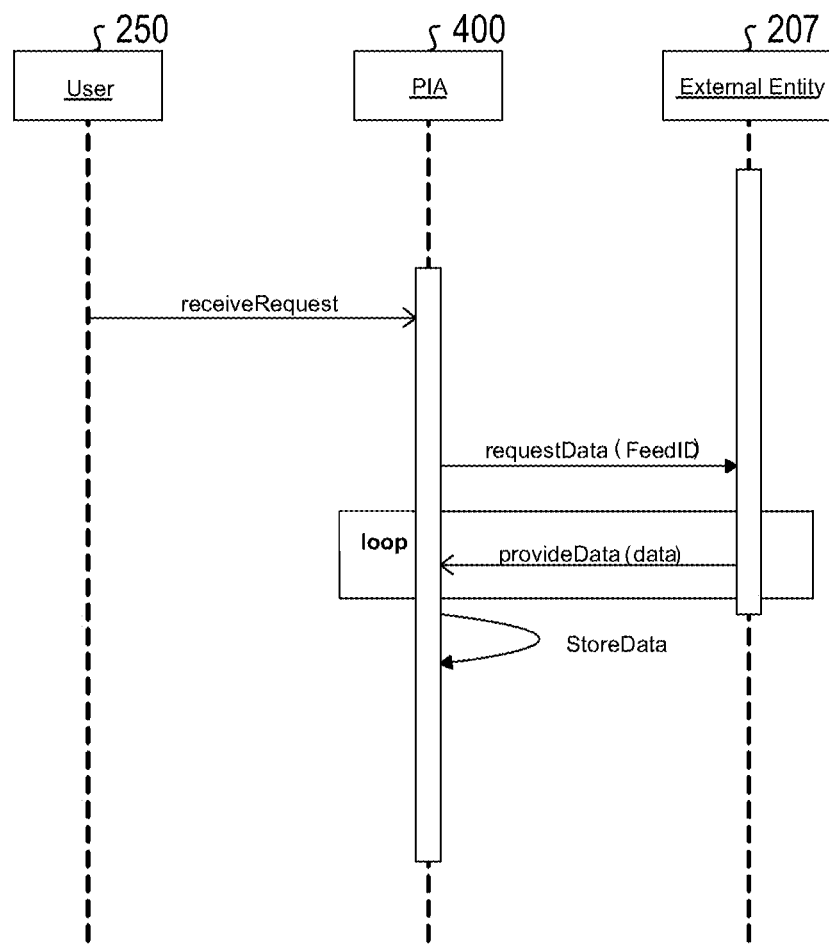
FIG. 10 is a sequence diagram for the interactions associated with user-initiated receiving of data by the PIA used in accordance with the SitNet of FIG. 1.
Figure 11:
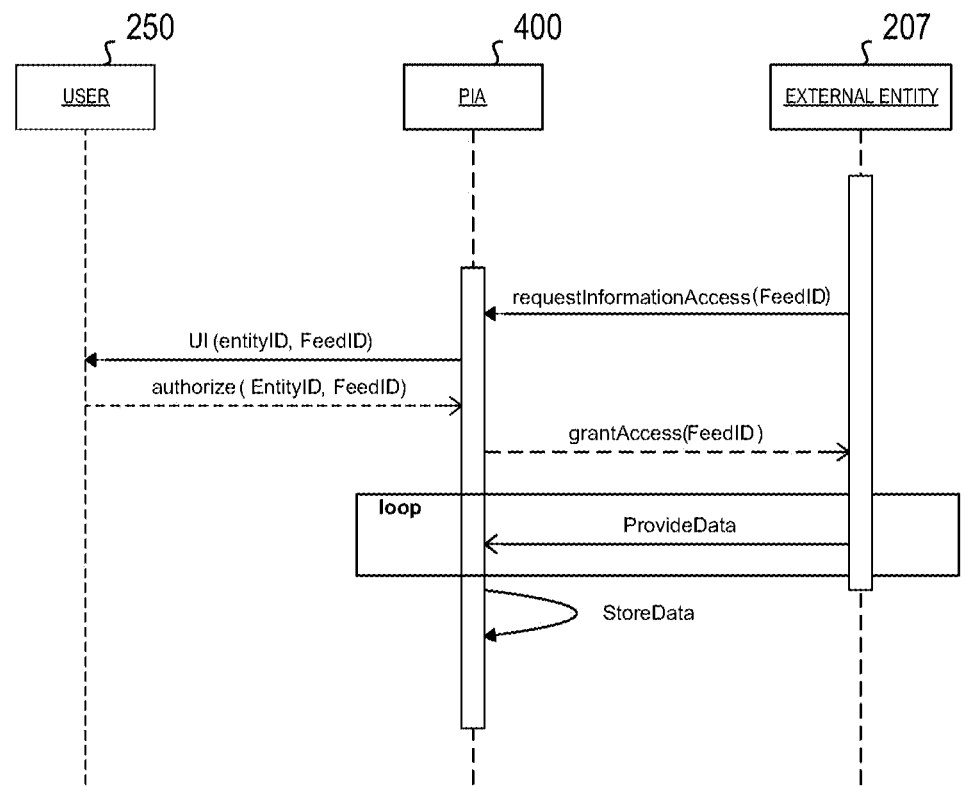
FIG. 11 is a sequence diagram for the interactions associated with an authorization request to provide data to the PIA used in accordance with the SitNet of FIG. 1.

With regard to the receipt of input data feeds by the PIA 400, the user 250, in one embodiment, might request the PIA 400 to receive data from the external entity. FIG. 10 depicts the interactions associated with such a situation. The User 250 requests the PIA 400 to receive a data feed from the External Entity 207 by sending a receiveRequest message to the PIA 400. The PIA 400 requests the data feed from the External Entity 207 by sending a requestData message to the External Entity 207. The External Entity 207 provides the requested data feed to the PIA 400 by sending the provideData message to the PIA 400. After receiving the requested data from the External Entity 207, the PIA 400 stores the data.

It should be noted that in another embodiment, the External Entity 207 may be configured to provide data to the PIA 400 once the PIA has configured itself to accept the data feed from the External Entity 207, and thus, the requestData message would be eliminated from the interaction.

In an alternate embodiment, the External Entity 207 requests authorization to provide data feeds to the PIA 400. FIG. 1I depicts the interactions associated with such a situation. The External Entity 207 requests authorization to provide data to the PIA 400 by sending a requestInformationAccess message to the PIA 400. The PIA 400 notifies the User 250 of the authorization request by sending a UI message to the User 250. The User 250 approves the authorization request by sending an authorize message to the PIA 400. The PIA 400 notifies the External Entity 207 of the approval by sending a grantAccess message to the External Entity 207. The External Entity 207 provides the requested data feed to the PIA 400 by sending the provideData message to the PIA 400. After receiving the requested data from the External Entity 207, the PIA 400 stores the data.

In any interaction in which the PIA receives data from an external entity, an additional operation might be used to authenticate the source of the data, i.e., the external entity and the data feeds provided by that source. A person skilled in the art will recognize that there are various well-known technologies that might be used to provide this assurance; some examples are the use of public and private keys, digital signatures and hashcodes.

Figure 9:
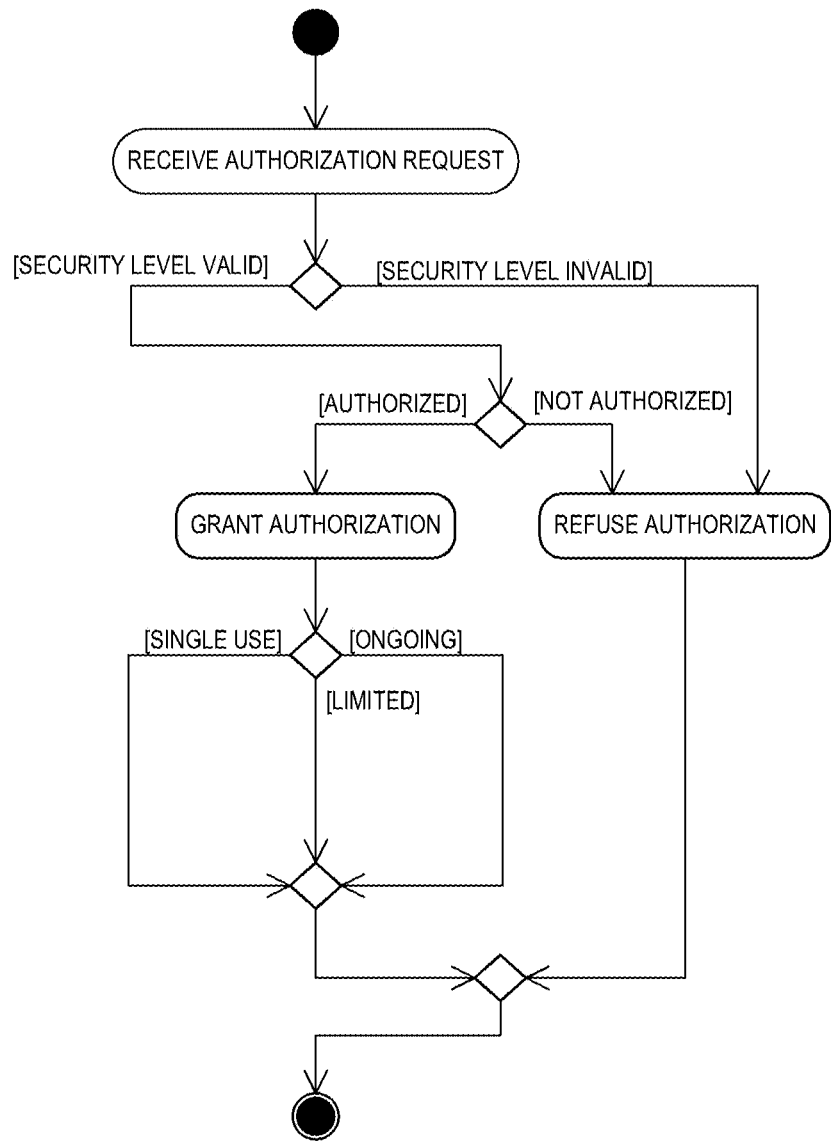
FIG. 9 is an activity diagram for the steps performed by the PIA used in accordance with the SitNet of FIG. 1.

FIG. 9 is an activity diagram corresponding to an Authorize activity. In the depicted embodiment, the requesting entity has an associated security level. This security level is used as an additional condition for obtaining access to the PIA's data feeds. The PIA receives an authorization request and checks the requesting entity's security level. If the security level is allowable for the requested data feed based on the entity's security level and the nature of the authorization request (single-use, limited use or ongoing), then the PIA next determines if it will authorize the request based on factors independent of the entity's security level. In one example, the user may only allow a certain entity access during normal work day hours, and not during the evening or on weekends. In another example, an entity may only be allowed single-use access, and therefore the entity will be refused authorization if ongoing or limited use is requested.

A PIA, depending upon the particular embodiment, may present user interface displays to the user for managing the user's personal information. In one embodiment, the user interface (UI), which may be a GUI or a text-based interface, may be presented on a computer display screen. Alternatively, the user interface may be presented on the display of a PIA appliance, or on a smaller screen contained within a handheld device associated with the PIA.

The PIA 400 or CIA may be implemented on a variety of hardware and software platforms, e.g., a handheld device, a personal computer or a dedicated appliance. The latter is a device that provides a user with the functions of a PIA 400. In this example, the PIA 400, which is implemented as the appliance includes a display and a set of buttons which provide the user with a user interface. In addition, the PIA appliance in this example has a port which may be used for connecting the PIA appliance to a network (e.g., Internet) for transmitting and receiving input and output data feeds as well as any configuration information or data used by the PIA 400. Those skilled in the art will recognize that the PIA 400 and the CIA may be implemented on a variety of hardware and software platforms.

Similarly, the type of hardware that is used by the PIA to store personal information can vary considerably, depending in part on such factors as user preferences and available technologies. In one embodiment, the personal information is stored in a device that is under the physical possession and control of the user, e.g., a small handheld portable device. The device may be dedicated solely to providing the functions of a PIA; alternatively, the device may also have other functions. For example, a mobile phone may be configured to provide the additional functions of a PIA. In such an embodiment, a database management system (DBMS) such as Microsoft SQL Server CE™ might be used for storing and managing the personal information.

In other embodiments, the personal information is stored in other types of devices that are under the physical possession and control of the user, e.g., the user's personal computer or a dedicated PIA appliance. In these embodiments, a database package such as Microsoft Access™ or a DBMS such as Microsoft SQL Server™, mySQL or postgreSQL might be used for storing the personal information.

The computer network 900 may be implemented with a variety of hardware platforms. For example, the computer network 900 may be implemented using the IEEE 802.3 (Ethernet) or IEEE 802.11 (wireless) networking technologies, either separately or in combination. In addition, the computer network 900 may be implemented with a variety of communication tools. For example, the computer network 900 may be implemented using the well-known TCP/IP suite of protocols. The Internet and some corporate intranets are examples of computer networks that use the technologies and standards described above.

In yet another embodiment, the personal information is stored in a remote server that is operated by a separate PIA provider and provides "virtual" PIA functions to one or more users. The PIA provider operating the remote computer ensures that the user has exclusive control over his personal information by providing one or more mechanisms for validating the user's identity before allowing the user to exercise control over his personal information. In this embodiment, a DBMS such as IBM DB2™ or mySQL might be used for storing and managing the personal information Those skilled in the art will recognize that there are a wide variety of choices other than the examples given above regarding the selection and arrangement of the equipment, technologies, platforms and systems used to store personal information in the PIA.

The technologies used by the PIA to send and receive its data feeds are varied and depend upon the specific embodiment. In one embodiment in which the PIA is implemented on a handheld device, the technologies include Bluetooth for local feeds and wireless short message service (SMS) for remote feeds. Bluetooth is used to establish a data connection between the PIA and a blood pressure monitor in a physician's office, and this data connection is used to send the blood pressure measurements taken by the monitor the PIA. SMS is used to send the latest healthcare information, which includes blood pressure measurements, to the PIA.

In an embodiment in which the PIA is implemented on a personal computer or a remote computer, Internet access through an Internet Service Provider (ISP) might be used for sending and receiving data. In this embodiment, the ISP might provide access to the Internet as a dial-up service, or through a higher-speed technology such as broadband or DSL. Since the Internet can expose the data being sent and received to unauthorized persons and systems, the data feeds, in this embodiment, might be encrypted, e.g., by using the HTTPS protocol, or by implementing a virtual private network (VPN) between the PIA and the sources and receivers of the data feeds.

An N-dimensional social network (NDSN), also called a multi-dimensional personal information network, captures and manages multi-dimensional relationships between persons and other entities that are users of the network. An NDSN may be used as a framework for establishing a Situational Network. A user (i.e., a member or participant) of the NDSN may be an individual (i.e., person), a group (e.g., healthcare clinic, law firm, supermarket chain, etc), or entity. The NDSN uses multiple dimensions of association to characterize the relationships between users or members. For example, while friendship is a dimension that might be used by the NDSN, the NDSN might also utilize other dimensions such as family, professional connection, consumer (e.g., consumer-to-merchant) relationship and healthcare-relation (e.g., providers, insurers, etc.) to characterize the relationship between two or more users. In addition, the NDSN might utilize dimensions that link participants by preferences and behaviors, e.g., a preference for a type of product or service.

The NDSN permits the user to discover and utilize the indirect relationships to other users that are connected to him through first-degree users. The multiple dimensions of the NDSN 100 and the ability to discover and use indirect relationships are described in more detail below. The NDSN also provides a decentralized architecture outside the control of a single entity.

The NDSN can also provide a "projected" view of a subset of the members of the NDSN to the user based on a subset of the NDSN's multiple dimensions. Such a "projected" view allows the user to use and manage smaller portions of the entire social network. The projected social network is described in more detail below.

In one embodiment, the NDSN comprises interconnected nodes, where individual users, members, entities, communities, or other aggregations of entities within the NDSN are associated with the nodes. Each node provides an associated entity with the ability to store and manage his profile and relationships with other users of the NDSN. Nodes may connect via different dimensions. Sets of nodes may exhibit high interconnectedness along some dimensions and little or no interconnection along other dimensions.

Each node is capable of communicating in a peer-to-peer fashion with other nodes in the NDSN, and thus is a user's point of connection to the NDSN, providing a user with access to information that can be obtained from other users of the NDSN with whom the user has a relationship. Conversely, a node provides a user with the ability to selectively share (by providing access to) his personal information with other users of the NDSN. A node may be, or may encompass, a user's PIA or CIA.

Figure 12:
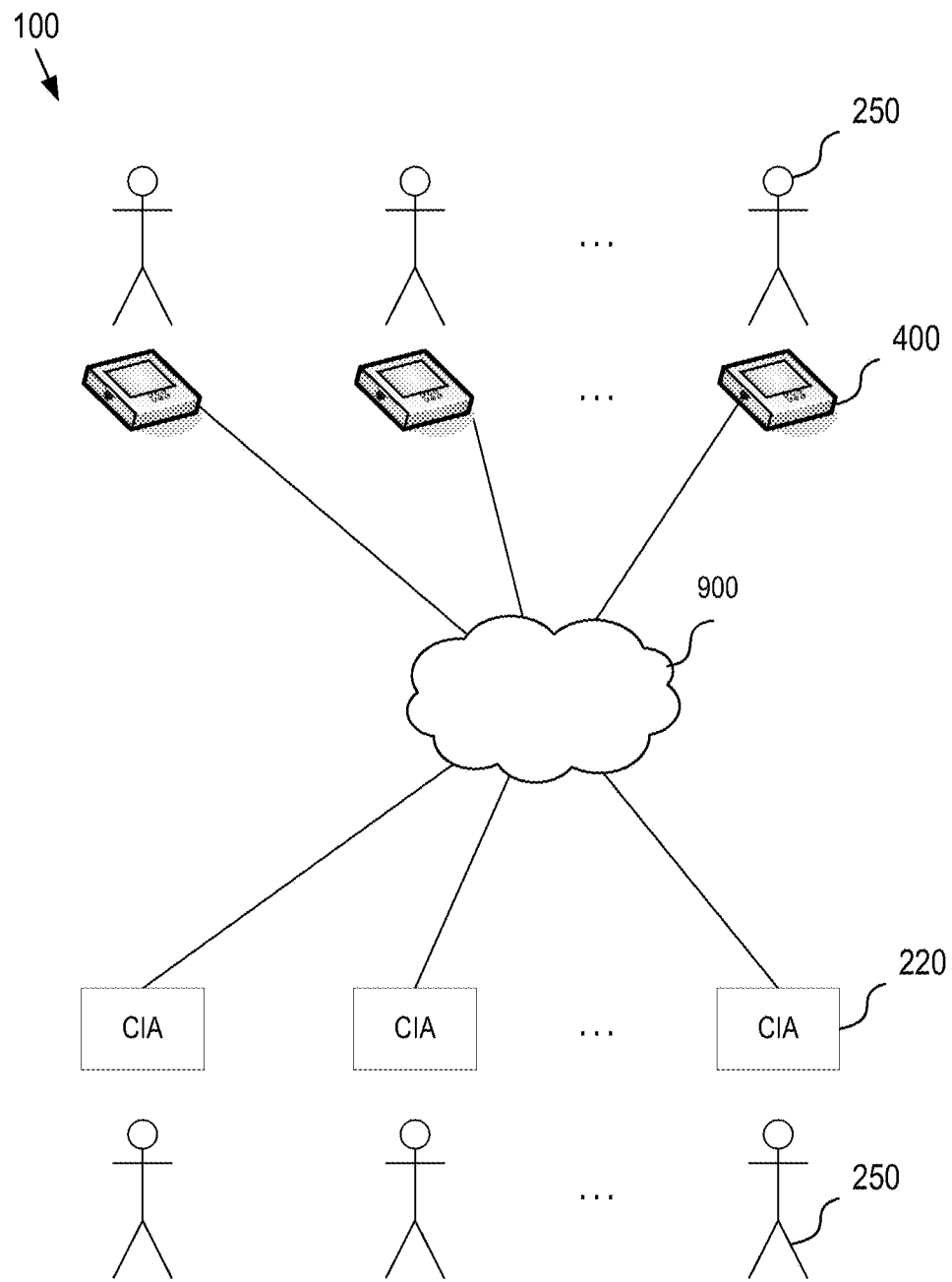
FIG. 12 is a network diagram of an N-Dimensional Social Network (NDSN) used in accordance with the SitNet of FIG. 1.

Referring to FIG. 12, the NDSN 100 includes multiple users 250 and other entities associated therewith. Each of the users 250 or other entities of the NDSN 100 has an associated node which encompasses a PIA 400 or a CIA 220 or other device or software application (not shown). The PIAs 400 and CIAs 220 can be interconnected through the computer network 900.

Those skilled in the art will recognize that a node of the NDSN 100 may be implemented using a wide variety of available hardware and technologies generally known in the art, such as software on a personal computer or a handheld PDA. In addition, those skilled in the art will recognize that the nodes of the NDSN 100 may be interconnected and may communicate with each other using a wide variety of available hardware and technologies generally known in the art, such as TCP/IP over an Ethernet or a wireless network.

In one embodiment, some users may have their nodes hosted in a common location, e.g., on a local or remote server.

Figure 13:
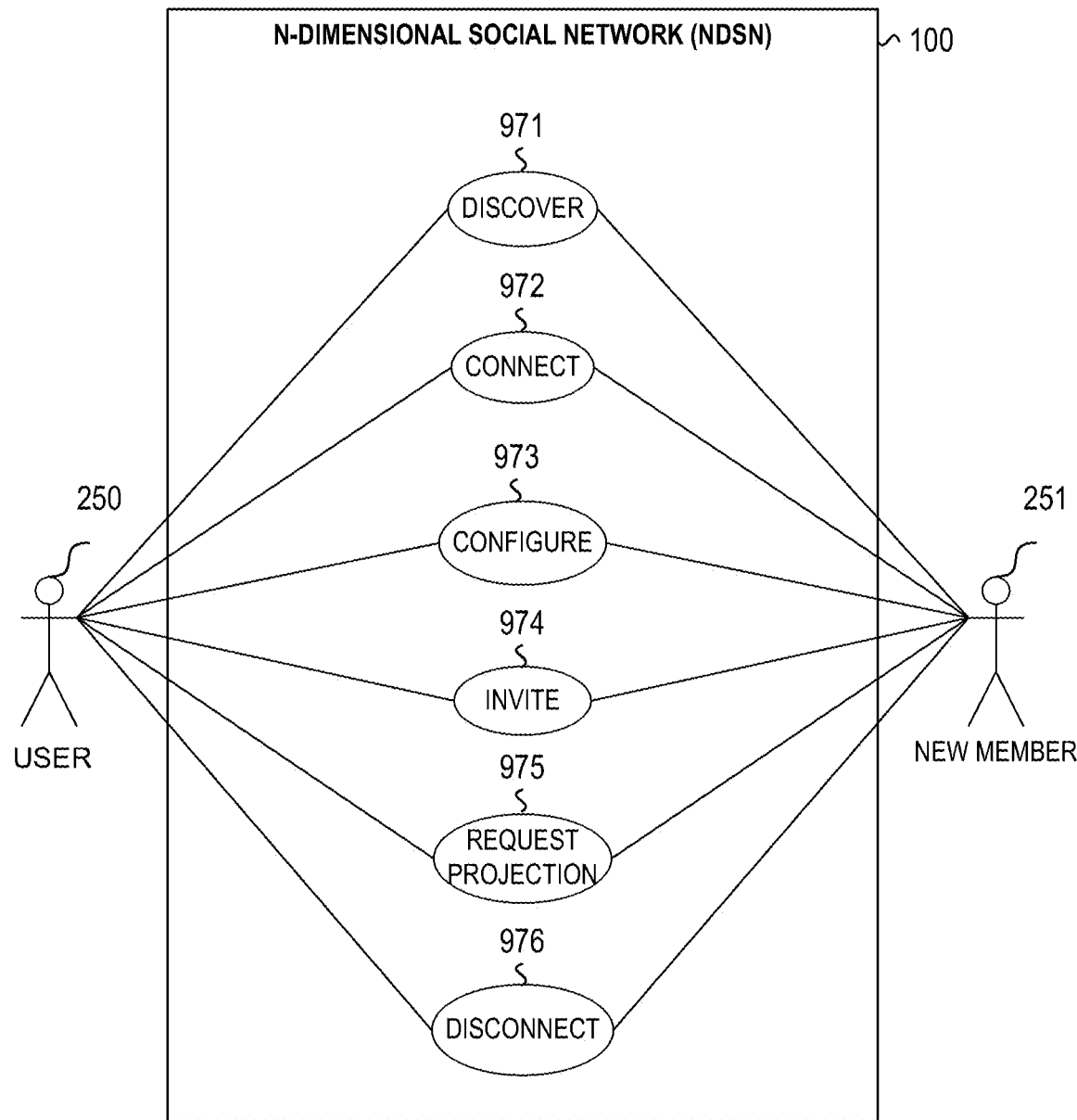
FIG. 13 is a use case diagram for the NDSN of FIG. 12.

A user's PIA 400 provides various functions that permit the user to connect to and interact with other members of the NDSN 100. Referring to FIG. 13, a user 250 employs the Discover use case 971 to discover the existence of other members of the NDSN 100. The user 250 may or may not have prior knowledge of the existence of members of the NDSN 100, and therefore, may not need to discover the existence of the members of the NDSN 100. The user 250 employs the Connect use case 972 to connect to other members of the NDSN 100 and configures his user profile by utilizing the Configure 973 use case. Once connection to other members of the NDSN 100 is established for the user 250, the user 250 can invite a new member 251 to connect to members of the NDSN 100 by utilizing the Invite use case 974. The user 250 employs the Request Projection 975 use case to obtain a projection of the NDSN. If the user 250 decides to disconnect himself from the other members of the NDSN 100, he employs the Disconnect use case 976. The new member 251 can similarly employ the use cases (Discover 971, Connect 972, Configure 973, Invite 974, Request Projection 975 and Disconnect 976) as described above.

The NDSN 100 captures multiple various dimensions of the relationship between two users. The dimensions that are captured are wide-ranging and can cover many aspects of a user's life. Each relationship between two users in the NDSN 100 may have an attribute of affinity, i.e., trust or alignment. This permits the NDSN to characterize a relationship between users along a continuous range, rather than treating the relationships in a binary (i.e., true or false) fashion. For example, rather than characterizing another user as simply a friend (or not), the NDSN user can characterize the level of trust that he has in another user with whom he is related by friendship; in other words the NDSN can capture the level of friendship between two users.

In other embodiments, the multiple relationships between two users may have a single affinity attribute, as opposed to one affinity attribute per relationship. The value of the affinity attribute may be derived from the user attributes (which may be contained in the user profile) of one or both of the related nodes. For example, if both related users each have a user attribute that identifies them as basketball fans, then the derived affinity attribute along a Sports dimension would have a value of 0.9. However, if only one of the users has a user attribute that identifies him as a basketball fan, then the derived affinity attribute might have a lower value of 0.6.

Those skilled in the art will recognize that there are numerous well-known software and hardware technologies that may be utilized to implement the attributes of the users of the NDSN 100 and the attributes of the associations between the users.

Figure 18:
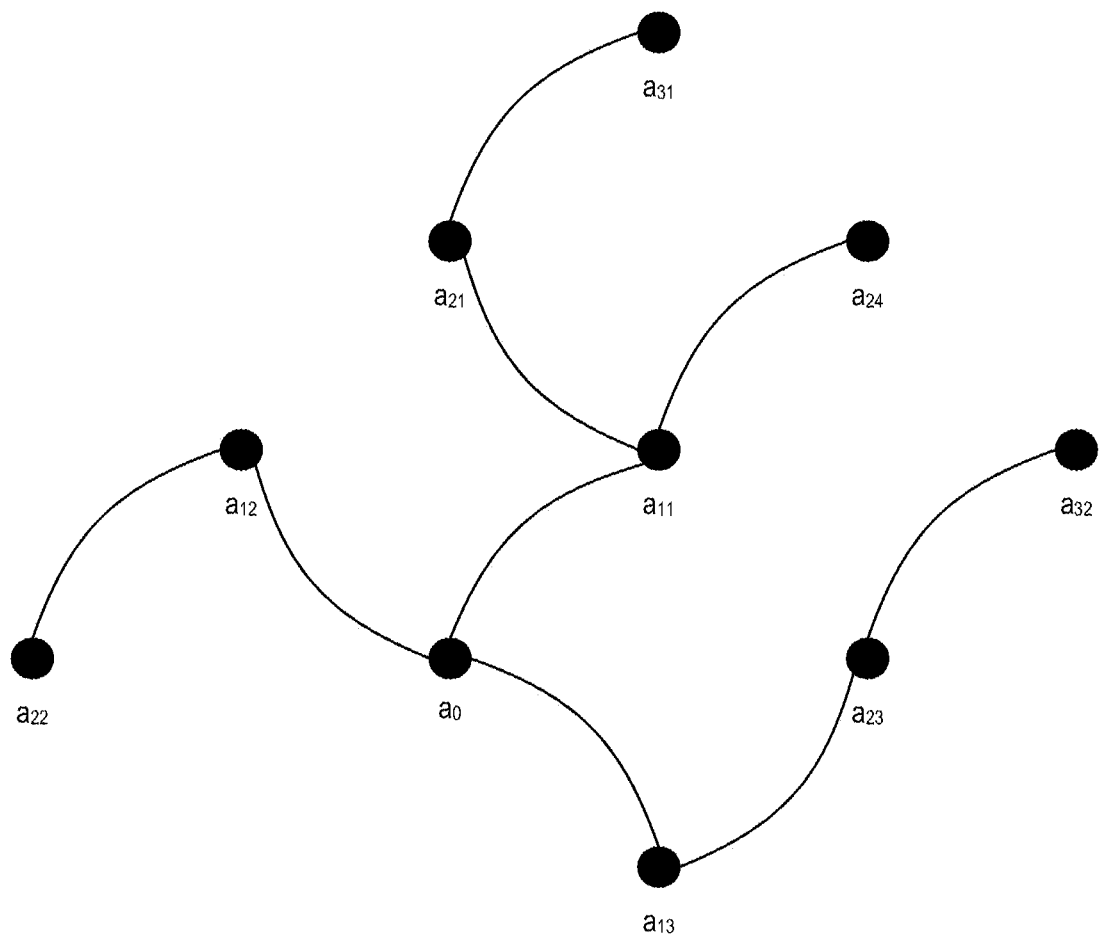
FIG. 18 is an example of nodes of the NDSN of FIG. 12.

A node of the NDSN 100 is connected to another node by one or more degrees or separation. A connection from one node directly to another node is considered to be of first-degree separation; a connection that goes indirectly through one other node is of second-degree separation; a connection that goes indirectly through two other nodes is of third-degree separation, and so on. In the example of FIG. 18, nodes $a_{11}$, $a_{12}$ and $a_{13}$ have first-degree separation from node $a_0$; nodes $a_{21}$, $a_{22}$ and $a_{23}$ have second-degree separation from $a_0$; and nodes $a_{31}$ and $a_{32}$ have third-degree separation from $a_0$.

Two nodes that are separated by two or more degrees of separation are indirectly connected. Either of such indirectly connected nodes may attempt to establish a direct connection with the other node, thus reducing the degree of separation to one.

Figure 19:
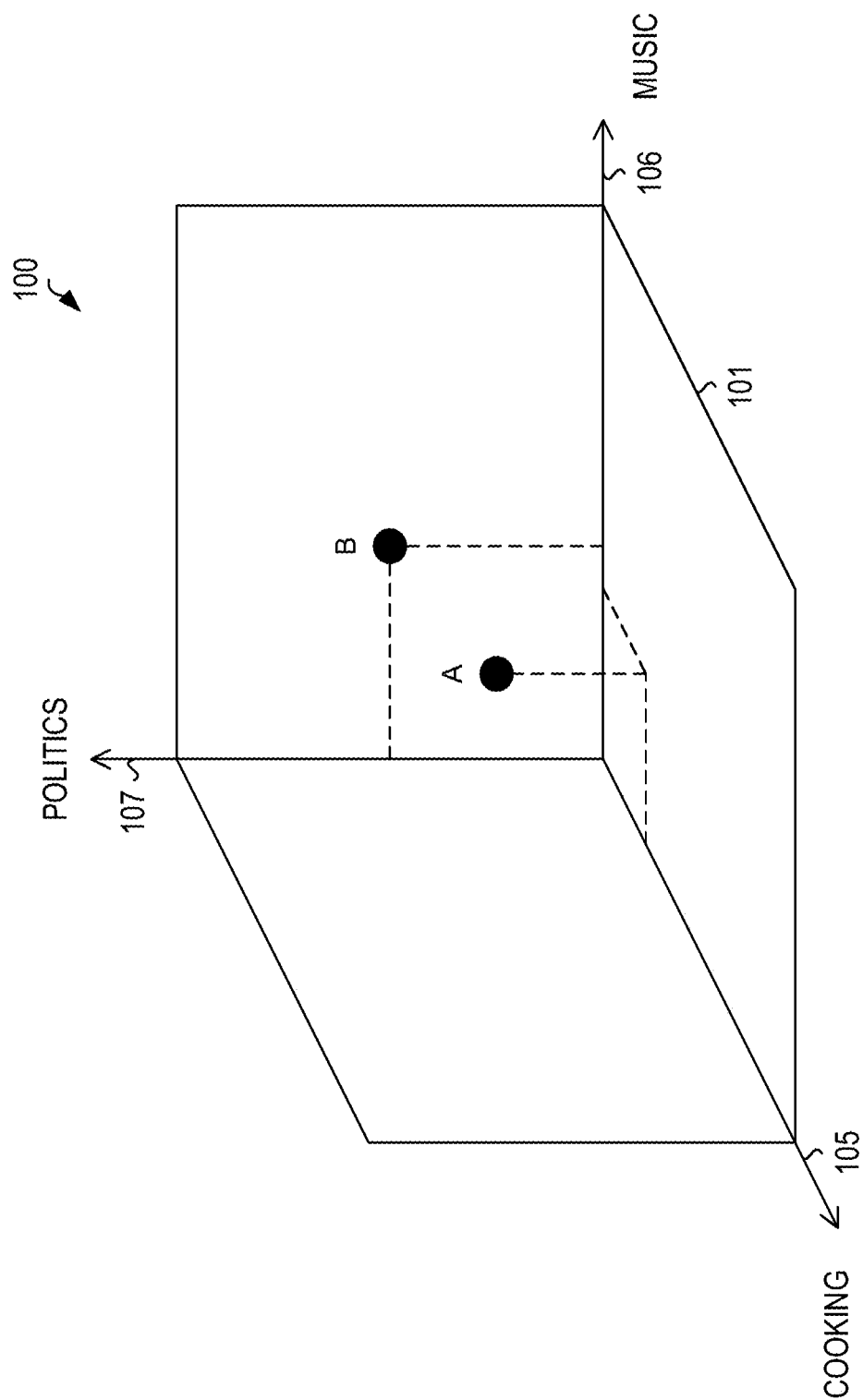
FIG. 19 is an example of a projected NDSN used in accordance with the SitNet of FIG. 1.

A user might desire to work with a "projected" view, i.e., a subset of the nodes, of the NDSN 100. Such a desire might be based, for example, on a need to increase processing speed and reduce resource requirements such as CPU speed and memory size. A user can obtain a "projected" view of the NDSN 100, by employing the Request Projection use case 975 (see FIG. 13). Referring to FIG. 19, Node A and Node B are connected to the user 250. The relationship between the user 250 and Node A has components in three dimensions: Music 106, Politics 107 and Cooking 105, while the relationship between the user 250 and Node B has components in the Music 106 and Politics 107 dimensions, but not the Cooking dimension 105. In FIG. 19, the projected view 101 of the NDSN 100 includes those nodes (i.e., Node A) of the NDSN 100 that reside along a selected projection of the Cooking dimension 105 (and not the Music or Politics dimensions 106, 107). Nodes that reside in the two-dimensional plane formed by the Music dimension 106 and the Politics dimension 107 (i.e., Node B) are thus not included in the projected view 101 of the NDSN 100, since they do not include a Cooking component. A projection of the NDSN 100 may also be obtained along multiple dimensions.

The affinity attributes between nodes of the NDSN 100 may also be used to determine the set of nodes that form a projection of the NDSN 100. For example, the set of nodes in a projection of the NDSN 100 might include those nodes that have a cooking dimension relationship with the user 250 and additionally have an affinity attribute along that dimension that exceeds a specified threshold.

Figure 20:
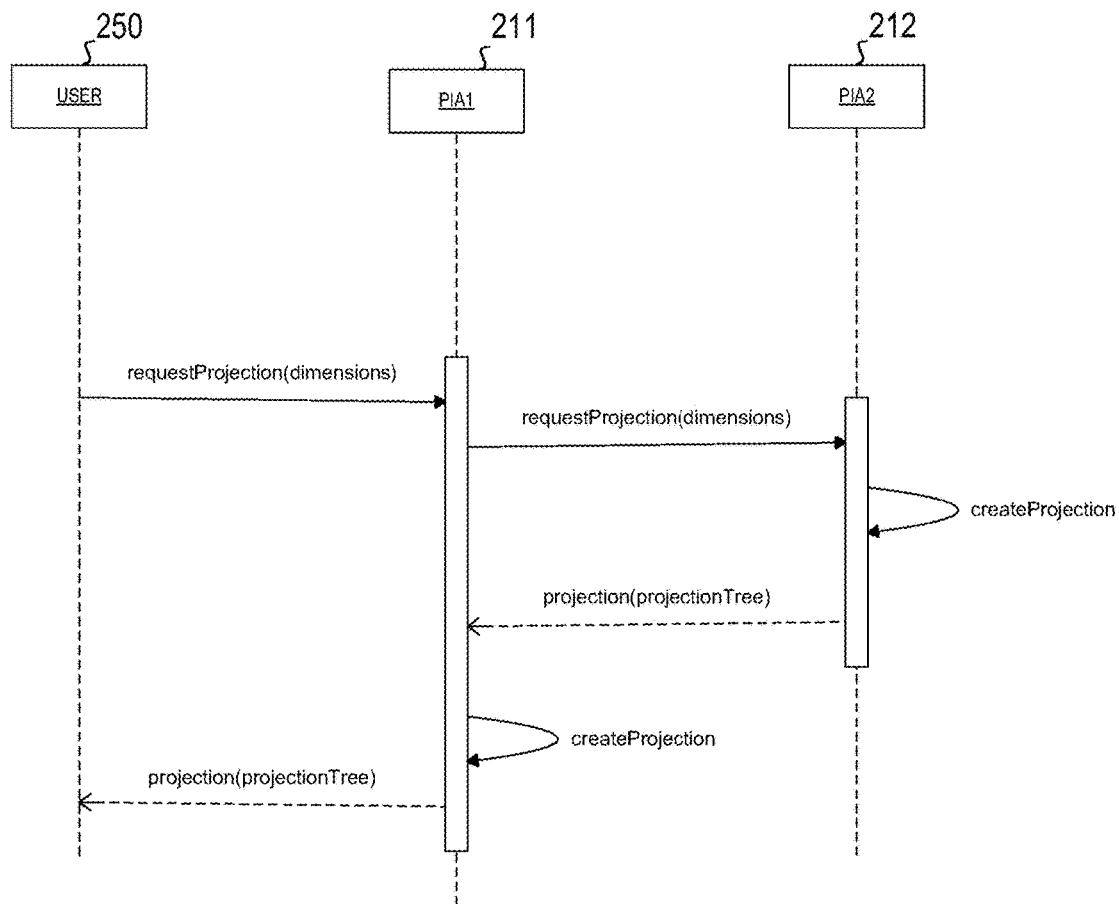
FIG. 20 is a sequence diagram for the interactions associated with creating a projection of the NDSN used in accordance with the SitNet of FIG. 1.

FIG. 20 depicts an example of the interactions associated with creating a projection of the NDSN 100. In FIG. 20, the User 250 requests a projection by sending a requestProjection message to PIA1 211. PIA1 211 then requests a second projection by sending a requestProjection message to PIA2 212. PIA2 212 creates the second projection by sending itself a createProjection message, and provides the second projection by sending a projection message to PIA1 211 containing the argument projectionTree which holds the second projection. PIA1 creates the projection requested by the user by sending itself a createProjection message. The projection created by PIA1 211 is based on the second projection received from PIA2 212. In some embodiments, the projection created by PIA1 211 is further based on other projections requested and received from other PIAs (not shown).

In other embodiments, thresholds are employed to limit the extent of a requested projection. For example, a time limit may be imposed on the operation of creating a projection, i.e., the operation will terminate after a specified duration of time. As another example, a limit on the number of nodes contained in the projection may be used to place an upper bound on the size of the projection.

In some embodiments, a maximum measure of separation, which can be measured in various ways, may be used to limit the projection operation. In one embodiment, the User 250 specifies the maximum degree of separation, and the PIA1 211 requests a second projection from PIA2 212 with a maximum degree of separation that is one less than the degree specified by the User 250.

A user node in the NDSN 100 may contain the user's profile, which may include information regarding the user's basic personal information (e.g., name, home address, work address, e-mail addresses and date of birth), demographics (e.g., age, age group, gender, years of education, income, net worth, occupation, marital status, geographic region, religion, ethnicity, etc.), user attributes, interests, affiliations and other information that can be used in the NDSN to characterize the user. The user node, which in some embodiments is a PIA, may collect some of this information without requiring direct entry by the user. Such information is extracted by monitoring, processing and analyzing data that enters the PIA through its input data feeds. The user also may have the option of directly entering, reviewing and modifying his user profile; these actions can be performed on a variety of types of devices or equipment that may provide the user with data connections to the other nodes of the NDSN, including, e.g., a PIA, a CIA, a personal computer, or a handheld device (e.g., a cell phone or personal digital assistant (PDA)).

As described above, a user 250 may have no prior knowledge of the existence of the members of the NDSN 100, and may choose to see if he can discover the existence of members of one or more NDSNs. Members of an NDSN may be discovered in various ways, including broadcasting a query, querying a CIA, querying neighboring nodes and querying other directories.

A node may be able to discover other nodes by broadcasting a message on the local network. Upon receipt of the broadcast message one or more of the other nodes may respond to the issuing node with, e.g., a list of available public feeds (if the node is a PIA), or other information.

A CIA may maintain a list of PIAs that can be accessed by another PIA such that direct connections to the member PIAs may be established. This would allow a member to easily find other members of a particular community. For example, a CIA associated with a chess club might have a list of its members, as well as lists of members of other chapters of the club, and thus would be able to provide a convenient way to find and connect with other chess players.

A node may also locate other nodes by querying known neighbor nodes and asking them for addresses of nodes of which they have knowledge that meet certain criteria. For instance, a node may ask its neighbors for addresses of their neighbors that are members of a certain demographic. The process could then be repeated with that new set of addresses obtained in the responses.

Figure 14:
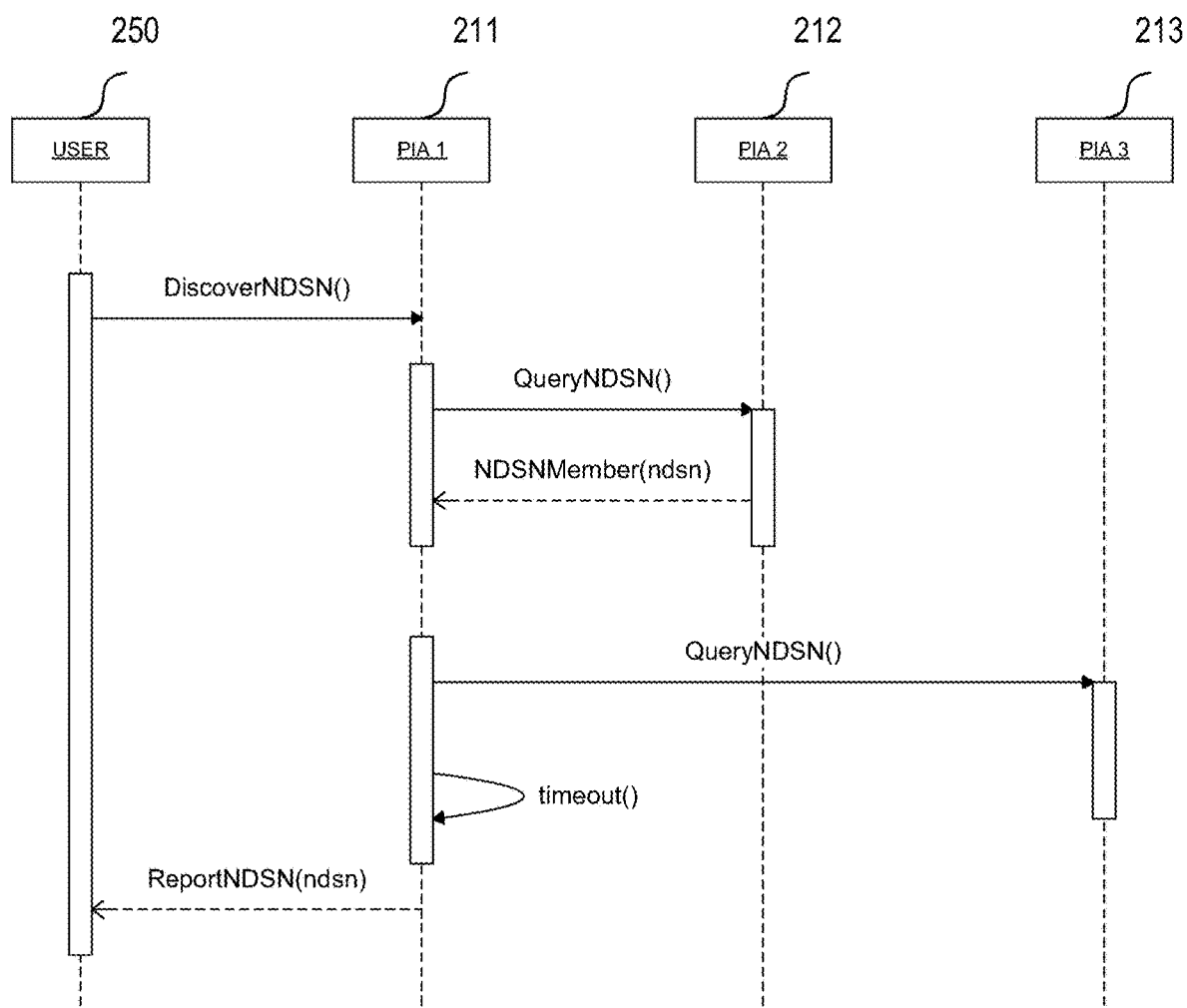
FIG. 14 is a sequence diagram for the interactions associated with a user discovering an NDSN used in accordance with the SitNet of FIG. 1.

A user 250 may attempt to discover the existence of members of one or more NDSNs by employing the Discover use case 971 (see FIG. 13). Referring to FIG. 14, the User 250 requests PIA1 211 to attempt to discover the existence of members of an NDSN by sending a DiscoverNDSN message to PIA1 211. In order to satisfy this request, PIA1 211 utilizes a list (not shown) of candidate PIAs, i.e., those that may be members of an NDSN. This list may be generated by various techniques (not shown), e.g., by crawling the Internet or by contacting a registry that stores the identities of PIAs.

In the example of FIG. 14, the list of candidate PIAs used by PIA1 211 includes PIA2 212 and PIA3 213. PIA1 211 asks PIA2 212 if it is a member of an NDSN by sending a QueryNDSN message to PIA2 212. PIA2 212 responds that it is a member of an NDSN by sending an NDSNMember message to PIA1 211 containing the argument ndsn which identifies the particular NDSN of which PIA2 212 is a member. Similarly, PIA1 211 sends a QueryNDSN message to PIA3 213. PIA3 213 neither is a member of an NDSN nor understands the QueryNDSN message, and thus it does not respond to PIA1 211. After a timeout period has elapsed, PIA1 211 sends itself a timeout message to note that PIA3 213 has not responded. PIA1 211 satisfies the request from the User 250 to discover the existence of members of an NDSN by sending a ReportNDSN message to the User 250 with an argument ndsn that identifies the discovered NDSN.

Those skilled in the art will recognize that techniques of crawling the Internet and providing a registry are well-known in the art, and furthermore that a variety of other techniques may be utilized to generate the list of candidate PIAs.

Figure 15:
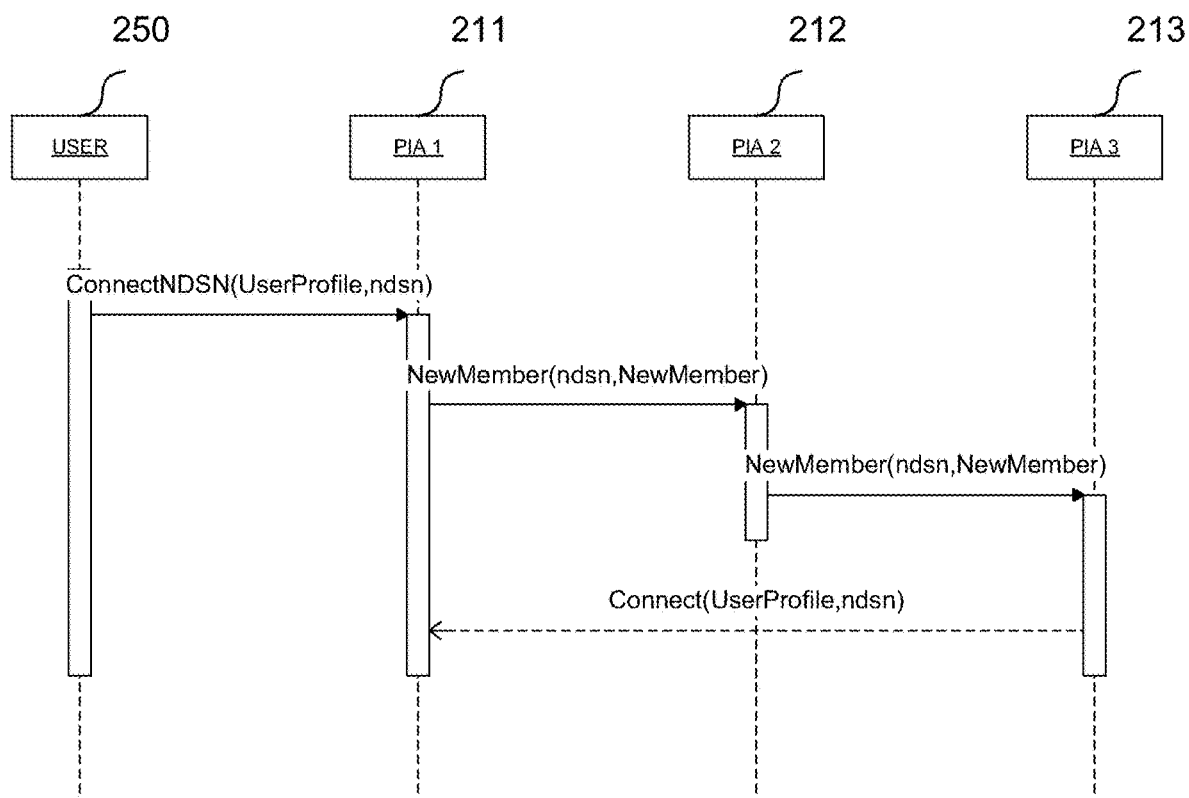
FIG. 15 is a sequence diagram for the interactions associated with a user connecting to other members of an NDSN used in accordance with the SitNet of FIG. 1.

To connect to members of the NDSN, a user employs the Connect use case 972 (see FIG. 13). In the example of FIG. 15, the User 250 asks PIA1 211 to connect to an NDSN by sending a ConnectNDSN message to PIA1 211 with arguments that contain his user profile (UserProfile) and identify the NDSN (ndsn). PIA1 211 utilizes a list (not shown) of PIAs that belong to the NDSN. This list may be generated by various techniques (not shown), e.g., by crawling the Internet or by storing the identities of the PIA that have been discovered by employing the Discover use case 971 (see FIG. 13).

In the example of FIG. 15, the list of PIAs used by PIA 1 211 includes PIA2 212. PIA1 211 informs PIA2 212 that the User 250 is becoming a new member of, i.e., connecting to the NDSN, by sending a NewMember message to PIA2 212 with an argument ndsn identifying the NDSN, and an argument NewMember identifying the PIA (PIA1 211) owned by the new user (User 250). PIA2 212, as a PIA of an existing member of the NDSN, has a list of PIAs owned by other members of the NDSN, which are unknown to the new member, User 250. In the example of FIG. 15, this list includes PIA3 213. PIA2 212 sends a NewMember message to PIA3 213 and the other PIAs (not shown) on the list with an argument ndsn identifying the NDSN, and an argument NewMember identifying the PIA (PIA1 211) owned by the new user (User 250). Each PIA on the list sends the NewMember message to other PIAs (not shown), thus propagating the news of the new member to other members of the NDSN.

PIAs that are thus informed of the existence of the new member, User 250, may decide to connect to PIA1 211. In the example of FIG. 15, PIA3 213 connects to PIA1 211 by sending a Connect message to PIA1 211 with arguments that contain a user profile corresponding to the owner of PIA3 213 (UserProfile) and identify the NDSN (ndsn).

Figure 21:
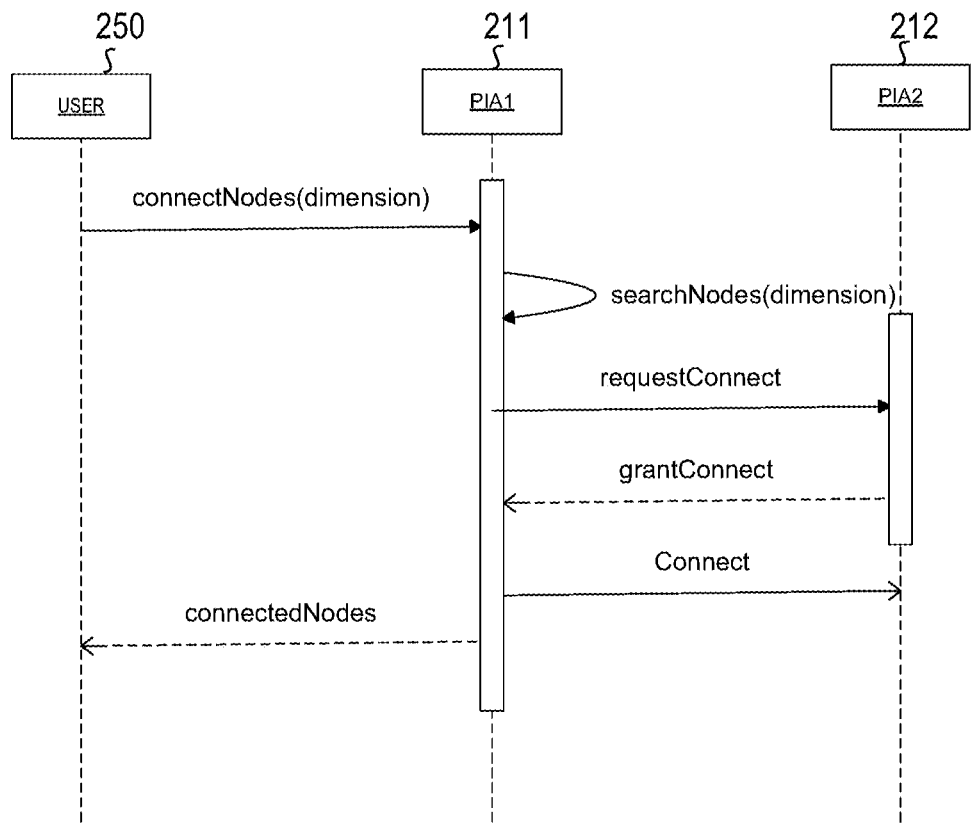
FIG. 21 is a sequence diagram for the interactions associated with a user connecting to other members of an NDSN used in accordance with the SitNet of FIG. 1.

FIG. 21 provides another example of a PIA connecting to the NDSN 100. The User 250 instructs PIA1 211 to connect to other nodes of the NDSN 100 along a specific dimension by sending a connectNodes message with an argument dimension identifying the specified dimension to PIA1 211. PIA1 211 searches the NDSN 100 for nodes along the specified dimension by sending itself a searchNodes message. In this example, PIA2 212 is included in the nodes found by PIA1 211. PIA1 211 then requests to connect to PIA2 212 by sending a requestConnect message to PIA2 212. PIA2 212 grants the connection request by sending a grantConnect message to PIA1 211. PIA1 211 then connects to PIA2 212 by sending a Connect message to PIA2 212. PIA1 211 informs the User 250 that the requested connections have been made by sending a connectedNodes message to the User 250.

Figure 16:
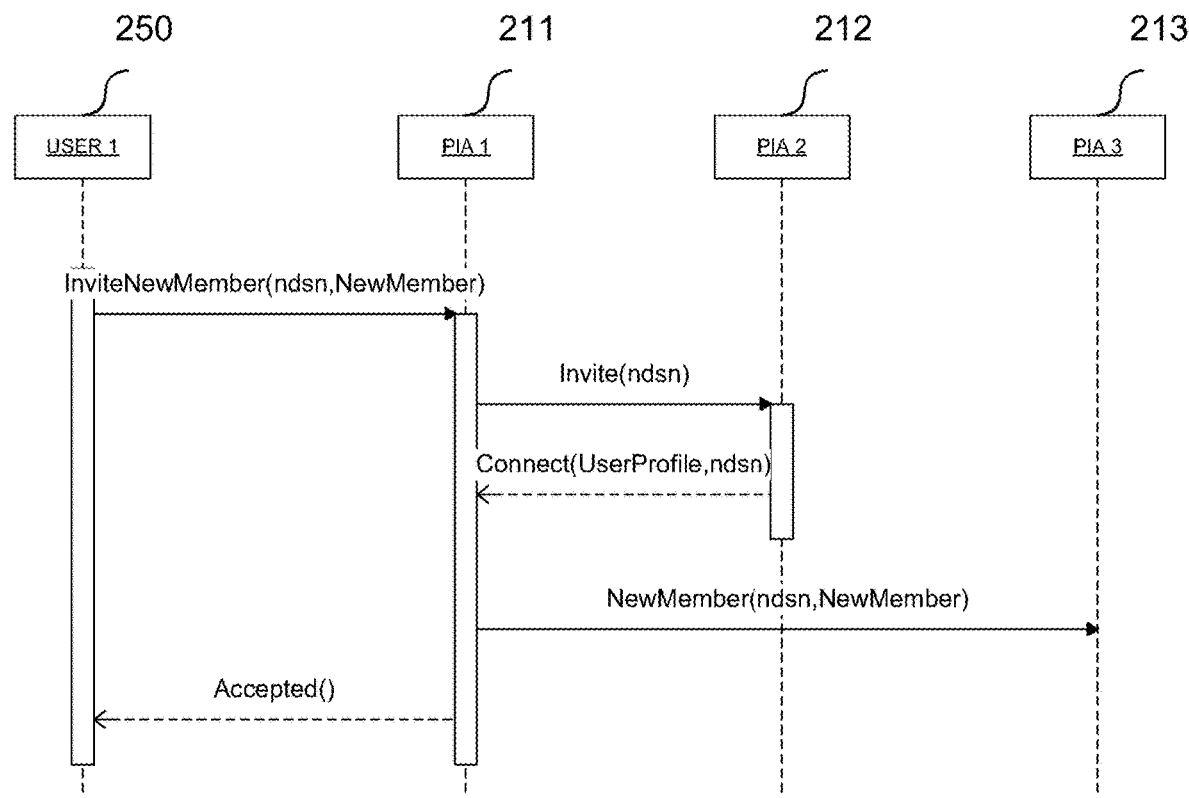
FIG. 16 is a sequence diagram for the interactions associated with a user inviting a new member to connect to the members of an NDSN used in accordance with the SitNet of FIG. 1.

To invite a new member to connect to the members of the NDSN 100, a user employs the Invite use case 974 (see FIG. 13). In the example of FIG. 16, the User 250 asks PIA1 211 to invite User2 252 to connect to the members of the NDSN by sending an InviteNewMember message to PIA1 211 with an argument ndsn identifying the NDSN, and an argument NewMember identifying the potential new user (User2 252). PIA1 211 sends an Invite message to PIA2 212 with an argument ndsn identifying the NDSN.

PIA2 212 might inform User2 252 by displaying a user interface prompt announcing the invitation (not shown). To accept the invitation, PIA2 212 responds by sending a Connect message to PIA1 211 with arguments that contain User2's user profile (UserProfile) and identify the NDSN (ndsn). If PIA2 212 were to decline the invitation, then PIA2 212 would respond by sending a Decline message (not shown) to PIA1 211.

PIA1 211 also sends a NewMember message to PIA3 213 and other members of the NDSN (not shown), with an argument ndsn identifying the NDSN, and an argument NewMember identifying the PIA (PIA2 212) owned by the new user (User2 252). As described in the example of FIG. 15, the news of the new member is thus propagated to other members of the NDSN. PIA1 211 sends an Accepted message to the User 250, informing the User 250 that User2 252 has accepted the invitation to connect to members of the NDSN.

Figure 17:
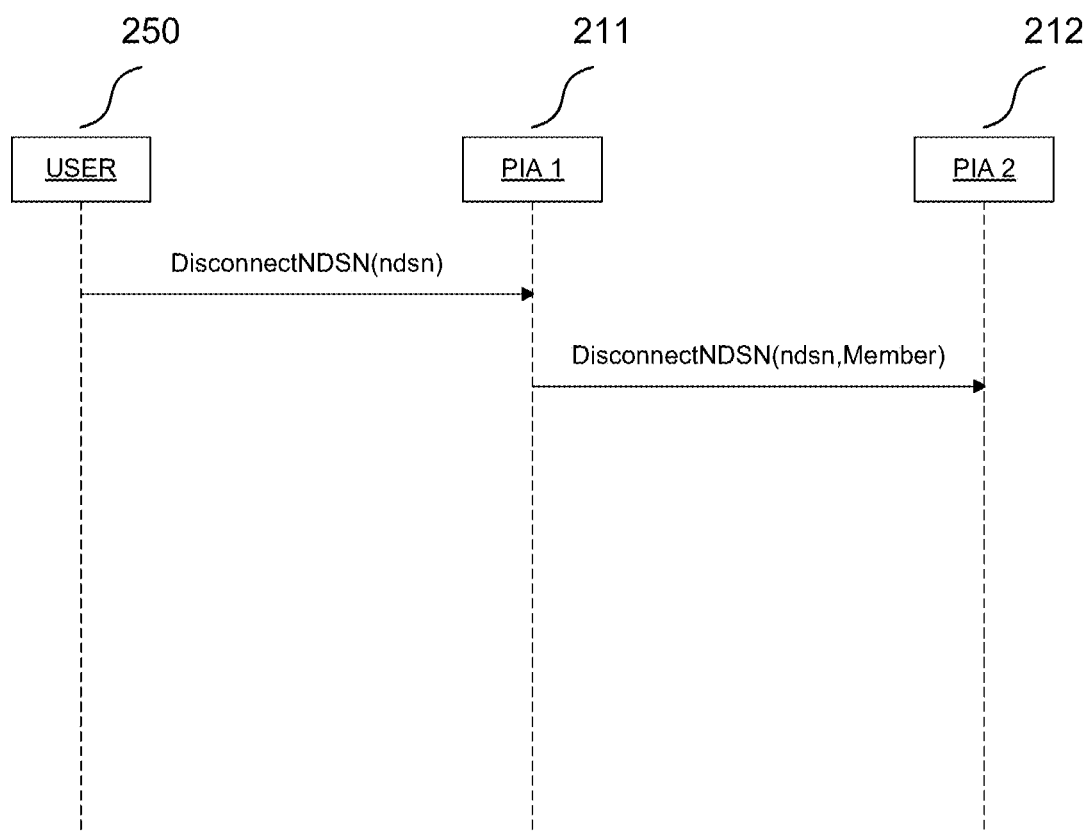
FIG. 17 is a sequence diagram for the interactions associated with a user disconnecting from other members of an NDSN used in accordance with the SitNet of FIG. 1.

To disconnect from other members of the NDSN, the user may employ the Disconnect use case 976 (see FIG. 13). In some embodiments, a user's PIA stores the addresses of PIAs that belong to the members to whom the user is connected. In the example of FIG. 17, the User 250 asks PIA1 211 to disconnect from the members of the NDSN by sending a DisconnectNDSN message to PIA1 211 with arguments ndsn and Member identifying the NDSN and the member. PIA1 211 sends a Disconnect message to PIA2 212 and other PIAs (not shown) that it is connected to, with an argument ndsn that identifies the NDSN.

The user 250 may configure the PIA to permit a connection for one or more specific user attributes between him and other users. In this manner, users can easily connect with each other based on common interests, demographics or other factors. A user employs the Configure use case 973 (see FIG. 13) to configure his NDSN node. For example, a user may configure his PIA to allow connections to any PIA that belongs to a user who coaches volleyball.

Figure 34:
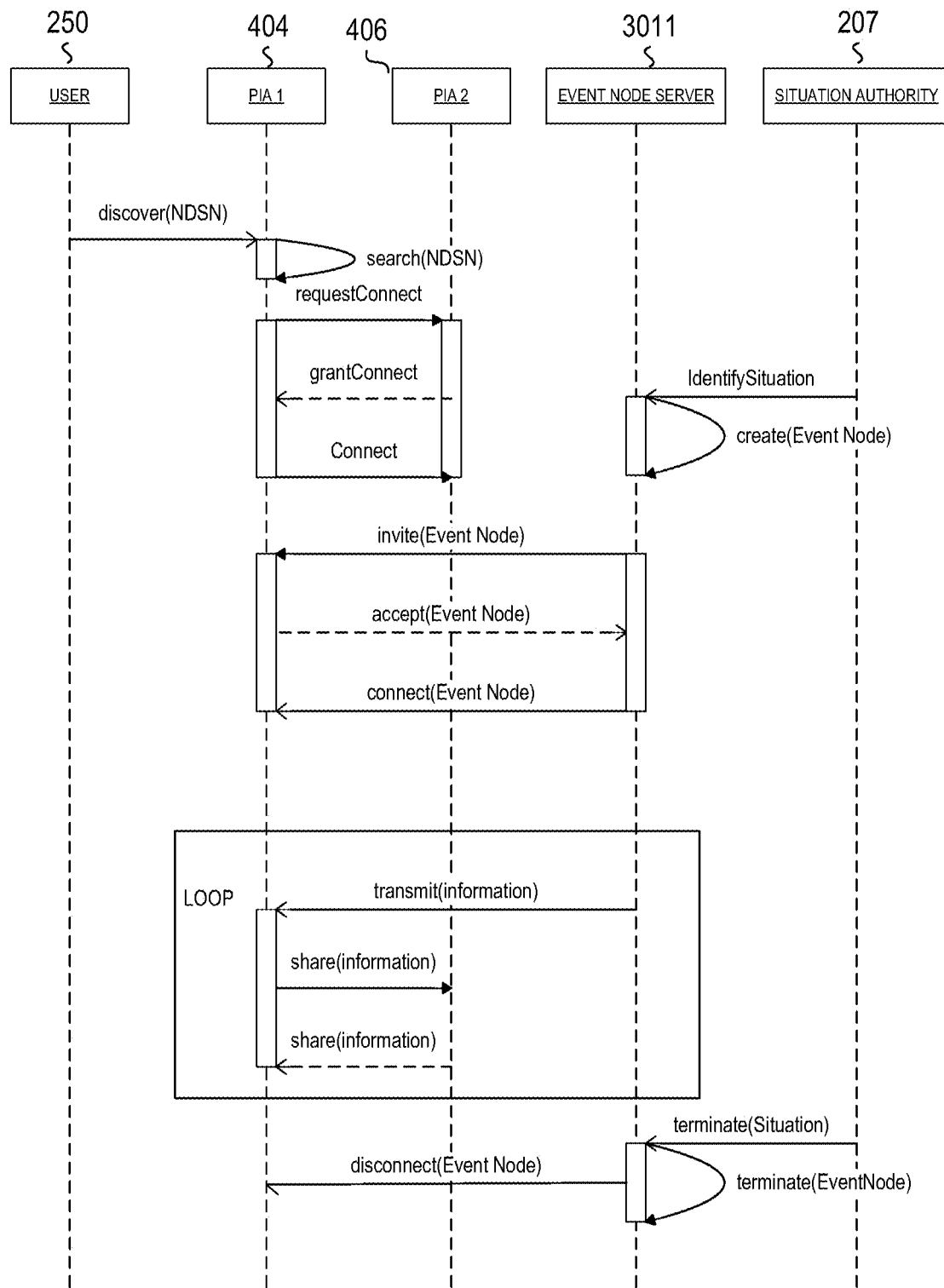
FIG. 34 is a sequence diagram in accordance with the SitNet of FIG. 1.
Figure 35:
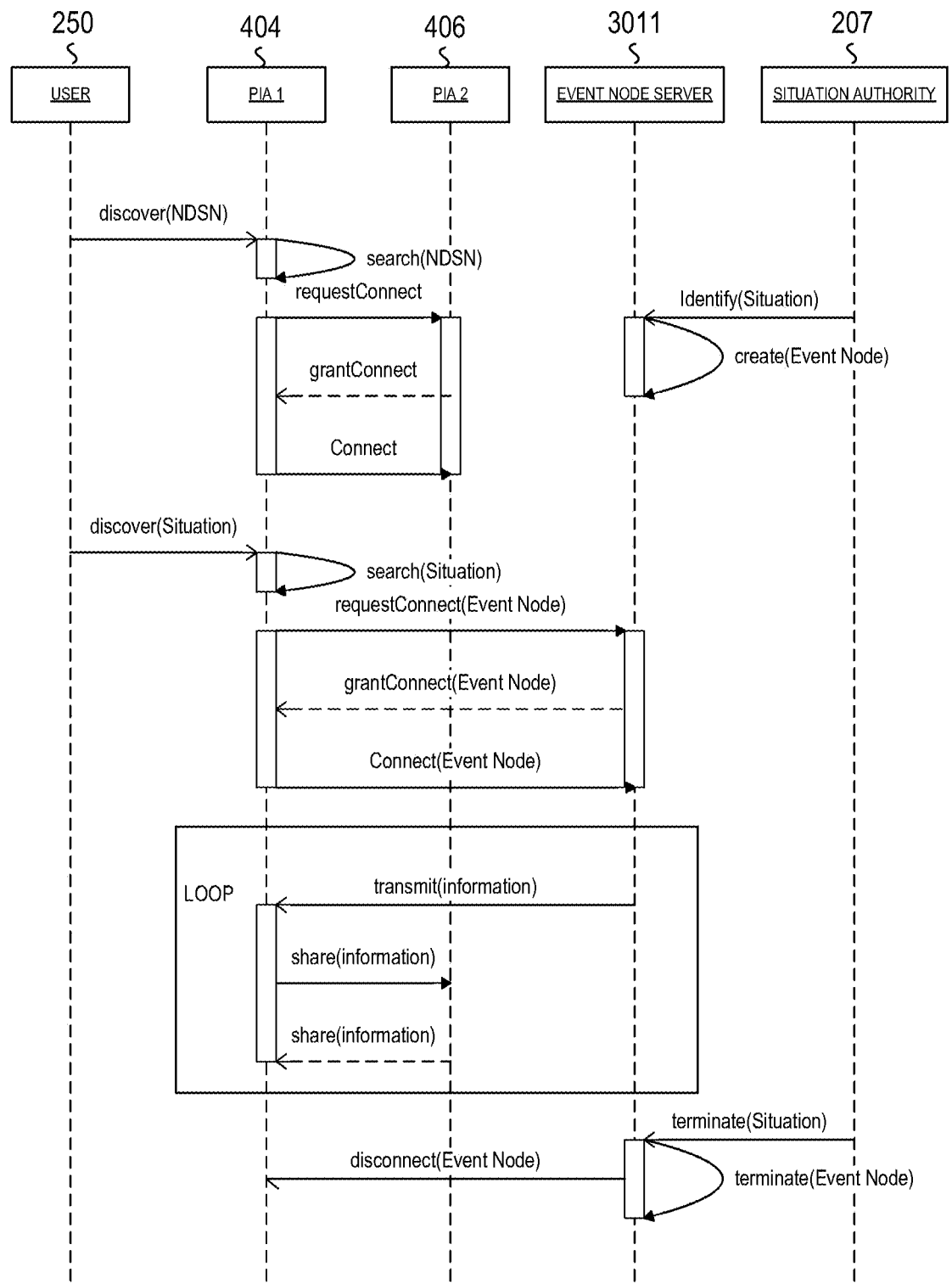
FIG. 35 is a sequence diagram in accordance with the SitNet of FIG. 1.

As discussed above, an embodiment of a situational network may be formed using the framework of an NDSN. Within the framework of the NDSN, the event or situation becomes associated with a node of the NDSN, referred to as an event node 3010. Referring to FIG. 35, the event node corresponding to an event node server 3011 may be established, or hosted, by a situation authority 207 or trusted provider, such as news source (e.g., CNN or weather.com) or a government agency. The event node may be discovered by a user's PIA 404 corresponding to the user 250 based on the PIA 404 searching or crawling the network for information about the situation or event if the connection can not be automatically established based on the configurations of the PIA 404 and the event node server 3011. A user 250 can then request connection to the event node server 3011 through the PIA 404 in order to receive and share information about the situation with the situation authority 207. A user 250 may also share information related to the situation with another user in the NDSN using a connection established between the user's PIA 404 and another PIA 406. PIA 406 may or may not be connected to the event node server 3011. In one embodiment, the connection request may be denied based on available computer network resources and the users' perceived need to access or share information on the SitNet. Alternately, users may automatically be invited to connect to the event node corresponding to the event as shown in FIG. 34. The automatic invitation may be based on a stored user profile accessible to a situation authority server 3011 associated with the event node may crawl the network for user PIAs 404, 406 that would likely be interested in the information about the event. The user 250 may accept or decline the invitation based on their interest in the event or situation. In one embodiment, the situation authority 207 may have the authority to override a decline by the user 250 in order to share vital information, as is described in more detail below.

A situation or event may be associated with more than one event node, hosted by the same or different trusted provider, within a SitNet. Each event node may provide a source of different information based on the specialty of the trusted provider. For example, a hurricane may be associated with a first event node by a provider of weather information, such as The Weather Channel, a second by a source of news information, such as CNN, and a third by a source of emergency management information, such as FEMA. Within the SitNet, users may be connected to some or all of the event nodes corresponding to the situation in order to obtain and share the most relevant information pertaining to them.

Figure 29:
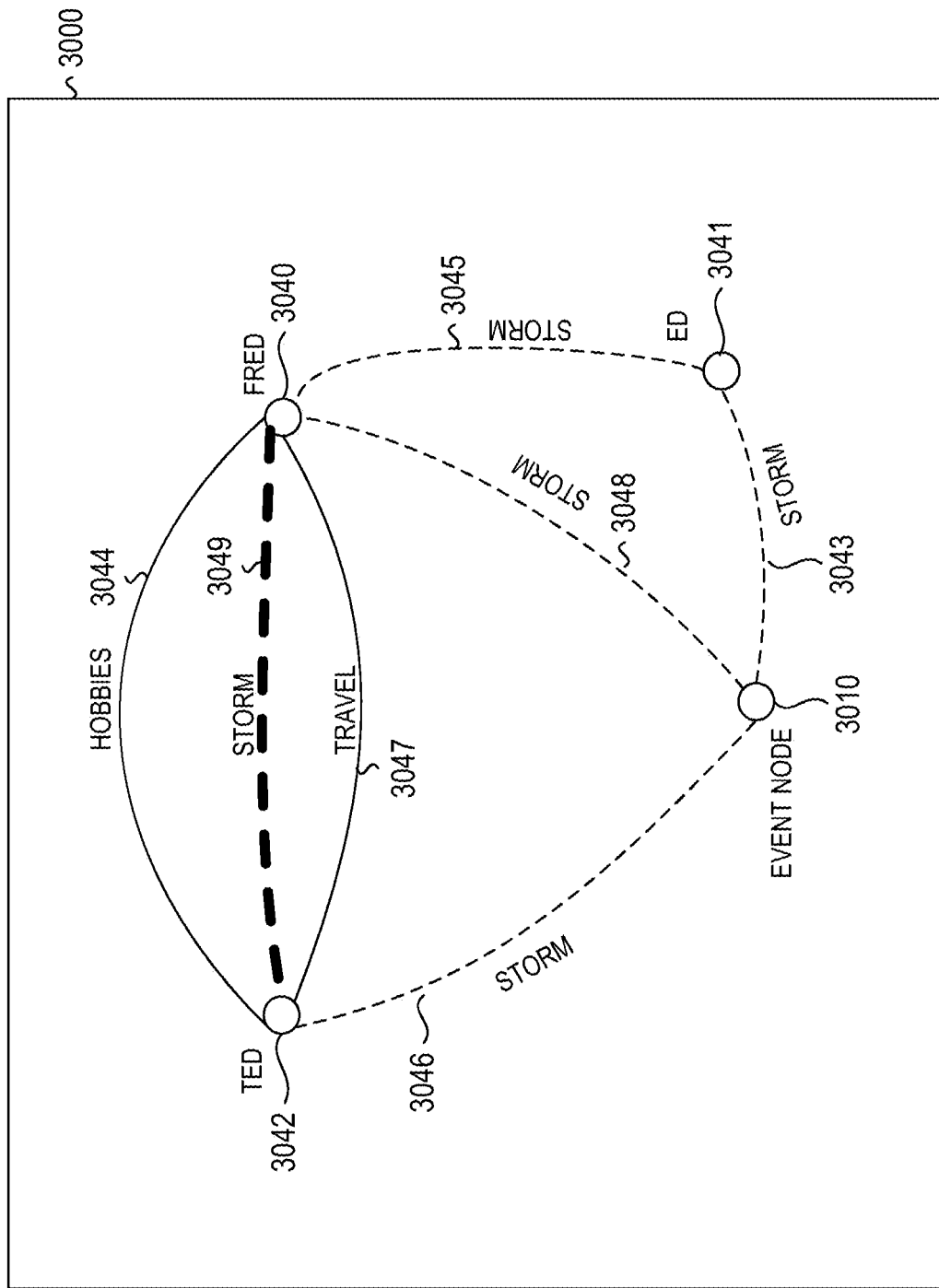
FIG. 29 is an example of temporally limited links in accordance with the SitNet of FIG. 1.

Links established between the nodes in situational network may be temporally limited. The temporal limit of the links may be established at the event node 3010 based on a predicted or known duration of the event or situation. The temporal limit of a link may also be determined by the user. Links established between PIAs of SitNet users may also be temporally limited. For example, users with a first order link to each other that resulted from their connection to the event node may only wish to share information for the duration of the event. The link between the two users can be disconnected when either is disconnected or disconnects from the event node, or the link may have a pre-determined connection time, established by one or both users at the time of creating the link. Referring to FIG. 29, PIAs at nodes corresponding to Ted 3042, Fred 3040, and Ed 3041 are all connected to the event node 3010 along storm dimensions 3046, 3048, and 3043, respectively. Ed 3041 discovers Fred 3040 and a link along the storm dimension 3045 is established until either link 3048 or 3043 is disconnected.

In one embodiment, the temporal limitation of a link may be based on geographic location or itinerary of the user. For example, a PIA is connected to the SitNet by invitation or request. The position of the user is monitored using a geographic positioning device, such as a GPS system, which may be included in the PIA. The connection with the event node is maintained while the user is within a predetermined distance of the situation. This distance may be determined at the event node or by the user. Since the situation and the user may both be moving, it is possible that the user may be disconnected and reconnected to the SitNet over a period of time. If the position of the user exceeds the predetermined distance, the connection to the event node is terminated. For example, a user connecting to a SitNet related to a snow storm may be connected to the SitNet when his PIA determines he is in proximity of the snow storm based on current location coordinates of the user and the current location or forecast trajectory of the snow storm. The PIA may then disconnect or be disconnected from the SitNet when it has been determined that the user has a low probability of experiencing any further affects of the snowstorm. In an alternate embodiment, the user is invited to connect to an event node of a SitNet based on their predicted proximity to a situation. If the user accepts the invitation, the position of the user is monitored as described above, and the connection to the event node is established when the location of the user is within a pre-determined distance of the situation.

In order to maintain links between the nodes belonging to users in the SitNet during an unintentional disconnection of the user nodes with the event node, such as failure or destruction of the systems hosing the event node, the users may choose to extend or renew the temporally limited link that would be terminated due to the disconnection from the event node to remain connected to each other in order to share and exchange information regarding the situation.

Figure 37:
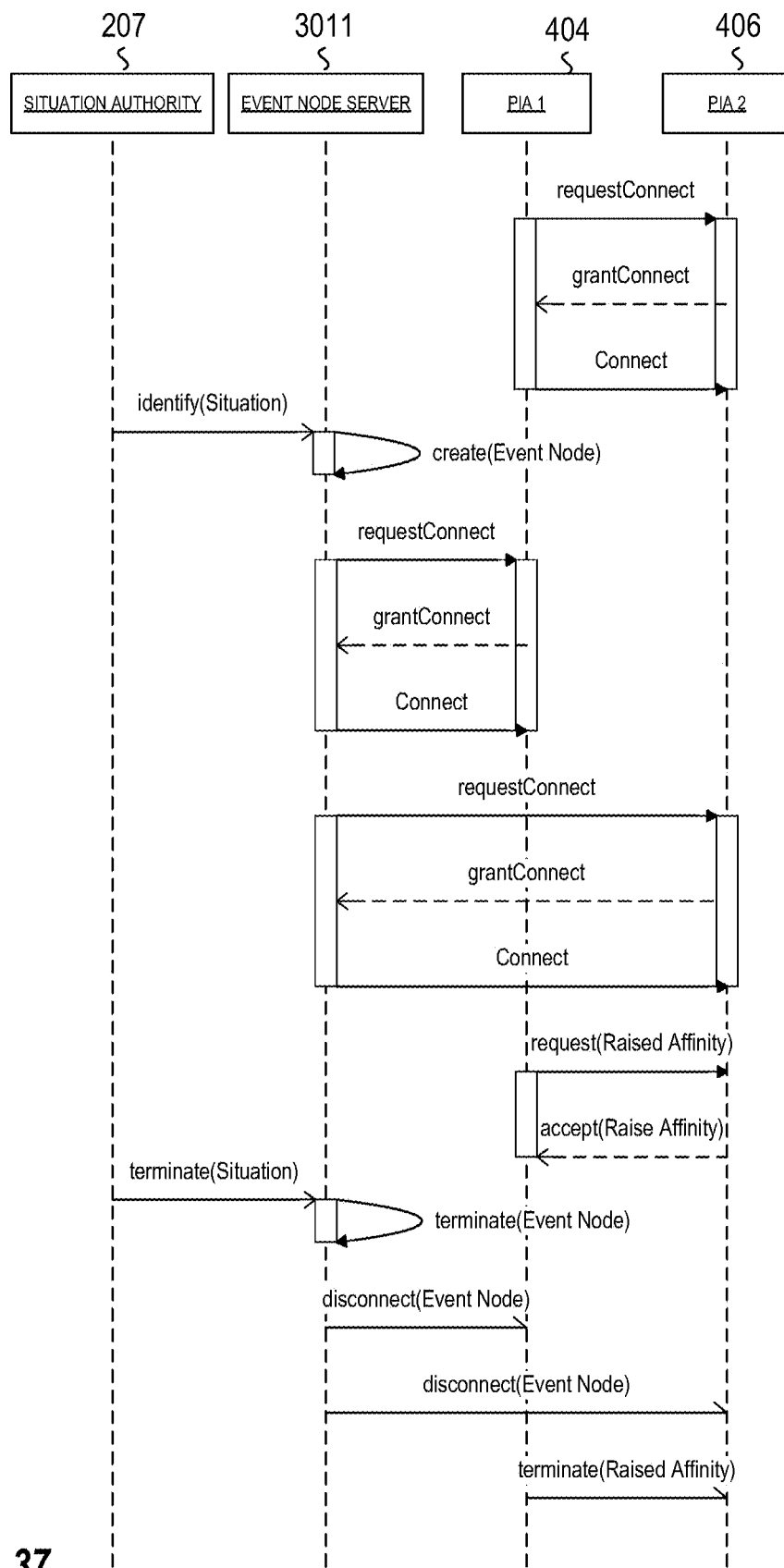
FIG. 37 is a sequence diagram in accordance with the SitNet of FIG. 1.

Links may also be created in a SitNet between users or between a user and the event node with a temporally limited raised affinity. If there are multiple dimensions connecting the users, the dimension related to interests in the event or situation (e.g., travel) may have a temporally raised affinity or a new temporally limited dimension with a raised affinity may be established. During the situation or event, users may have a greater need for information about the event or situation and are more likely to share or provide information to other users in the SitNet. The other dimensions, such as music or art, may have less importance during the situation or event, such that the user's PIA will utilize most if its resource sharing or searching for information about the situation or event. The raised affinity between the user devices 404, 406 is maintained for the duration of the connection of the PIAs with the event node server is shown, for example, in FIG. 37. The level of affinity may be changed based on the geographic proximity of the users. In an embodiment, the affinity is raised along the dimension for only some users in the SitNet, for example, users with PIA belonging to nodes of a particular projection of the SitNet.

A PIA connected to a SitNet may discover another PIA that it has previously established a connection with along one or several dimensions in an NDSN. The connection may be a first order connection, or the connection may be a higher order such that the two PIAs have never directly exchanged personal information. Based on the previous connection, the affinity along a dimension related to the situation may be elevated or raised for a period of time that the two PIAs are connected to the event node of the SitNet, or a new temporally limited dimension with an elevated affinity may be established. The degree of separation may also be decreased to a first order connection if the two PIAs have not previously communicated directly.

Referring again to FIG. 29, Ted 3042 and Fred 3040 have previous links (shown by the solid lines) along the dimensions of hobbies 3044 and travel 3047. Upon discovering that they are connected to the event node 3010 along the storm dimensions 3046 and 3048 (shown by the dashed lines), a new link between Ted 3042 and Fred 3040 along a storm dimension 3049 is established with an affinity higher than along either of hobbies 3044 or travel 3048 dimensions, as depicted with the thicker dashed line in FIG. 29. In one embodiment, the level of affinity is changed based on the proximity of the PIAs to each other, with a higher affinity being assigned as the proximity between the users decreases.

Figure 30:
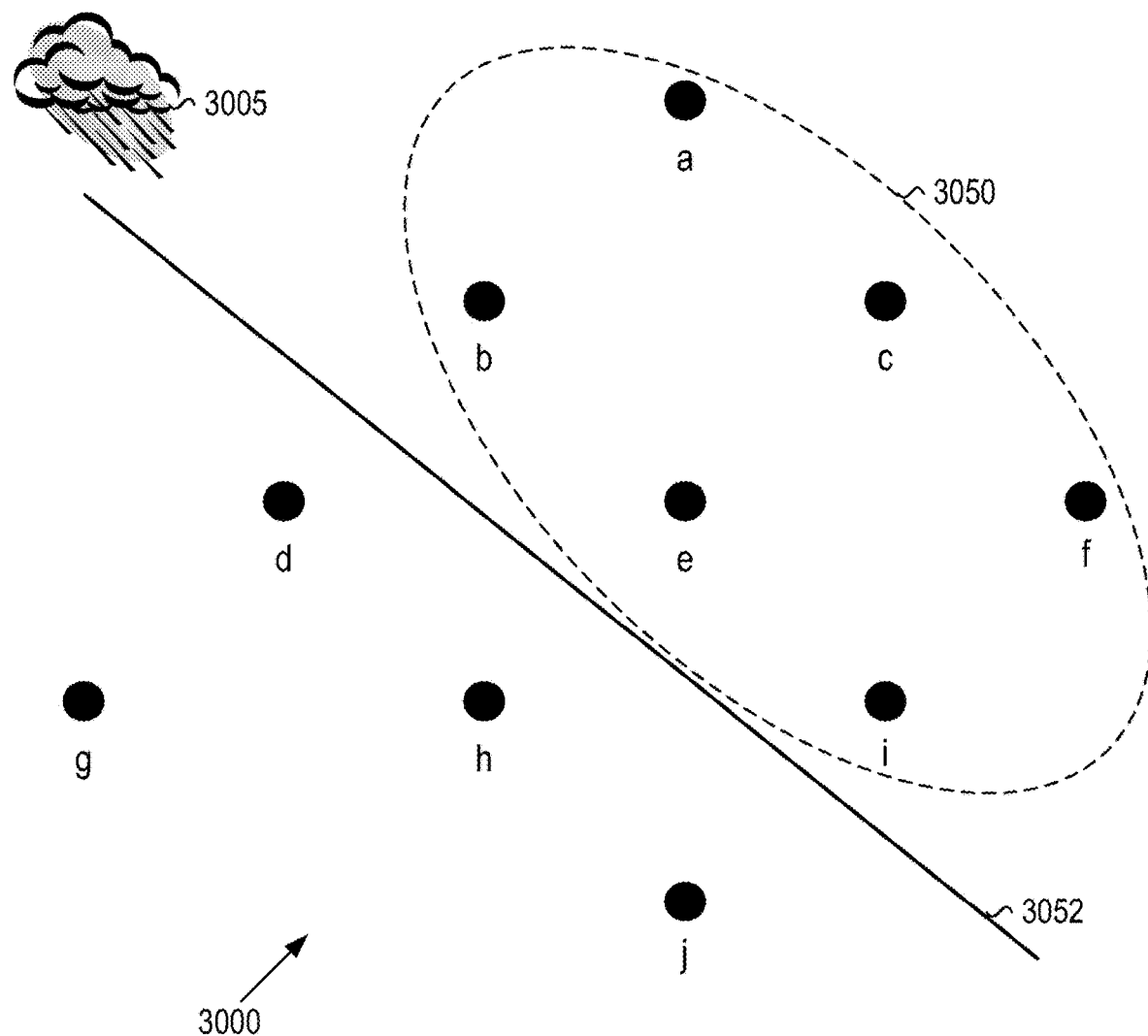
FIG. 30 is an example of a geographic projection of nodes in accordance with the SitNet of FIG. 1.
Figure 38:
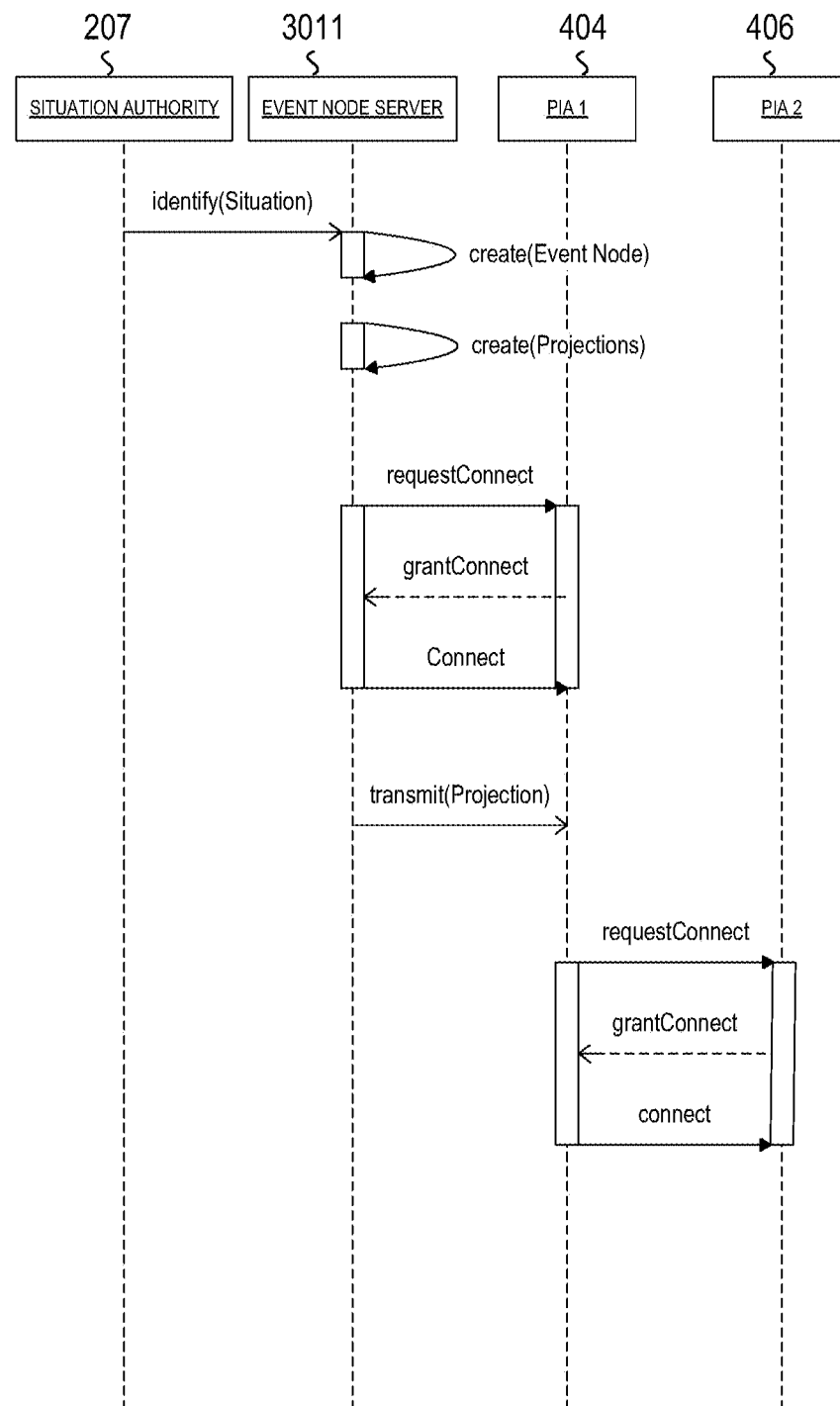
FIG. 38 is a sequence diagram in accordance with the SitNet of FIG. 1.

Users connected to an event node of a SitNet in an NDSN through a PIA may also request a "projected" view, also referred to as a projection, of the SitNet using procedures described above. The projected view may be created by a server 3011 at an event node as shown in FIG. 38. After receiving the projection from the event node server 3011, the PIA 404 may established connections with another PIA 406 included in the projection. Alternately, the PIA 404 of user 250 or a PIA 406 of a different user connected to the SitNet may create the projection. The projected view may be created along one or several dimensions of the NDSN. A user may want to share information with only a subset of the total number of users connected to the situational network, and thus may request or create a projection representing those other users that the user has the most interest in sharing information. For example, the user might request a projection for a SitNet based on location, allowing or requesting a connection with only those users in a certain zip code. As another example, a traveler connected to an event node for accident may want a projected view of the SitNet based on final travel destination in order to share or solicit alternate travel routes around the accident. The user may also share the projection with other users connected to nodes contained in that projection. An example of a geographic projection 3050 of nodes of a SitNet 3000 is shown in FIG. 30. The SitNet 3000 includes the 10 nodes labeled (a) through (j). Nodes a, b, c, e, f, and i are included in geographic projection 3050 based on their location with respect to boundary 3052. An example of such a situation 3005 is a severe rain storm (the situation 3005) that poses a flood threat to persons located on one side of a river (the boundary 3052). A geographic projection 3050 is formed including only those nodes (labeled a, b, c, e, f, and i) where a user is threatened by flood waters. In one embodiment, a server at the event node of the SitNet creates a set of geographic projections of users connected to the SitNet 3000, and distributes those geographic projections to the appropriate PIAs of users in the corresponding locations based upon the node belong to the PIA being included in that projection. If a node of a PIA is included in more than one geographic projection (e.g., two different projections that include overlapping geographic areas), the PIA 400 may receive more than one geographic projection. This enables a targeted distribution of geographically relevant information, including advertisements, to the connected users by allowing critical information to be passed to users who will receive the most benefit from knowing that information. For example, during a severe winter blizzard, the local effects of the blizzard may vary considerably over the affected area. Some areas may be without power, while other areas may experience road closures. Information of each of these conditions can independently be reported to the relevant users, such as when power is expected to be restored or when the roads will be re-opened by creating projections of users for each of the affected areas.

A SitNet can be used to provide navigation information, such as potential navigation hazards, optimal routes, alternate routes, traffic conditions, or unexpected occurrences (i.e., a herd of cows blocking a country road). A navigator can create an event node corresponding to their probable itinerary, which includes start, intermediate, and ending locations, as well as travel routes. PIAs of other navigators can crawl the network to discover event nodes corresponding to their own itineraries in order to determine if any relevant information has been reported. Each navigator may have requirements for the information most relevant to their travel. Requirements include estimated maximum time of travel, avoidance of hazards or detours, preferred itineraries or routes, avoidance of particular areas or routes, need for special services, or need for child or pet friendly establishments. Information that may be provided includes messages or other communications originating from the navigator, and data provided by the vehicle through on-board devices and sensors understood by one skilled in the art, such as vehicle speed, vehicle location, and travel itinerary and routes. The other navigators can then use this information in their navigation plans, such as estimating time of arrival, or adjusting the itinerary or route to avoid potential hazards or unexpected conditions. Navigation can include transportation by air, water, or land. As an example, a pilot in a small aircraft traveling from Philadelphia to Chicago creates an event node for his flight. The PIAs corresponding to pilots of several other aircraft connect to this node. Some are traveling nearly the same flight route as the pilot, others flying a reverse route from Chicago to Philadelphia, and some others having a route that will cross the first route at some time. The pilot who established the event node experiences severe turbulence at 20,000 ft over central Ohio and reports the turbulence to the SitNet through his PIA. The other pilots can make in-flight decisions to change their own attitude or heading based on this information. The other pilots also can share their information with other users of the SitNet that is not related to the turbulence over Ohio. For example, one pilot may report a strong northwestern headwind over Cincinnati, while another may report localized severe thunderstorm activity just north of Pittsburgh, allowing all the pilots of the SitNet to assess to their own flight routes in view of these potential reported hazards.

Figure 28:
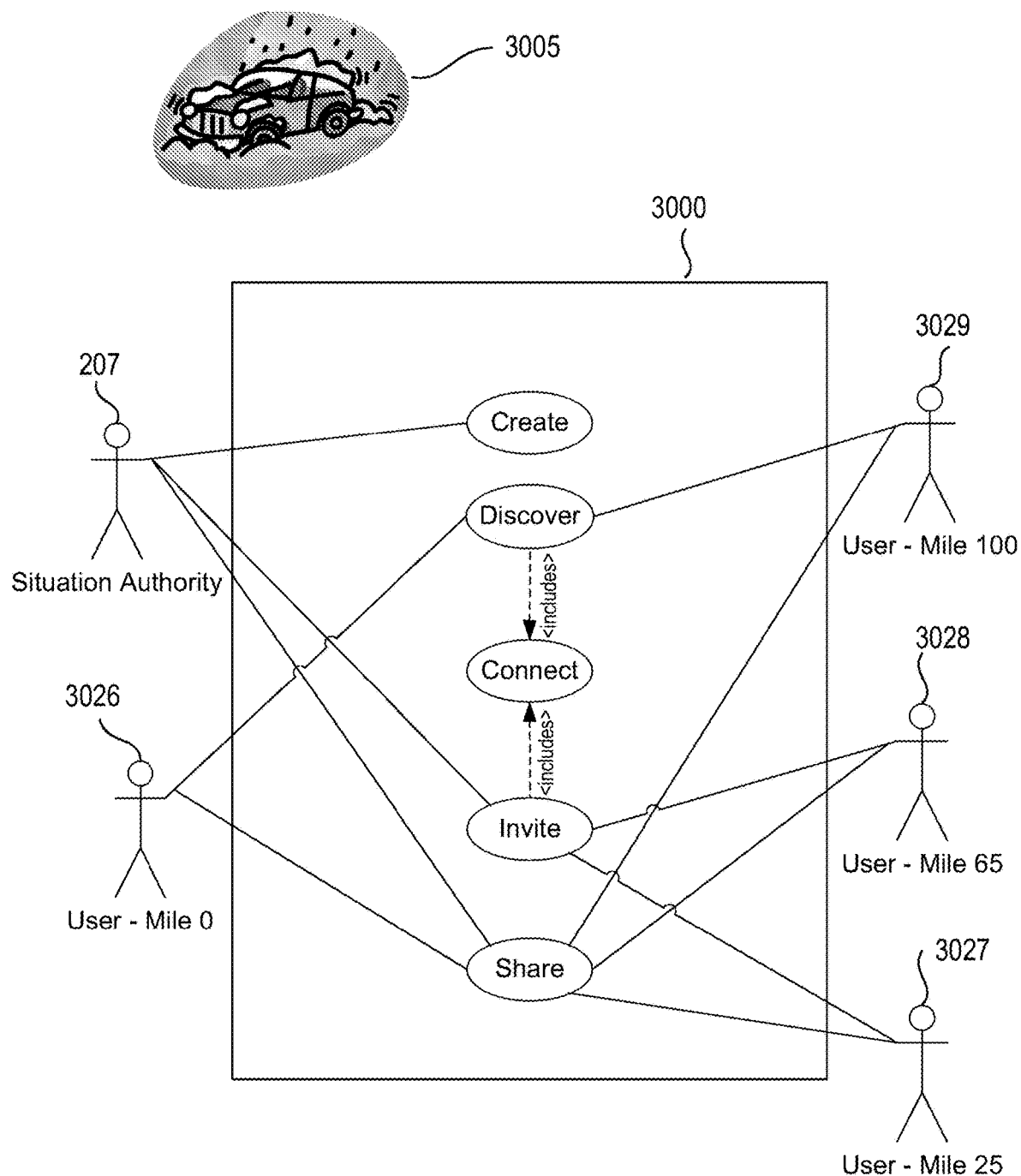
FIG. 28 is a use case diagram in accordance with the SitNet of FIG. 1.

Another example of the SitNet 3000 in a travel related situation is shown in FIG. 28. Several travelers 3026, 3027, 3028, 3029 along a stretch of highway are sharing or probing for information related to a situation 3005, a snow storm, affecting travel along that highway using SitNet 3000. The situation authority 207 establishes an event node corresponding to the situation 3005 using the create use case. This event node may be identified with the highway number, a specific mile post along the highway, or even a specific exit along a highway. For example, the event node may correspond to Mile Marker 50 on Interstate 91 in Vermont, which may be particularly hazardous during a snow storm. Travelers may discover the event node server using the discover use case, or alternately may be invited to participate in the SitNet 3000 by the event node server using the invite use case if they are within a pre-determined distance from the event node identifier. The connect use case is included in both the invite and discover use cases. The travelers 3026, 3027, 3028, 3029 and the situation authority 207 share information related to the situation using the share use case. In the example of FIG. 28, some travelers (3027, 3028) have been invited to join the SitNet 3000 by the situation authority 207, while other travelers (3026, 3029) have joined the SitNet 3000 based on a discovery of the event node by their own devices. The situation authority 207 may be a trusted provider of weather or traffic information, or a state or local DOT, who can also augment the information shared between the travelers with the latest information regarding weather updates or real-time road conditions. In an alternate embodiment, an event node corresponding to the situation may be established by one of the travelers 3026, 3027, 3028, 3029 along the highway.

A situational network may be established to provide traffic information to connected users. Event nodes for receiving traffic information may be established for the occurrence of an accident, road construction, police or other emergency activities, or even a stretch of highway or city or zip code. The PIA of a traveler might be constantly crawling the NDSN to discover information related traffic conditions is proximity to the vehicle or in intended route of the vehicle to its destination. The source of the traffic information may be other users' PIAs reporting traffic conditions or information from a traffic or other agency such as a state or local Department of Transportation (DOT) that might provide traffic information. When the PIA receives information concerning a potential travel delay it alerts the user so the user can evaluate if an alternate route should be taken. In one embodiment, the PIA suggests an alternate route.

A SitNet may be used to provide common travel routes to users. This is especially useful to users that are unfamiliar with the roadways in the area where they are traveling and a situation such as an accident or road construction is blocking their only known route through the area. By connecting to a SitNet with other users familiar with local roads, the user may learn of the most time efficient alternate routes around the situation. Users may also discover popular short cuts through a normal congested area. In one embodiment, a traffic accident or construction zone is associated with the event node of a SitNet. The event node is created by trusted provide, such as a traffic agency or state or local DOT. Pre-determined alternate routes may be stored in a database connected to a server associated with the host of the event node. A user is connected to the event node may be presented with alternate routes based on their current location and destination.

A situational network can be established for users traveling to and/or from the same location. A PIA for one of the users may crawl the network looking for other PIAs that have information indicative of an expected travel to or from the same location on or around certain range of dates. The user may be offering a ride to the location or seeking a ride to the location. If the PIA discovers one or a set of other PIAs, it may invite the other users of other PIAs to connect to the network to determine the feasibility of sharing transportation, which may include all forms of air, water, or land transport. In one embodiment, the situational network is encompassed by a PIA associated with a shared vehicle, such as car shares that are popular in many urban areas. A user's PIA can determine availability of vehicles in the area parked in their home space, or they might be able to obtain availability of a vehicle that was signed out by someone else but it might be available for a short time from a different location while the users that checkout the vehicle are not using the car.

Users can access information regarding travel delays using a PIA connected to an event node of a SitNet. The event nodes can correspond to commercial transportation routes, such as a scheduled commercial airline flight, a specific commuter train or bus run, can be established by a transportation company, DOT, or traffic reporting agency. In an embodiment, the event node is created by a traveler. An event node can also be established for a highway accident or road construction event. A user can request a connection to a server corresponding to the event node in order to obtain most recent arrival time or delay time estimated for the situation corresponding to that event node. Alternatively, a user's PIA may automatically connect to the event node, such as the event node for a commuter train that the user's spouse likely uses everyday. The user's PIA would then alert the user if there is any expected delay in the arrival of the commuter train. Similarly, a user can request a connection to an event node established for a commercial airline flight. The connection would allow the user to be updated of most recent flight status for that particular airline flight. Travel delay notifications can also be reported for highway delays, such as those caused by accidents or road construction. A user expecting guests might request that her PIA crawl the network and seek event nodes related to expected travel routes for the guests and automatically notify her if there are any unexpected delays.

A situational network may be used to broadcast emergency information to users connected through into the situational network. In one embodiment, a user's home page is automatically re-directed to a website where most current information regarding the emergency event can be found. Similarly, emergency information can be directed to users' cell phones and PDA's. In an alternate embodiment, the emergency information provider establishes an event node of the situational network. A user is invited to connect to the event node to receive updated information. Once the user accepts the invitation, new updates are automatically delivered to the user as they are made available. In one embodiment, the server at the event node has the authority to override a declined invitation to connect to the event node. In order to protect personal privacy to the greatest extent possible, such an override utility might be limited to be activated by a very select few individuals or trusted providers and can be activated only in the direst of emergency situations, such as when imminent loss of life may be a probable result of the event or situation.

Figure 24:
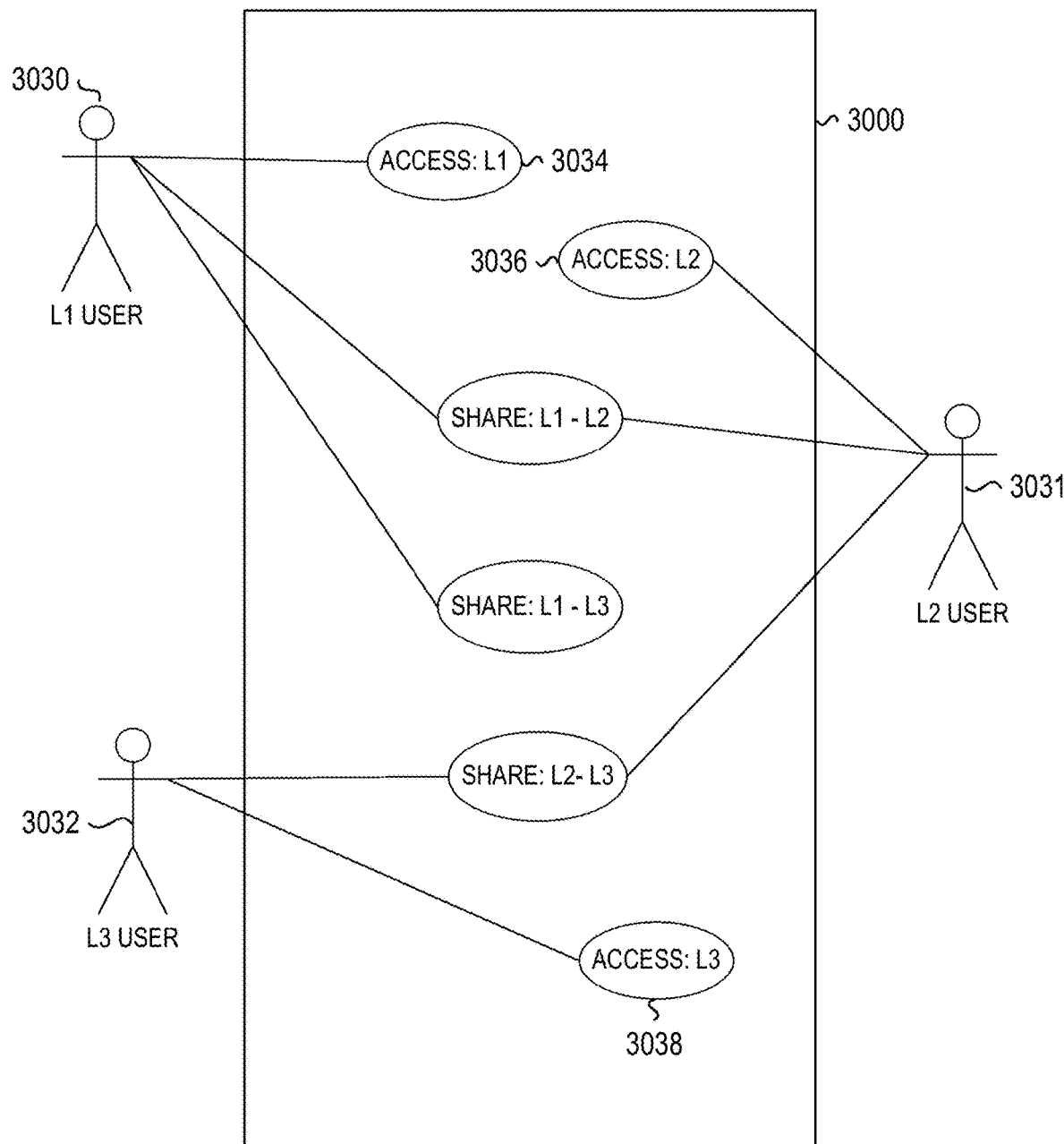
FIG. 24 is a user case diagram of an emergency event situational network in accordance with the SitNet of FIG. 1.

Referring to FIG. 24, a situational network may be formed for an emergency event or situation. The SitNet 3000 for the emergency event may have multiple tiers or access levels to allow for more effective sharing and propagation of information between users of the SitNet 3000. A first level of access (L1) 3034 is provided to L1 users 3030 such as emergency responders. Emergency responders include entities such as fire, police, EMT, and rescue personnel at or in transit to the location of an emergency. Emergency responders may also include government (e.g., FEMA) or other emergency management agencies that may be involved in crisis management during a disaster. A 911 dispatcher or medical personnel may also be granted L1 access to the SitNet 3000. A second level of access (L2) 3036 is provided for L2 users 3031, such as those individuals with a physical proximity to the emergency event. These individuals are also referred to as affected individuals. For example, those in the forecast track of a hurricane, those enveloped by the hurricane, and those in the wake of the hurricane are all classified as affected individuals and granted L2 access to the SitNet 3000. Similarly, those within a certain radius of the epicenter of an earthquake may be classified as affected individuals and granted L2 access to a SitNet 3000 established in response to the earthquake. A third level of access (L3) 3038 is provided to L3 users 3032, such as relief agencies and those materially affected by the disaster. Examples of organizations or individuals who might be granted level 3 access include The American Red Cross, insurance companies and their adjustors, and those individuals with family or property in the affected location who do not reside in the affected area (those residing in the affected area have L2 access). The different levels of access allow for efficient sharing of the most relevant information between the different individuals directly and indirectly involved in the SitNet 3000. L1 access allows emergency responders to access to information shared between all members of the SitNet 3000, plus provides a trusted connection for emergency responders to share information that may be critical in providing emergency service to the L2 individuals. L2 individuals can provide location information that may be useful for a rescue or conditions inside the situation or event that may be invaluable or otherwise unknown to emergency responders. The different levels of access can also allow for the most effective use of limited network resources, such as bandwidth, that may result from situation or event, for example ensuring that L1 access has the greatest resource allocation so that emergency responders can exchange vital information regarding the situation. In an embodiment, information in the emergency event SitNet 3000 is exchanged using the PIAs corresponding to the different individuals participating in the event or situation. A PIA corresponding to a user with L1 access may a have a higher affinity along the dimension related to the emergency event to anther L1 access PIA that it would have with L2 or L3 access PIA, allowing the more efficient and trusted sharing of information among the emergency responders.

Information shared by the various individuals participating in the event or situation may include audio and video data. This audio and video data can be aggregated by a server, which in one embodiment may correspond to the event node of the SitNet, to provide a geographic "snapshot" of the situation. By tagging each piece of video or audio data with a location and time coordinates, it is possible to create a spatial map of the situation. The time evolution of the situation can be obtained by aggregating the geographic snapshots for different times. Access to the geographic snapshot data is unrestricted for emergency responders with L1 access to the SitNet. Limited access to the geographic snapshot data may be provided individuals with L2 or L3 access, depending on bandwidth available within the SitNet. An external portal, such as an Internet website, may be established by a situation authority for the emergency event where some or all of the geographic snapshot data is made available, if system and network resources permit, to persons not connected to the SitNet.

A "roll-call" or "check-in" feature can be included in a situational network for a disaster or emergency event to establish a list of persons that might be missing or need assistance. A server corresponding to the event node of the situational network may invite users determined to be physically threatened by a disaster or emergency event to check-in. The server or CIA of the event node 3010 may determine which user PIAs to contact through stored lists, such as apartment or office building occupancy record, or postal record for streets or zip codes. Those people identified with a PIA are sent an unsolicited message to reply if they are alright, also referred to a positive response. A user may also respond to the check-in that they need assistance and provide location information to emergency responders. Non-responding PIAs are reported to emergency management officials to decide what further actions may be required to locate those individuals. Referring to FIG. 32, a PIA 400 displays an alert warning 3070 requiring user input that they are either ok 3074 or need assistance 3072. The user may also be presented with an option to display the current status of the roll call list 3076 so the she may be able to provide information on users that have not responded to the roll call query. In the example of FIG. 32, "Building Property Management" has provided a list of building occupants for "I Tower Place" to the trusted provider "Springfield Fire Company" which has established an event node and provided the roll call query to the PIA.

Figure 40:
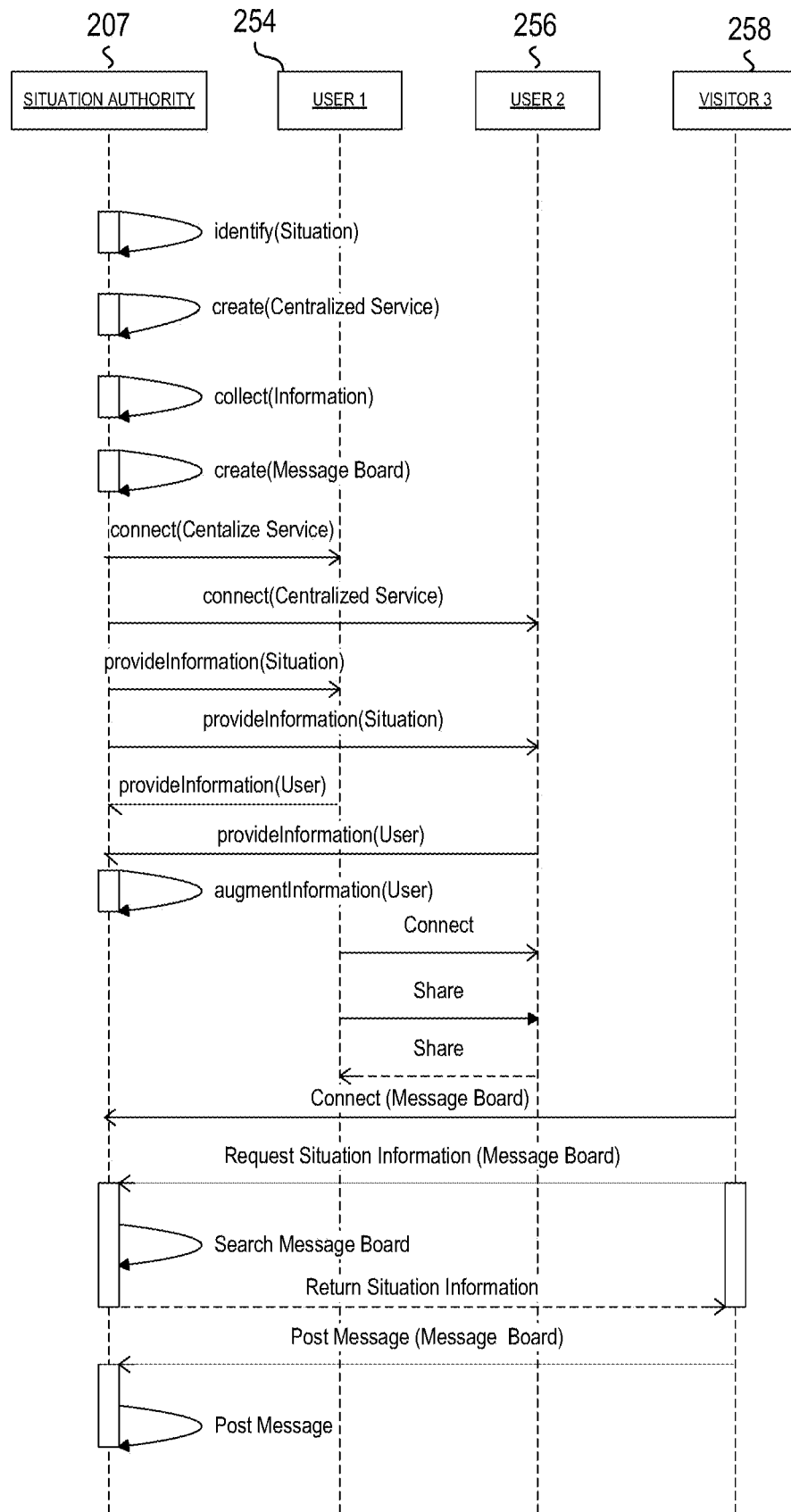
FIG. 40 is a sequence diagram in accordance with the SitNet of FIG. 1.

A situation authority or trusted provider establishing an event node 3010 for a server that hosts the roll call or check-in feature described above may provide a searchable message board to users connected to the SitNet as well visitors not connected to the SitNet that allows sharing of information about individuals in the SitNet 3000 with persons outside the SitNet. Referring to FIG. 40, Situation Authority 207, User 1 254, and User 2 256 are connected through a situational network. Visitor 3 258 is not connected to the situational network, but can access certain information made available by the situation authority via the message board, and post comments viewable by the participants of the situational network. The searchable message board may be used as in interface to gain access to information from one or more situational networks for different emergency events or disasters. Referring to FIG. 33, the message board 3080 may be accessible by a website on the internet (outside the SitNet). A visitor to the website can search 3082 the message board for information related to a specific situation or event. The information may be tagged with a location coordinate so that check-in and other information can be searched and obtained down to a zip code, street or even individual household level 3084. The searchable message board also allows visitors not connected or unable to connect to the SitNet the opportunity to post 3088 or view 3086 messages that are relevant to a specific situation, such as searching for information on a missing family member or friend. Other visitors with information about the situation can respond to those messages with any information that they can share. In one embodiment, the most recent roll-call list for the search criteria entered by the visitor is available using a link 3089 on the webpage.

During a disaster or crisis, relief agencies may establish a node of a SitNet 3000 for rapid deployment of emergency information. The server of the relief agency obtains the list of users connected to the SitNet 3000 from the server encompassing the event node 3010 corresponding to the situation. From this list, the relief agency can determine which users are likely affected by the disaster and invite those users to establish a connection with a node associated with the relief agency. The relief agency may also be able to determine to what goods and services are most needed in different areas based on information about the users obtained from stored profiles. The relief agency may then provide information such as nearest shelter, location where emergency supplies are being distributed, or service or goods providers may still be in operation. The user may also be able to provide information to the relief agency such as what services or utilities are still available at their location, what type of relief supplies are most needed, the extent of damage, etc. In one embodiment, the relief agency may be an insurance company, which provides claims information to it affected clients or a schedule of when and where adjustors will be visiting.

Figure 42:
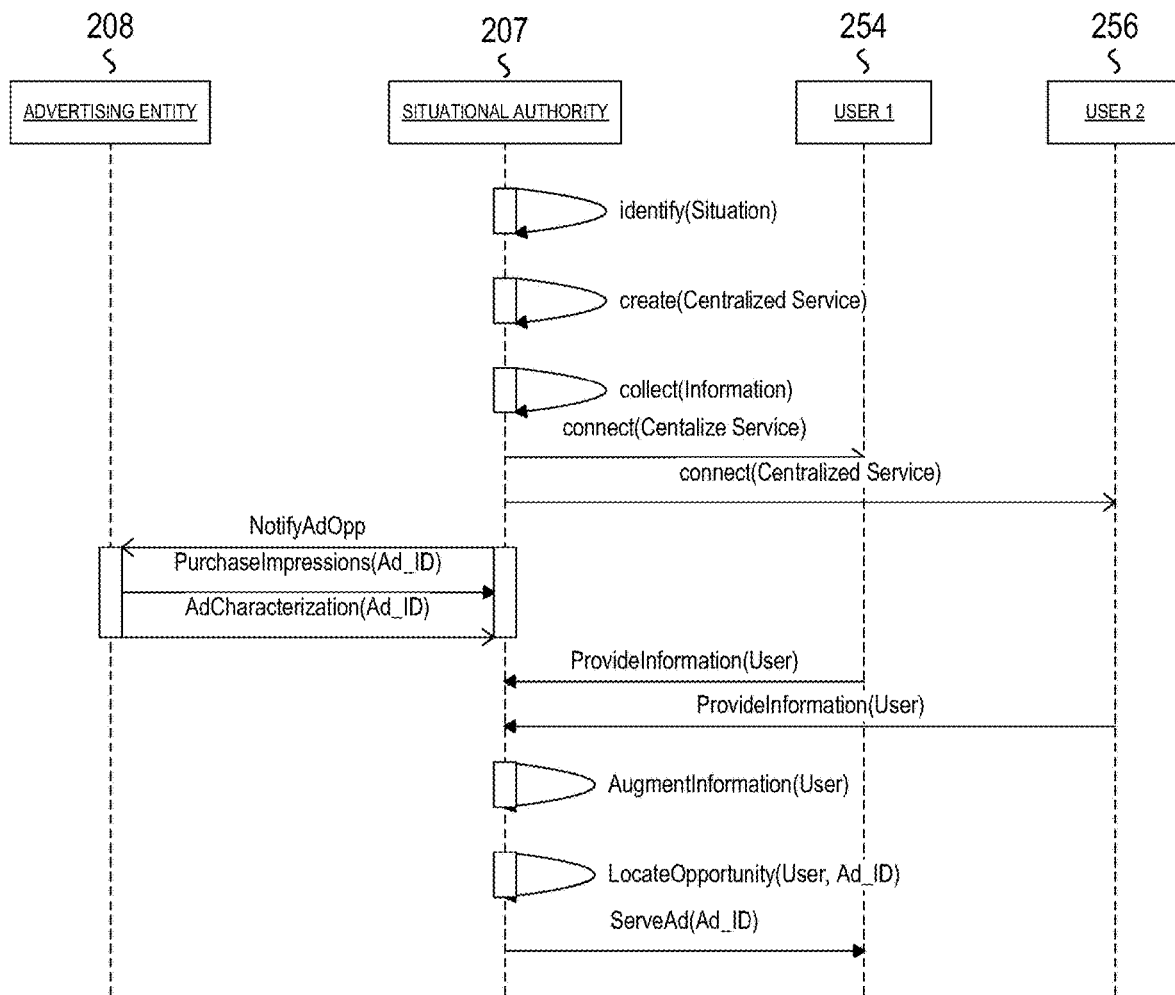
FIG. 42 is a sequence diagram in accordance with the SitNet of FIG. 1.

Referring generally to FIG. 42, targeted advertisements from an advertising entity 208 may be delivered to devices of users 254, 256 connected through a SitNet using profile and location information relating to the users 254, 256 collected by the situation authority 207, and determining an ad opportunity based on an affiliation between the user and the situation. An affiliation that a user has with the situation is used as a basis for delivering the targeted advertisements. The affiliation between the user and the situation is determined from one or more factors, including but not limited to, proximity of the user to the situation, role of the user within the situation, affect of the situation on the user, affect of the situation on property of the user, and projection of the SitNet in which the user is included. In some cases, one of the preceding factors alone may not be sufficient to determine an affiliation of the user to the situation. Many users within the same proximity of a situation may be affected very differently by the situation. For example, a homeowner and vacationer within the same city may have very different needs during a weather crisis such as a hurricane, even though their proximity to the situation is essentially the same. Affiliation information may be determined in part by analyzing personal data about the user, such as contained in a stored profile or found in a PIA. Information about a user's actual or predicted location may also be used in determining the affiliation. Once the advertisements are selected for a user, the targeted advertisements may be delivered to users of the SitNet using methods well understood by one skilled in the art.

Figure 27:
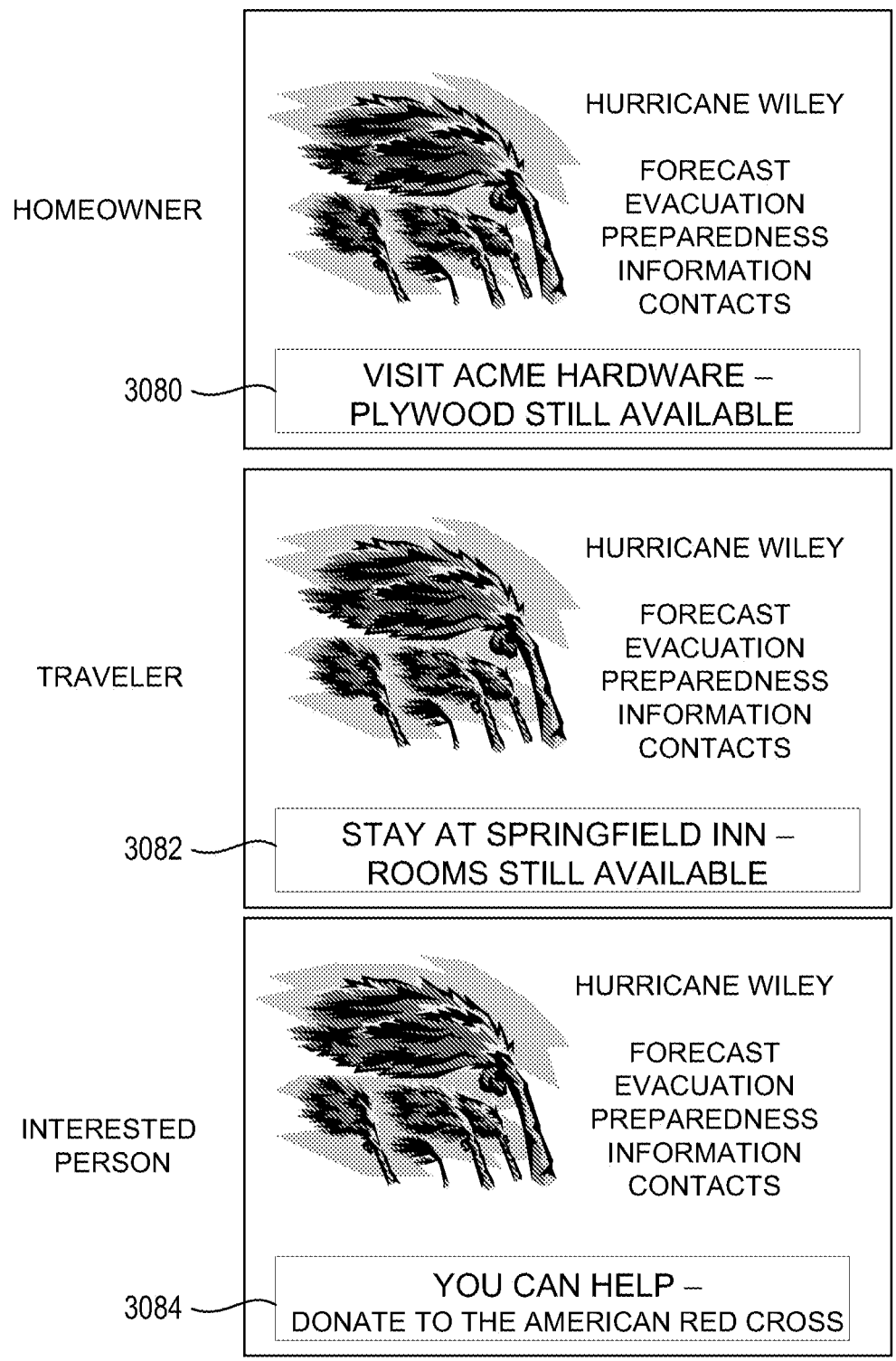
FIG. 27 is an example of presenting targeted advertisements to different users in accordance with the SitNet of FIG. 1.

By way of example, referring to FIG. 27, individuals participating in a SitNet for a hurricane event are directed to a source of information, which may be a web page. Based on the affiliation of the user with the situation, an advertising entity associated with the SitNet may deliver target advertisement to each user. A homeowner in the direct path of the hurricane may be shown ad for a hardware store that still has an ample supply of plywood 3080. The targeted ads may be location based (e.g., in a zip code) so that all SitNet users do not rush to the same store which quickly will be depleted of its plywood supply leaving latecomers to undertake a costly and time-consuming hunt for the plywood elsewhere. A user perceived to be a traveler in the area of the hurricane may be displayed an advertisement for the nearest hotel with vacancies 3082. Someone with an interest in the hurricane, maybe with family members or friends in the area, who is connected to the SitNet but is not in proximity to the hurricane, may be delivered a targeted ad to donate to a relief fund 3084. In one embodiment, targeted advertisements are delivered when a user connects to the SitNet using a PIA based on access to personal information or a user profile on the PIA accessible by the targeting ad server. If access to all personal information is restricted, the targeted ad service may display a default advertisement to the user. In an alternate embodiment, advertisements can be targeted for presentation to users connected through the SitNet using the projections of the SitNet. All users in one projection of the SitNet may receive different advertisements on their PIAs than users of a different projection of the SitNet based on targeted criteria specific for each of the projections. Targeting criteria may include, but are not limited to, type of situation, location of the situation, and aggregate projection user demographics, such as average age, median household income, a percentage of households with children.

A situational network may be used to effectively manage the distribution of information regarding availability of limited goods and services as a result of an event or situation, such as disruptive weather or natural disaster. Based on the locations of the users in the SitNet, goods and services can be offered to users participating in a SitNet. All the users within a certain nearby geographic proximity, such as a zip code, town, or street, to providers of the goods and services, may receive notifications regarding the availability of the goods or services at those locations. As a user changes position, updated information may be provided based on most recent location coordinates associated with the user. A change in availability of goods and services at different locations may also be provided to the users of the SitNet based on information provided by the providers of the goods and services themselves, or alternately, the users of the SitNet. As the supplies of the goods are depleted and services become unavailable, users of the SitNet are automatically notified of other nearby providers. Anticipated availability of good and services may also be distributed to the users of the SitNet in a similar manner. For example, in advance of a hurricane during a large-scale evacuation, gasoline may be in short supply. To compound this difficulty people may waste both gasoline and time searching for a location that is selling gasoline. By connecting to SitNet associated with the hurricane, users may be presented with the location of the nearest provider with a supply of gasoline, or alternately several nearby locations. In addition, nearby users may be presented with different lists of available filling stations to help reduce a rush to a single location by all the users that will soon deplete its gasoline supply as a result. When a filling station no longer has a supply of gasoline, users in the vicinity may be notified based on information provided by the owner of the filling station, or by other users at that location who may have been waiting in line when the supply runs out.

In one embodiment, user profile information is used with the user location information to determine the nearest provider of goods and services that fulfill actual or perceived needs of the user. The user profile information can be stored on a user device, such as a cell phone or PIA, or at a central site, such as a server associated with a situation authority or communications provider. The user profile information may contain, but is not limited to, number and ages of individuals in the user's household, number and type of pets owned by the user, languages spoken, medical conditions of the user and his/her dependent (e.g., diabetes), and special services need by the user and his/her dependents (e.g., dialysis). Such information can be used in directing a user to a provider of the nearest service that fulfills some or all the needs of the user during or as a result of the situation. For example, during a hurricane evacuation, a user with two dogs can be directed toward the nearest evacuation center that accepts pets, which may not be the nearest evacuation center to the user if other centers that are closer do not accept pets.

In addition to the location of the nearest provider of goods and services, situational dependent information, such related hazards, can be distributed to the user. The related hazards may impede the user from gaining access to the goods or services, such as flooded or otherwise impassable roads on the most probable route to a storm evacuation center. In one embodiment, alternate routes to the provider of the goods or services are suggested, minimizing the hazards that a user might encounter enroute to obtain the goods or services.

Location based goods and service notifications may be delivered to user devices in a language that is understood by the user. The selection of the language in which to deliver the notification may be based on information contained in the user profile. The user may have previously selected the delivery language which is then stored in the user profile, or the notification sender may automatically determine the delivery language based on the personal information contained in the user profile.

Notifications of the service may be delivered on GPS-enabled portable device, such as a cell phone or PDA, so that a traveling user can receive notifications of services most relevant to his current location. In one embodiment, the portable device, can notify the provider of the service that the user in enroute, including any special considerations, such as those included in the user profile. The user may also communicate additional special considerations, such as injuries or special needs, to the service provider.

In an alternate embodiment, location based services can be offered to users connected to an event node of a SitNet using a PIA. Using positional coordinates associated with the user of the PIA, a server located at the event node can create a set of projected views of the SitNet, such that the nodes in each of the projected views of the SitNet are within close geographic proximity, such as a zip code, town, or street. A distribution of providers of limited goods and services that might be available after the occurrence of a situation or event can then be delivered in a targeted manner to the users of the SitNet using the projected views. As the users' location changes, location coordinates are provided to the event node server so that the projected views are updated, and user always receives the most up to date location based service information for their current location.

A situational network can be used to efficiently deliver and propagate a message or notification from a single user related to a situation or event to an expanded group of individuals who are directly or indirectly affected by the event or situation. The message may be created and distributed by a situation authority, or alternately created by an individual in response to receiving information about occurrence or expected occurrence of the situation. Each recipient of the message or notification may have pre-defined groupings of other users, such as family, friends, co-workers, neighbors, etc, so that an incoming notification can be forwarded to only to the selected groups of users. The groups that are displayed to the user for propagation of the notification may be dependent on the situation, with the displayed groups either being pre-selected by the user or determine automatically by the receiving device, which in one embodiment is a PIA and the groups correspond to users at nodes in an NDSN. For example, a user will likely need to notify one set of groups of users in their NDSN if school is being closed, and another set of groups of users if she is delayed by a traffic accident. Automatic determination of groups may be accomplished via creating projections of the PIA user's NDSN that are relevant to the situation of the incoming notification, for example, projections along the dimensions corresponding to family, friends, or business contacts.

A user can create separate notifications that are added to the message for each group before forwarding the message. The notifications for each group are separately composed on a device used to propagate the message before the message is forward to the different groups. The notifications are all preferably composed on a single screen of the device. The message and the corresponding notifications composed on the device are then all transmitted to the users of the selected groups at substantially the same time using a single action on the device such as actuating an actuator of the device. The single action on the device causes each notification composed on the device to be attached to the message, and subsequently transmitted to the appropriate users for each group. Examples of actuators include mechanical buttons or touch sensitive display panels. In an embodiment, the user may also reply to the sender of the message with a personal response. The reply may be transmitted using the same single action as described above, or transmitted at a separate time using a different action on the device.

Notifications may be distributed in the SitNet 300 using a peer to peer connections, or through connections to a centralize service, such as one that includes the situation authority.

Referring to FIG. 25, a school district superintendent creates a node in the situational network using a PIA 3060 to inform a group of users that school will be closed tomorrow. He creates a message 3066 that is propagated to a first set of users in selected groups (teachers, staff, parents, and snow removal). In this example, the groups are selectable by the superintendent, and different notifications are added to the message for each group, and propagated using the [NOTIFY] actuator 3068 on the PIA. The superintendent has chosen not to inform the superintendents of other school districts of his decision, overriding the automatic selection of that group by the PIA. Jane Doe, a parent who has a child in the Springfield School District receives the message from the superintendent on her PIA 3062, which is included in her cell phone. She propagates the message to her pre-defined group of users with additional notifications, also using the [NOTIFY] actuator 3068. Jane Doe's friend receives the original message 3066 propagated through Jane Doe's PIA 3063 on her PIA3064, which is included in her PDA with an additional notification 3069 added by Jane Doe. She replies 3067 to Jane Doe's notification using the [REPLY] actuator and notifies her friends using the [NOTIFY] actuator 3068 that she will be at Jane Doe's house tomorrow.

A situational network may be established where the situation is a social event, such as a concert or festival. Users attending the event are alerted when other members of the NDSN are also in attendance at the same event. In one embodiment, the situational network is a proximity based network. Users are alerted to the presence of other members included in their NDSN by their PIA when they are both in attendance at the same event based on the sharing of position coordinated between the PLAs. In one embodiment, the situational network is used to facilitate personal introductions. A user's NDSN may contain many contacts that are personally unknown to a user possible due to a higher order degree of separation in the NDSN or because of physical distance between the two users, but nonetheless the two users share an affinity along at least one dimension where they exchange personal information. When the two users are connected to the event node in the same situational network, and are or will soon be in close proximity, an alert may be presented by the users' PIAs so that the users may decide if they would like to meet in person. The PIAs may determine future proximity based on a common event scheduled in both calendars of the users PIAs. Instantaneous proximity may be determined by sharing location coordinates obtained using a geographic location device, such as GPS, included in the PIA. In one embodiment, a user pre-selects other users in their social network that are personally unknown to them and that they would like to personally meet. When those pre-selected individuals are in proximity, the user is notified of their location even in the absence of a connection to an event node. The connection between the two users creates a proximity situational network. For example, when two users' PIAs are crawling the NDSN and one discovers that the other is within a pre-determined range due to sharing of GPS position coordinates between the two PIAs, an alert can be sent to that user to facilitate a personal introduction between the two users.

Users interested in the same weather event may be connected in a situational network for social interaction. A user may be connected to this weather driven social network using a link on an internet site displaying information about that weather event. Other users can be connected to the same social network from different links on different websites also displaying information about the weather event. Referring to FIG. 26, a user interested in a forecasted snow storm may visit a webpage 3070 of a weather website for weather information related to that event. When viewing the weather event details page 3072, the user interested in skiing at a popular ski destination may click on a link 3074 and be connected to a centralized social networking website 3076 related to the weather event. The social networking website allows users to share and exchange information for a number of topics including lodging, transportation, social events, or popular meeting locations. Alternately, the PIA may be used to connect to an event node server of the situational network for the weather event, or the PIA may create a node for the weather event. The user may invite other users with similar interests to join the SitNet using the PIA. Additionally, the user's PIA may also crawl the network along a dimension in its NDSN, such as outdoor activities, to discover other users interested in the weather event and request a connection. The SitNet established in the NDSN though the PIA may be used to share information similar to that obtained on the website discussed above, but the information is shared in a peer to peer manner instead of controlled by a centralize source.

Those skilled in the art will recognize that the interactions employed to perform the various functions associated with the SitNet 3000, PIA, CIA and the NDSN (Discover, Connect, Invite, Configure, etc.) may be executed in a variety of ways not limited to the examples described herein.

Figure 22:
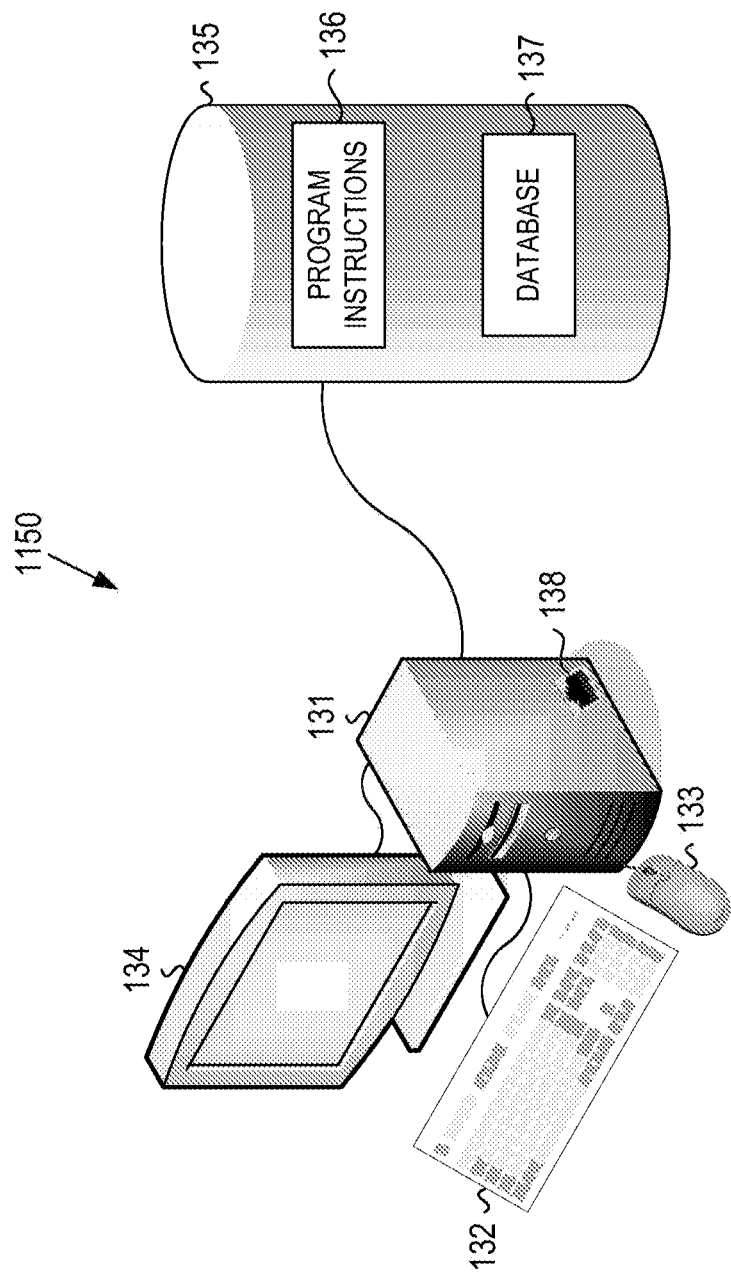
FIG. 22 is a block diagram of a computer system for realization of the SitNet of FIG. 1.

FIG. 22 illustrates a block diagram of a computer system 1150 for realization of a computer-implemented apparatus that may form all or a part of one or more implementation(s) or embodiment(s) of the present invention. The computer system 1150 includes a computer 131, a keyboard 132, a mouse 133, and a monitor 134. The computer 131 has a network port 138 for connecting to the computer network 900 (not shown). The computer 131 is connected to a storage device 135 which contains the program instructions 136 for the software application that provides the logical functions of the computer-implemented apparatus. The storage device 135 also contains a database 137 for storing data.

Those skilled in the art will recognize that the program instructions 136 for software applications implementing all or a portion of one or more embodiment(s) of the present invention may be written in a programming language such as Java or C++, and that the database 137 may be implemented with a database package such as Microsoft Access™ or a database management system (DBMS) such as Microsoft SQL Server™, Microsoft SQL Server CE™, IBM DB2™, mySQL or postgreSQL.

Figure 23:
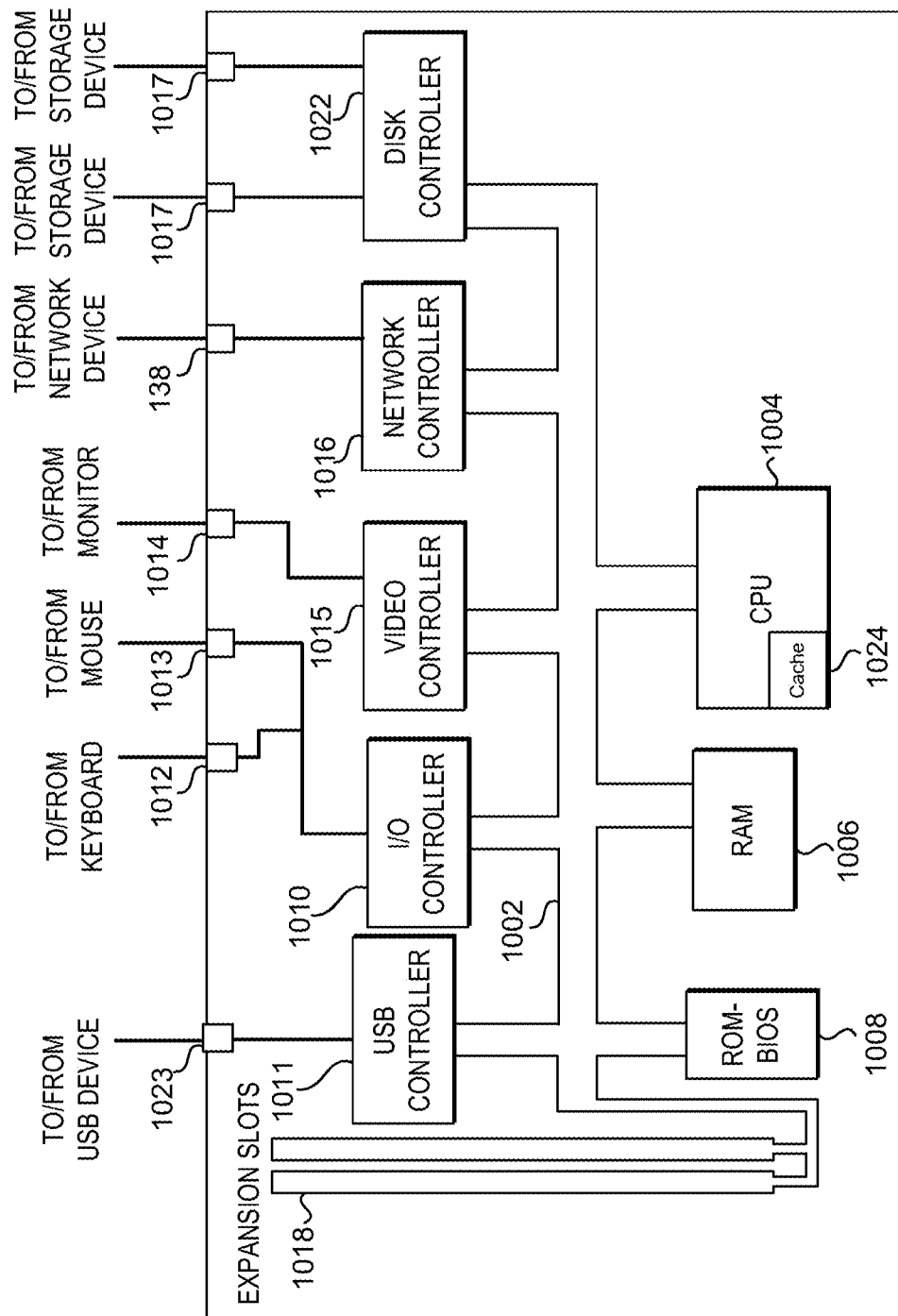
FIG. 23 is a block diagram of a computer system through which the implementation of the SitNet of FIG. 1 may be realized.

FIG. 23 illustrates a block diagram of the computer 131. A system bus 1002 transports data amongst the Central Processing Unit (CPU) 1004, RAM 1006, the Read Only Memory Basic Input Output System (ROM-BIOS) 1008 and other components. The CPU 1004 can contain a cache memory component 1024. The computer 131 may include one or more external storage ports 1017 for accessing a hard disk drive, optical storage drive (e.g., CD-ROM, DVD), flash memory, tape device or other storage device (not shown). The relevant storage device(s) are connected through the external storage port 1017 which is connected to the system bus 1002 via a disk controller 1022. The keyboard 132 and the mouse 133 can be connected to the keyboard port 1012 and mouse port 1013, respectively, which are connected to the system bus 1002 through the I/O controller 1010. The monitor 134 can be connected to a monitor port 1014 which is connected to the system bus 1002 through the video controller 1015. A network device (not shown), including but not limited to an Ethernet device or other device having networking capability, can be connected to the network port 138 which is connected through the network controller 1016 to the system bus 1002. Additional ports, such as parallel or serial ports (not shown), may be utilized through the 1/O controller 1010. The computer 131 may include one or more USB ports 1023. A USB device (not shown), including but not limited to a printer, scanner, keyboard, mouse, digital camera, storage device, PDA and webcam, can be connected to the USB port 1023 which is connected to the system bus 1002 through the USB controller 1011. Expansion slots 1018 can be comprised of Industry Standard Architecture (ISA) slots, Peripheral Component Interconnect (PCI) expansion slots, PCI Express expansion slots, Accelerated Graphics Port (AGP) slots or any other slot generally known in the art to allow additional cards to be placed into the computer 131. These slots can be used to connect network cards, video cards, sound cards, modems and any other peripheral devices generally used with a computer. Detailed descriptions of these devices have been omitted for convenience only and should not be considered limiting.

Those skilled in the art will recognize that a part of, or the entirety of, the embodiments of the present invention may be implemented as a web-based application that includes a web server and a browser application residing on a client computer.

The embodiments of the present invention may be implemented with any combination of hardware and software. If implemented as a computer-implemented apparatus, the present invention is implemented using means for performing all of the steps and functions described above.

The embodiments of the present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

While specific embodiments have been described in detail in the foregoing detailed description and illustrated in the accompanying drawings, it will be appreciated by those skilled in the art that various modifications and alternatives to those details could be developed in light of the overall teachings of the disclosure and the broad inventive concepts thereof. It is understood, therefore, that the scope of the present invention is not limited to the particular examples and implementations disclosed herein, but is intended to cover modifications within the spirit and scope thereof as defined by the appended claims and any and all equivalents thereof.

What is claimed is:

1. A method for delivering event information via a network using a networked system, the networked system comprising: at least one networking server configured to maintain data defining a multi-dimensional information network, wherein each respective user node of the multi-dimensional information network is associated with respective user data; a plurality of user devices configured to be connected with the at least one networking server via the network, wherein each of the plurality of user devices of the plurality of user devices is associated with a respective user node; and at least one information node for storing and providing supplemental information via the network;

the method comprising:
  maintaining, by the at least one networking server, a database of a plurality of user nodes and multi-dimensional node-to-node links characterizing relationships between the plurality of user nodes via dimensions in the multi-dimensional information network;
  providing, by the at least one networking server, to each respective user device associated with a respective user node of the plurality of user nodes a respective composite data feed that is based on a database of multi-dimensional node-to-node links;
  establishing, by at least one event node server, an event node associated with an event in a particular geographical area,
    wherein the event node is discoverable to each respective user device of a first subset of the plurality of user devices by browsing the respective composite data feed;
  joining at least the first subset of the plurality of user devices that have discovered the event node to the event node, wherein user devices associated with a first subset of user nodes of the multi-dimensional information network are joined to a centralized architecture for the event node;
    wherein the event node is configured as a central node in the centralized architecture for accessing information associated with the event from at least one location in the multi-dimensional information network;
  creating, by the at least one networking server, based on the database of multi-dimensional node-to-node links, a projection of the plurality of user nodes wherein the projection of the plurality of user nodes represents a second subset of user devices, wherein the second subset of user devices is selected based on respective distances of devices of the second subset of user devices from the event;

transmitting, by the at least one networking server, respective requests to connect to the event node to the second subset of user devices, wherein each respective request to connect is in a form of a roll call;

recording respective responses to the respective requests to connect to the event node;

making a subset of the respective responses viewable, via the event node, to a first device, associated with a first node, that is connected to the event node, wherein:

each response of the subset was received from a device associated with a node having a single degree of separation from the first node in the database of multi-dimensional node-to-node links; and analyzing (a) the database of multi-dimensional node-to-node links, and (b) data of user nodes of the multi-dimensional information network that are joined to the centralized architecture for the event node to:

identify at least one second node included in the database of multi-dimensional node-to-node links that is: (a) not connected to the event node, and (b) connected via at least one dimension to at least one user node of the multi-dimensional information network that is joined to the centralized architecture for the event node; and delivering information to the at least one second node, wherein the information was received from the at least one information node.

2. The method of claim 1, wherein user devices connected to the event node are enabled to communicate via a message board available by way of the event node.

3. The method of claim 1, wherein identifying the at least one second node comprises identifying nodes associated with user data that indicate an association with the particular geographical area of the event.

4. The method of claim 1, further comprising updating user data associated with user nodes of the multi-dimensional information network that are joined to the centralized architecture for the event node based on joining the centralized architecture for the event node.

5. The method of claim 4, further comprising delivering additional information from the at least one information node to at least one device based on the updated user data.

6. The method of claim 1, wherein the projection represents the second subset of user devices determined to be geographically proximate to the event.

7. The method of claim 6, wherein a particular user device is determined to be geographically proximate to the event based on the user device and the event occurring in the same town.

8. The method of claim 6, wherein a particular user device is determined to be geographically proximate to the event based on GPS data of the particular user device.

9. The method of claim 1, wherein the single degree of separation is indicative of a friend relationship.

10. The method of claim 1, wherein the single degree of separation is indicative of a family relationship.

11. An apparatus for delivering event information via a network using a networked system, the networked system comprising: at least one networking server configured to maintain data defining a multi-dimensional information network, wherein each respective user node of multi-dimensional information network is associated with respective user data; a plurality of user devices configured to be connected with the at least one networking server via the network, wherein each of the plurality of user devices of the plurality of user devices is associated with a respective user node; and at least one information node for storing and providing supplemental information via the network;

the at least one networking server comprising:

memory configured to maintain a database of a plurality of user nodes and multi-dimensional node-to-node links characterizing relationships between the plurality of user nodes via dimensions in the multi-dimensional information network;

one or more network controllers configured to:

provide to each respective user device associated with a respective user node of the plurality of user nodes a respective composite data feed that is based on a database of multi-dimensional node-to-node links;

one or more central processing units, coupled to the one or more network controllers, configured to:

establish an event node associated with an event in a particular geographical area, wherein the event node is discoverable to each respective user device of at least a first subset of the plurality of user devices by browsing the respective composite data feed;

join at least the first subset of the plurality of user devices that have discovered the event node to the event node, wherein user devices associated with a first subset of user nodes of the multi-dimensional information network are joined to a centralized architecture for the event node;

wherein the event node is configured as a central node in the centralized architecture for accessing information associated with the event from at least one location in the multi-dimensional information network;

create, based on the database of multi-dimensional node-to-node links, a projection of the plurality of user nodes wherein the projection of the plurality of user nodes represents a second subset of user devices, wherein the second subset of user devices is selected based on respective distances of devices of the second subset of user devices from the event;

wherein the one or more network controllers are further configured to:

transmit respective requests to connect to the event node to the second subset of user devices, wherein each respective request to connect is in a form of a roll call;

wherein the one or more central processing units are further configured to:

record respective responses to the respective requests to connect to the event node;

make a subset of the respective responses viewable, via the event node, to a first device, associated with a first node, that is connected to the event node, wherein:

each response of the subset was received from a device associated with a node having a single degree of separation from the first node in the database of multi-dimensional node-to-node links; and analyze (a) the database of multi-dimensional node-to-node links, and (b) data of user nodes of the multi-dimensional information network that are joined to the centralized architecture for the event node to:

identify at least one second node included in the database of multi-dimensional node-to-node links that is: (a) not connected to the event node, and (b) connected via at least one dimension to at least one user node of the multi-dimensional information network that is joined to the centralized architecture for the event node; and wherein the one or more network controllers are further configured to:

deliver the information to the at least one second node, wherein the information was received from the at least one information node.

12. The apparatus of claim 11, wherein user devices connected to the event node are enabled to communicate via a message board available by way of the event node.

13. The apparatus of claim 11, wherein the one or more central processing units are configured to identify the at least one second node by identifying nodes associated with user data that indicate an association with the particular geographical area of the event.

14. The apparatus of claim 11, wherein the one or more central processing units are further configured to update user data associated with user nodes of the multi-dimensional information network that are joined to the centralized architecture for the event node based on joining the centralized architecture for the event node.

15. The apparatus of claim 14, wherein the one or more network controllers are further configured to deliver additional information from the at least one information node to at least one device based on the updated user data.

16. The apparatus of claim 11, wherein the projection represents the second subset of user devices determined to be geographically proximate to the event.

17. The apparatus of claim 16, wherein the one or more central processing units are further configured to determine that a particular user device is geographically proximate to the event based on the user device and the event occurring in the same town.

18. The apparatus of claim 16, wherein the one or more central processing units are further configured to determine that a particular user device is geographically proximate to the event based on GPS data of the particular user device.

19. The apparatus of claim 11, wherein the single degree of separation is indicative of a friend relationship.

20. The apparatus of claim 11, wherein the single degree of separation is indicative of a family relationship.

21. A method for delivering event information via a network using a networked system, the networked system comprising: at least one networking server configured to maintain data defining a multi-dimensional information network, wherein each respective user node of the multi-dimensional information network is associated with a respective user data; a plurality of user devices configured to be connected with the at least one networking server via the network, wherein each of the plurality of user devices of the plurality of user devices is associated with a respective user node; and at least one information node for storing and providing event information via the network;

the method comprising:

maintaining, by the at least one networking server, a database of a plurality of user nodes and multi-dimensional node-to-node links characterizing relationships between the plurality of user nodes via dimensions in the multi-dimensional information network;

providing, by the at least one networking server, to each respective user device associated with a respective user node of the plurality of user nodes a respective composite data feed that is based on a database of multi-dimensional node-to-node links;

establishing, by at least one event node server, an event node associated with an event in a particular geographical area, wherein the event node is discoverable to each respective user device of at least a first subset of the plurality of user devices by browsing the respective composite data feed;

joining at least the first subset of the plurality of user devices that have discovered the event node to the event node, wherein user devices associated with a first subset of user nodes of the multi-dimensional information network are joined to a centralized architecture for the event node;

wherein the event node is configured as a central node in the centralized architecture for accessing information associated with the event from at least one location in the multi-dimensional information network;

creating, by the at least one networking server, based on the database of multi-dimensional node-to-node links, a projection of the plurality of user nodes wherein the projection of the plurality of user nodes represents a second subset of user devices, wherein the second subset of user devices is selected based on respective distances of devices of the second subset of user devices from the event;

transmitting, by the at least one networking server, respective requests to connect to the event node to the second subset of user devices, wherein each respective request to connect is in a form of a roll call;

recording respective interactions to connect to the event node that were based on the respective requests;

making a subset of the respective interactions viewable, via the event node, to a first device, associated with a first node, that is connected to the event node, wherein:

each interaction of the subset was received from a device associated with a node having a single degree of separation from the first node in the database of multi-dimensional node-to-node links; and analyzing the database of multi-dimensional node-to-node links to:

identify at least one second node included in the database of multi-dimensional node-to-node links, based at on a user data associated with the at least one second node, wherein the at least one second node is: (a) is associated with a respective user device that has not transmitted an interaction to connect to the event node, and (b) connected via at least one dimension of the multi-dimensional information network to the event node; and delivering event information relevant to the event to the at least one second node, wherein the event information was received from the at least one information node.

22. The method of claim 21, wherein user devices connected to the event node are enabled to communicate via a message board available by way of the event node.

23. The method of claim 21, wherein identifying that the at least one second node is connected via the at least one dimension of the multi-dimensional information network to the event node comprises:
identifying user data associated with the at least one second node indicating an interest in at least one particular topic relevant to the event.

24. The method of claim 21, wherein identifying that the at least one second node is connected via the at least one dimension of the multi-dimensional information network to the event node comprises:
identifying a user data associated with the at least one second node indicating participation in at least one particular activity relevant to the event.

25. The method of claim 21, wherein identifying that the at least one second node is connected via the at least one dimension of the multi-dimensional information network to the event node comprises:
identifying a user data associated with the at least one second node indicating participation travel history to a particular region relevant to the event.

26. An apparatus for delivering event information via a network using a networked system, the networked system comprising: at least one networking server configured to maintain data defining a multi-dimensional information network, wherein each respective user node of the multi-dimensional information network is associated with a respective user data; a plurality of user devices configured to be connected with the at least one networking server via the network, wherein each of the plurality of user devices of the plurality of user devices is associated with a respective user node; and at least one information node for storing and providing the event information via the network;
the at least one networking server comprising:
memory configured to maintain a database of a plurality of user nodes and multi-dimensional node-to-node links characterizing relationships between the plurality of user nodes via dimensions in the multi-dimensional information network;
one or more network controllers configured to:
provide to each respective user device associated with a respective user node of the plurality of user nodes a respective composite data feed that is based on a database of multi-dimensional node-to-node links;
one or more central processing units, coupled to the one or more network controllers, configured to:
establish an event node associated with an event in a particular geographical area,
wherein the event node is discoverable to each respective user device of at least a first subset of the plurality of user devices by browsing the respective composite data feed;
join at least the first subset of the plurality of user devices that have discovered the event node to the event node, wherein user devices associated with a first subset of user nodes of the multi-dimensional information network are joined to a centralized architecture for the event node;
wherein the event node is configured as a central node in the centralized architecture for accessing information associated with the event from at least one location in the multi-dimensional information network;
create, based on the database of multi-dimensional node-to-node links, a projection of the plurality of user nodes wherein the projection of the plurality of user nodes represents a second subset of user devices, wherein the second subset of user devices is selected based on respective distances of devices of the second subset of user devices from the event;
where in the one or more network controllers are further configured to:
transmit, by the at least one networking server, respective requests to connect to the event node to the second subset of user devices, wherein each respective request to connect is in a form of a roll call;
wherein the one or more central processing units are configured to:
record respective interactions to connect to the event node that were based on the respective requests;
make a subset of the respective interactions viewable, via the event node, to a first device, associated with a first node, that is connected to the event node, wherein:
each interaction of the subset was received from a device associated with a node having a single degree of separation from the first node in the database of multi-dimensional node-to-node links; and
analyzing the database of multi-dimensional node-to-node links to:
identify at least one second node included in the database of multi-dimensional node-to-node links, based at on a user data associated with the at least one second node, wherein the at least one second node is: (a) is associated with a respective user device that has not transmitted an interaction to connect to the event node, and (b) connected via at least one dimension of the multi-dimensional information network to the event node; and
where in the one or more network controllers are further configured to:
delivering event information relevant to the event to the at least one second node, wherein the event information was received from the at least one information node.

27. The apparatus of claim 26, wherein user devices connected to the event node are enabled to communicate via a message board available on the event node.

28. The apparatus of claim 26, wherein the one or more central processing units are configured to identify that the at least one second node is connected via the at least one dimension of the multi-dimensional information network to the event node by:
identifying user data associated with the at least one second node indicating an interest in at least one particular topic relevant to the event.

29. The apparatus of claim 26, wherein the one or more central processing units are configured to identify that the at least one second node is connected via the at least one dimension of the multi-dimensional information network to the event node by:

identifying a user data associated with the at least one second node indicating participation in at least one particular activity relevant to the event.

30. The apparatus of claim 26, wherein the one or more central processing units are configured to identify that the at least one second node is connected via the at least one dimension of the multi-dimensional information network to the event node by:
  identifying a user data associated with the at least one second node indicating participation travel history to a particular region relevant to the event.

* * * * *